(12) United States Patent
Oh et al.

(10) Patent No.: US 12,707,090 B2
(45) Date of Patent: Aug. 11, 2026

(54) POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

(71) Applicant: LG ELECTRONICS INC., Seoul (KR)

(72) Inventors: Hyunmook Oh, Seoul (KR); Sejin Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 20 days.

(21) Appl. No.: 18/030,722

(22) PCT Filed: Oct. 7, 2021

(86) PCT No.: PCT/KR2021/013833
§ 371 (c)(1),
(2) Date: Apr. 6, 2023

(87) PCT Pub. No.: WO2022/075786
PCT Pub. Date: Apr. 14, 2022

(65) Prior Publication Data

US 2023/0388557 A1 Nov. 30, 2023

Related U.S. Application Data

(60) Provisional application No. 63/088,999, filed on Oct. 7, 2020.

(51) Int. Cl.
*H04N 19/70* (2014.01)
*H04N 13/10* (2018.01)
(Continued)

(52) U.S. Cl.
CPC ............ *H04N 19/70* (2014.11); *H04N 13/10* (2018.05); *H04N 19/96* (2014.11);
(Continued)

(58) Field of Classification Search
None
See application file for complete search history.

(56) References Cited

U.S. PATENT DOCUMENTS

2013/0336410 A1* 12/2013 Nguyen ................ H04N 19/44 375/E7.027
2016/0227225 A1* 8/2016 Zou ....................... H04N 19/96
(Continued)

FOREIGN PATENT DOCUMENTS

KR 10-2017-0135914 A 12/2017
KR 10-2018-0035816 A 4/2018
(Continued)

OTHER PUBLICATIONS

M. Levoy & T. Whitted, "The Use of Points as a Display Primitive", Univ. of N.C. at Chapel Hill Tech. Report No. 85-022 (Jan. 1985) (Year: 1985).*
(Continued)

*Primary Examiner* — David N Werner
(74) *Attorney, Agent, or Firm* — Bryan Cave Leighton Paisner LLP

(57) ABSTRACT

A point cloud data transmission method according to embodiments may comprise the steps of: encoding point cloud data into geometry data; encoding attribute data of the point cloud data on the basis of the geometry data; and transmitting the encoded geometry data, the encoded attribute data, and signaling data, wherein the step of encoding the geometry data comprises a step of converting coordinates of the geometry data from a first coordinate system to a second coordinate system.

8 Claims, 54 Drawing Sheets

(51) Int. Cl.
*H04N 19/96* (2014.01)
*H04N 13/106* (2018.01)
*H04N 13/111* (2018.01)

(52) U.S. Cl.
CPC ........ *G06T 2210/56* (2013.01); *H04N 13/106* (2018.05); *H04N 13/111* (2018.05)

(56) References Cited

U.S. PATENT DOCUMENTS

2017/0347120 A1* 11/2017 Chou ..................... H04N 19/89
2018/0180408 A1* 6/2018 Du ..................... G01B 11/2545
2018/0268570 A1* 9/2018 Budagavi ................ G06T 9/001
2019/0080483 A1* 3/2019 Mammou ............. G06T 3/4007
2019/0081638 A1* 3/2019 Mammou ............ H04N 19/436
2019/0087979 A1* 3/2019 Mammou ............ H04N 19/597
2020/0302651 A1* 9/2020 Flynn ........................ G06T 9/20
2020/0413096 A1* 12/2020 Zhang .................. H04N 19/176
2021/0067805 A1* 3/2021 Vosoughi ........... H04N 19/1883
2021/0097722 A1* 4/2021 Mammou ................. G06T 9/00
2021/0119640 A1* 4/2021 Mammou .............. H04N 19/60
2021/0176468 A1* 6/2021 Nalci ..................... H04N 19/70
2021/0211734 A1* 7/2021 Ray ........................ H04N 19/70
2021/0219001 A1* 7/2021 Jang ..................... H04N 19/176
2021/0266548 A1* 8/2021 Sarwer ................. H04N 19/122
2022/0036654 A1* 2/2022 Nakagami ............... G06T 9/001
2022/0159312 A1* 5/2022 Oh ......................... H04N 19/70
2022/0167016 A1* 5/2022 Zhang .................. H04N 19/174
2022/0217409 A1* 7/2022 Park ..................... H04N 19/119
2022/0272364 A1* 8/2022 Drugeon .............. H04N 19/157
2022/0312035 A1* 9/2022 Takahashi ............ H04N 21/816
2022/0327743 A1* 10/2022 Oh ........................... G06T 3/00
2022/0351421 A1* 11/2022 Oh .......................... G06T 9/001
2023/0053544 A1* 2/2023 Flynn ........................ G06T 9/40
2023/0156231 A1* 5/2023 Nam ...................... H04N 19/30
375/240.12
2023/0171415 A1* 6/2023 Chen ...................... H04N 19/30
375/240.26
2023/0316584 A1* 10/2023 Oh .......................... G06T 9/001
382/243
2023/0328285 A1* 10/2023 Oh ......................... H04N 19/70
375/240.02
2023/0377203 A1* 11/2023 Oh .......................... G06T 9/001
2023/0386088 A1* 11/2023 Oh ......................... H04N 19/96
2023/0412837 A1* 12/2023 Oh ............................ G06T 9/00
2023/0419552 A1* 12/2023 Oh ....................... H04N 19/124
2024/0029312 A1* 1/2024 Oh .......................... G06T 9/001
2024/0062428 A1* 2/2024 Oh ............................ G06T 9/40
2024/0155157 A1* 5/2024 Park ..................... H04N 19/184
2024/0179347 A1* 5/2024 Lee ......................... G06T 9/001
2024/0276013 A1* 8/2024 Oh ....................... H04N 19/119

FOREIGN PATENT DOCUMENTS

KR 10-2018-0117230 A 10/2018
KR 10-2019-0082065 A 7/2019

OTHER PUBLICATIONS

D. Graziosi, O. Nakagami, S. Kuma, A. Zagheeto, T. Suzuki, & A. Tabatabai, “An overview of ongoing point cloud compression standardization activities: video based (V-PCC) and geometry-based (G-PCC)”, 9 APSIPA Transactions on Signal and Information Processing No. e13 (Apr. 3, 2020) (Year: 2020).*
Search Report for PCT/KR2021/013833 dated Jan. 20, 2022.
Convenor, ISO/IEC JTC 1/SC 29/WG11 “G-PCC codec description v8,” N19525 dated Oct. 2020.

* cited by examiner

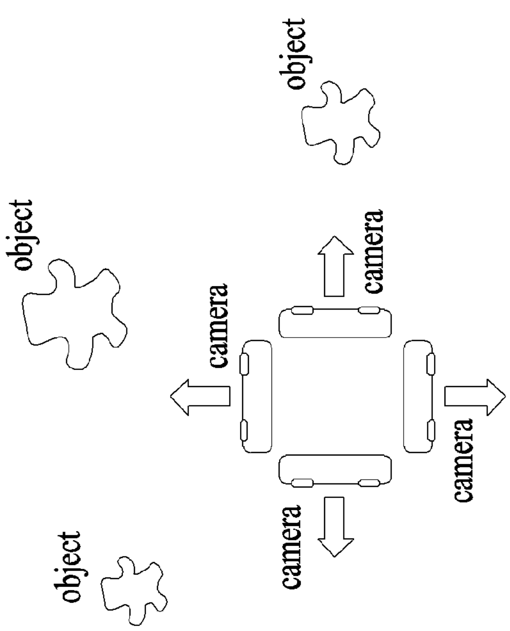
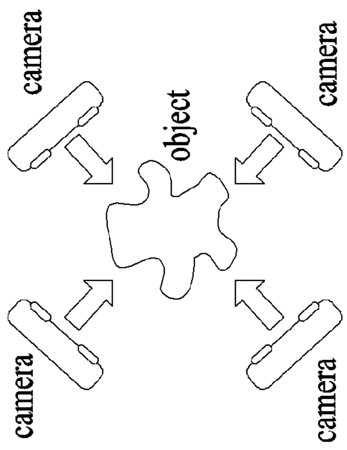
FIG. 3

FIG. 7
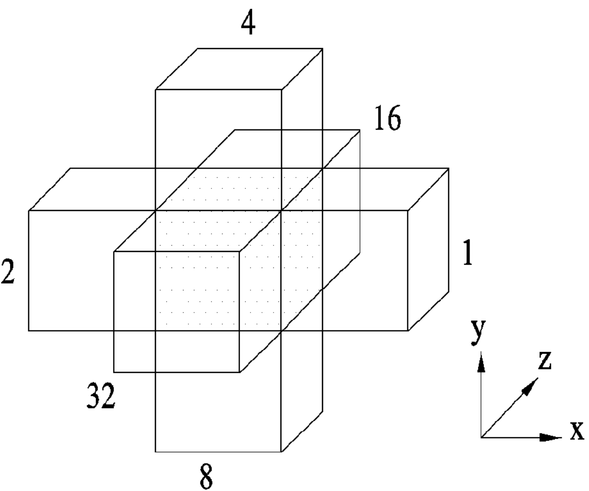
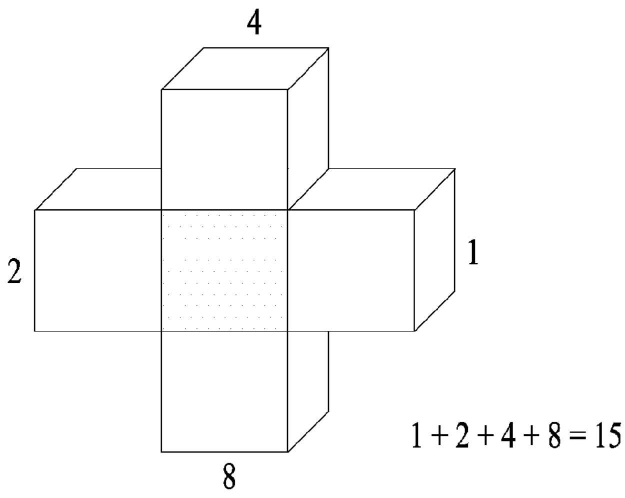

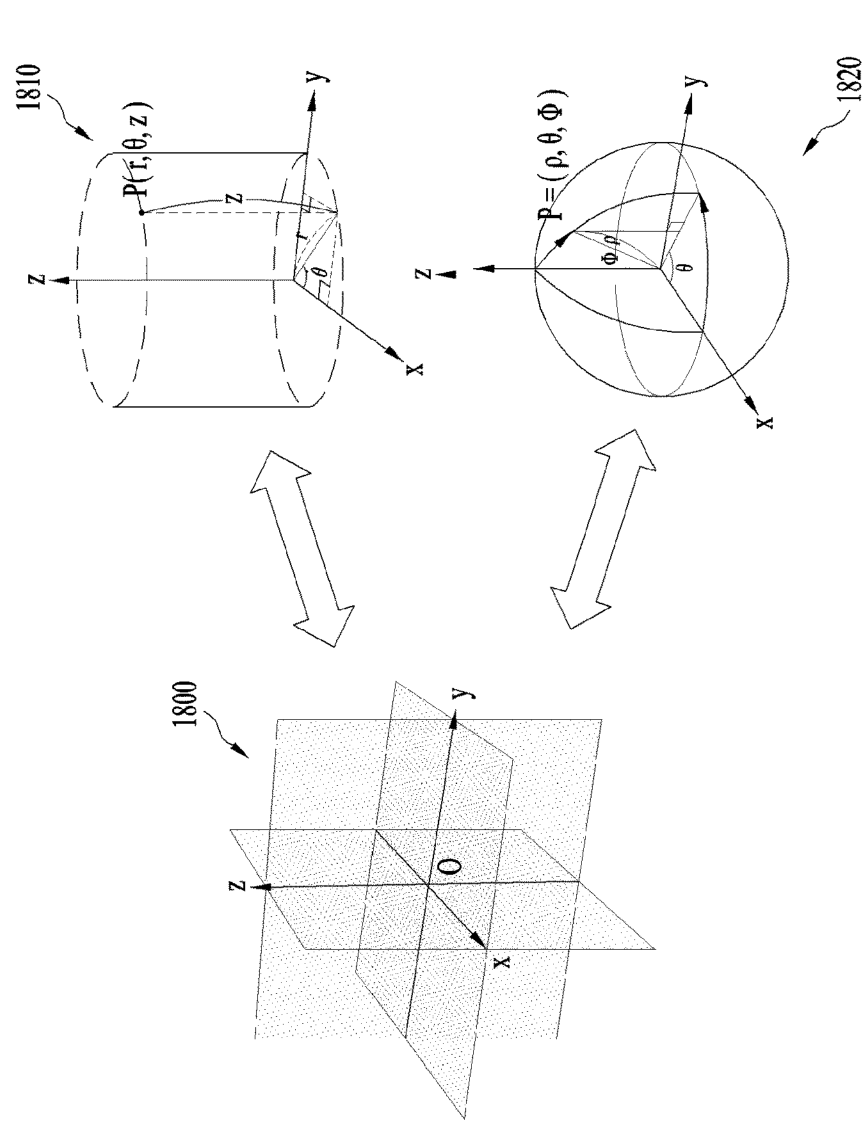
1811
$$r = \sqrt{x^2 + y^2}$$
$$\theta = tan^{-1}\left(\frac{y}{x}\right)$$
$$z = z$$
1812
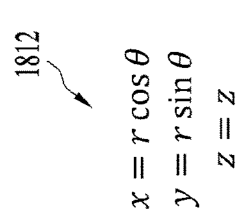
1821
$$\rho = \sqrt{x^2 + y^2 + z^2}$$
$$\theta = tan^{-1}\left(\frac{y}{x}\right)$$
$$\emptyset = cos^{-1}\left(\frac{z}{\sqrt{x^2 + y^2 + z^2}}\right)$$
1822
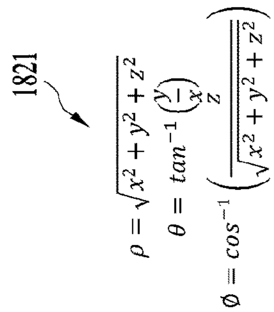

FIG. 21
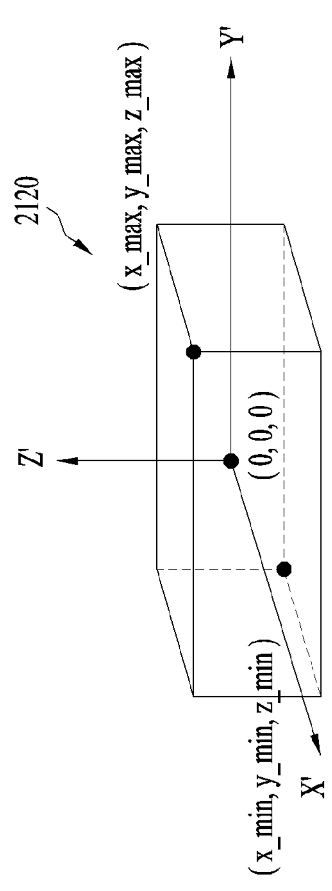
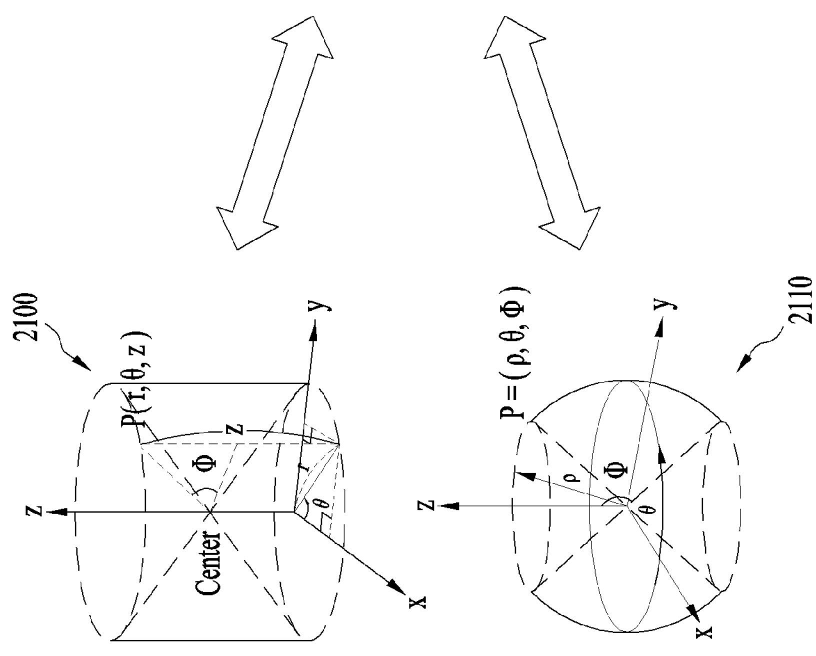

FIG. 22
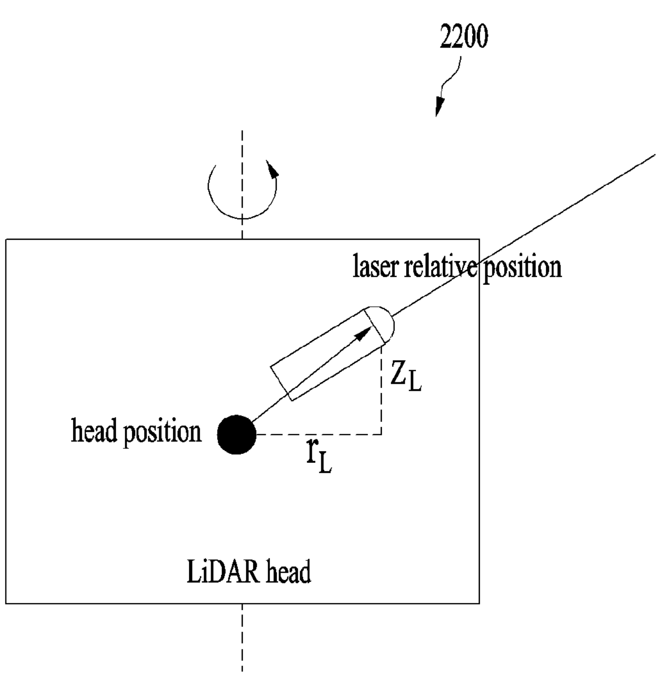
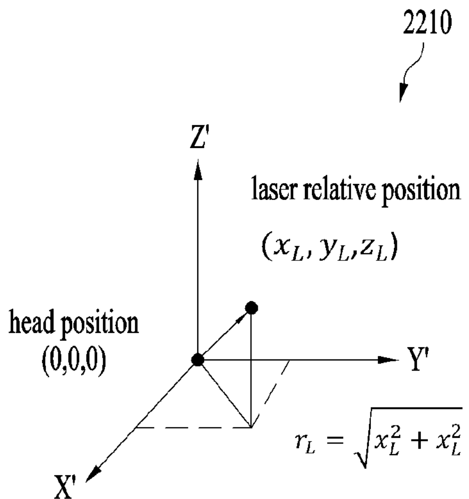

2400
head
2410
Laser n
Laser m
Laser n
Laser m
head position
$(x_c, y_c, z_c)$
X
Y
Z
Ø
θ
$r = \sqrt{x^2 + y^2}$
Coordinate
conversion
2420
Elevation angle
approximation
quantizayion
Laser n
Laser m
2430
Laser angle
Laser index

FIG. 33

| projection_info ( ) { | Descriptor |
|---|---|
| projection_info_id | ue(v) |
| coord_conversion_type | u(4) |
| projection_type | u(4) |
| laser_position_adjustment_flag | u(1) |
| if(laser_position_adjustment_flag) { | |
| num_laser | u(8) |
| for( i=0; i<num_laser; i++) { | |
| r_laser[i] | ue(v) |
| z_laser[i] | ue(v) |
| theta_laser[i] | ue(v) |
| } | |
| } | |
| elevation_index_enable_flag | |
| azimuthal_index_enable_flag | |
| if ( azimuthal_index_enable_flag ) { | |
| num_laser | |
| for( i=0; i<num_laser; i++) { | |
| laser_phi_per_turn[i] | |
| laser_angle_offset[i] | |
| for( j=0; j< laser_phi_per_turn[i]; j++ ) | |
| laser_sampling_angle[i][j] | |
| } | |
| groupnig_rate | |
| } | |
| sampling_adjustment_cubic_flag | u(1) |
| sampling_adjustment_spread_bbox_flag | u(1) |
| sampling_adjustment_type | u(4) |
| geo_projection_enable_flag | u(1) |
| attr_projetion_enable_flag | u(1) |
| bounding_box_x_offset | ue(v) |
| bounding_box_y_offset | ue(v) |
| bounding_box_z_offset | ue(v) |
| bounding_box_x_length | ue(v) |
| bounding_box_y_length | ue(v) |
| bounding_box_z_length | ue(v) |
| orig_bounding_box_x_offset | ue(v) |
| orig_bounding_box_y_offset | ue(v) |
| orig_bounding_box_z_offset | ue(v) |
| orig_bounding_box_x_length | ue(v) |
| orig_bounding_box_y_length | ue(v) |
| orig_bounding_box_z_length | ue(v) |
| rotation_yaw | ue(v) |
| rotation_pitch | ue(v) |
| rotation_roll | ue(v) |

FIG. 34

<table>
<tr><td>rotation_vaw</td><td></td></tr>
<tr><td>rotation_pitch</td><td></td></tr>
<tr><td>rotation_roll</td><td></td></tr>
<tr><td>if (coord_conversion_type == 0 || coord_conversion_type == 2) {</td><td></td></tr>
<tr><td>cylinder_center_x</td><td>ue(v)</td></tr>
<tr><td>cylinder_center_y</td><td>ue(v)</td></tr>
<tr><td>cylinder_center_z</td><td>ue(v)</td></tr>
<tr><td>cylinder_radius_max</td><td>ue(v)</td></tr>
<tr><td>cylinder_degree_max</td><td>ue(v)</td></tr>
<tr><td>cylinder_z_max</td><td>ue(v)</td></tr>
<tr><td>ref_vector_x</td><td>ue(v)</td></tr>
<tr><td>ref_vector_y</td><td>ue(v)</td></tr>
<tr><td>ref_vector_z</td><td>ue(v)</td></tr>
<tr><td>normal_vector_x</td><td>ue(v)</td></tr>
<tr><td>normal_vector_y</td><td>ue(v)</td></tr>
<tr><td>normal_vector_z</td><td>ue(v)</td></tr>
<tr><td>clockwise_degree_flag<br>granurality_radius</td><td>u(1)<br>ue(v)</td></tr>
<tr><td>granurality_angular</td><td>ue(v)</td></tr>
<tr><td>granurality_normal</td><td>ue(v)</td></tr>
<tr><td>}</td><td></td></tr>
<tr><td>else if (coord_conversion_type == 1 ||<br>coord_conversion_type == 3) {</td><td></td></tr>
<tr><td>cylinder_center_x</td><td>ue(v)</td></tr>
<tr><td>cylinder_center_y</td><td>ue(v)</td></tr>
<tr><td>cylinder_center_z</td><td>ue(v)</td></tr>
<tr><td>cylinder_radius_max1</td><td>ue(v)</td></tr>
<tr><td>cylinder_radius_max2</td><td>ue(v)</td></tr>
<tr><td>cylinder_degree_max1</td><td>ue(v)</td></tr>
<tr><td>cylinder_degree_max2</td><td>ue(v)</td></tr>
<tr><td>cylinder_z_max</td><td>ue(v)</td></tr>
<tr><td>ref_vector_x</td><td>ue(v)</td></tr>
<tr><td>ref_vector_y</td><td>ue(v)</td></tr>
<tr><td>ref_vector_z</td><td>ue(v)</td></tr>
<tr><td>normal_vector_x</td><td>ue(v)</td></tr>
<tr><td>normal_vector_y</td><td>ue(v)</td></tr>
<tr><td>normal_vector_z<br>granurality_radius</td><td>ue(v)<br>ue(v)</td></tr>
<tr><td>granurality_angular</td><td>ue(v)</td></tr>
<tr><td>granurality_normal</td><td>ue(v)</td></tr>
<tr><td>}</td><td></td></tr>
<tr><td>}</td><td></td></tr>
</table>

FIG. 35

| seq_parameter_set( ) { | Descriptor |
|---|---|
| profile_compatibility_flags | u(24) |
| level_idc | u(8) |
| sps_bounding_box_present_flag | u(1) |
| if( sps_bounding_box_present_flag ) { | |
| sps_bounding_box_offset_x | se(v) |
| sps_bounding_box_offset_y | se(v) |
| sps_bounding_box_offset_z | se(v) |
| sps_bounding_box_scale_factor | ue(v) |
| sps_bounding_box_size_width | ue(v) |
| sps_bounding_box_size_height | ue(v) |
| sps_bounding_box_size_depth | ue(v) |
| } | |
| sps_source_scale_factor | u(32) |
| sps_seq_parameter_set_id | ue(v) |
| sps_num_attribute_sets | ue(v) |
| for( i = 0; i< sps_num_attribute_sets; i++ ) { | |
| attribute_dimension[ i ] | ue(v) |
| attribute_instance_id[ i ] | ue(v) |
| attribute_bitdepth[ i ] | ue(v) |
| attribute_cicp_colour_primaries[ i ] | ue(v) |
| attribute_cicp_transfer_characteristics[ i ] | ue(v) |
| attribute_cicp_matrix_coeffs[ i ] | ue(v) |
| attribute_cicp_video_full_range_flag[ i ] | u(1) |
| known_attribute_label_flag[ i ] | u(1) |
| if( known_attribute_label_flag[ i ] ) | |
| known_attribute_label[ i ] | ue(v) |
| else | |
| attribute_label_four_bytes[ i ] | u(32) |
| } | |
| sps_Projection_flag | u(1) |
| if(sps_projection_flag) | |
| projection_info ( ) | |
| sps_extension_present_flag | u(1) |
| if( sps_extension_present_flag ) | |
| while( more_data_in_byte_stream( ) ) | |
| sps_extension_data_flag | u(1) |
| byte_alignment( ) | |
| } | |

FIG. 36

| geometry_parameter_set( ) { | Descriptor |
|---|---|
| gps_geom_parameter_set_id | ue(v) |
| gps_seq_parameter_set_id | ue(v) |
| gps_box_present_flag | u(1) |
| if ( gps_box_present_flag ){ | |
| gps_gsh_box_log2_scale_present_flag | u(1) |
| if ( gps_gsh_box_log2_scale_present_flag = = 0 ) | |
| gps_gsh_box_log2_scale | ue(v) |
| } | |
| unique_geometry_points_flag | u(1) |
| geometry_planar_mode_flag | u(1) |
| if( geometry_planar_mode_flag ){ | |
| geom_planar_mode_th_idcm | ue(v) |
| geom_planar_mode_th[ 1 ] | ue(v) |
| geom_planar_mode_th[ 2 ] | ue(v) |
| } | |
| geometry_angular_mode_flag | u(1) |
| if ( geometry_angular_mode_flag ){ | |
| lidar_head_position[0] | se(v) |
| lidar_head_position[1] | se(v) |
| lidar_head_position[2] | se(v) |
| number_lasers | ue(v) |
| for( i = 0; i < number_lasers; i++ ) { | |
| laser_angle[ i ] | se(v) |
| laser_correction[ i ] | se(v) |
| } | |
| planar_buffer_disabled | u(1) |
| implicit_qtbt_angular_max_node_min_dim_log2_to_split_z | se(v) |
| implicit_qtbt_angular_max_diff_to_split_z | se(v) |
| } | |
| neighbour_context_restriction_flag | u(1) |
| inferred_direct_coding_mode_enabled_flag | u(1) |
| bitwise_occupancy_coding_flag | u(1) |
| adjacent_child_contextualization_enabled_flag | u(1) |
| log2_neighbour_avail_boundary | ue(v) |
| log2_intra_pred_max_node_size | ue(v) |
| log2_trisoup_node_size | ue(v) |
| geom_scaling_enabled_flag | u(1) |
| if ( geom_scaling_enabled_flag ) | |
| geom_base_qp | ue(v) |
| gps_implicit_geom_partition_flag | u(1) |
| if ( gps_implicit_geom_partition_flag ) { | |
| gps_max_num_implicit_qtbt_before_ot | ue(v) |
| gps_min_size_implicit_qtbt | ue(v) |
| } | |
| if( sps_projection_flag ) | |
| sps_seq_parameter_set_id | |
| else { | |
| gps_projection_param_present_flag | |
| if( gps_projection_param_present_flag ) | |
| projection_info ( ) | |
| } | |
| gps_extension _flag | u(1) |
| if ( gps_extension _flag ) | |
| while( more_data_in_byte_stream ( ) ) | |
| gps_extension_data_flag | u(1) |
| byte_alignment( ) | |
| } | |

FIG. 37

| attribute_parameter_set ( ) { | Descriptor |
|---|---|
| aps_attr_parameter_set_id | ue(v) |
| aps_seq_parameter_set_id | ue(v) |
| attr_coding_type | ue(v) |
| aps_attr_initial_qp | ue(v) |
| aps_attr_chroma_qp_offset | se(v) |
| aps_slice_qp_delta_present_flag | u(1) |
| LodParametersPresent = ( attr_coding_type == 0 \|\| attr_coding_type == 2 ) ? 1 : 0 | |
| if ( LodParametersPresent) { | |
| lifting_num_pred_nearest_neighbours_minus1 | ue(v) |
| lifting_search_range_minus1 | ue(v) |
| for ( k = 0; k < 3; k++ ) | |
| lifting_neighbour_bias[ k ] | ue(v) |
| if ( attr_coding_type == 2 ) | |
| lifting_scalability_enabled_flag | u(1) |
| if ( ! lifting_scalability_enabled_flag ) {<br>lifting_num_detail_levels_minus1<br>[Ed. The V7.0 code use the variable without minus1. It should be aligned] | ue(v) |
| if ( lifting_num_detail_levels_minus1 > 0 ) { | |
| lifting_lod_regular_sampling_enabled_flag | u(1) |
| for ( idx = 0; idx < num_detail_levels_minus1; idx++ ) { | |
| if ( lifting_lod_regular_sampling_enabled_flag ) | |
| lifting_sampling_period_minus2[ idx ] | ue(v) |
| else | |
| lifting_sampling_distance_squared_scale_minus1[ idx ] | ue(v) |
| if ( idx != 0 ) | |
| lifting_sampling_distance_squared_offset[ idx ]<br>} | ue(v) |
| } | |
| } | |
| if ( attr_coding_type == 0 ) { | |
| lifting_adaptive_prediction_threshold | ue(v) |
| lifting_intra_lod_prediction_num_layers | ue(v) |
| lifting_max_num_direct_predictors | ue(v) |
| inter_component_prediction_enabled_flag | u(1) |
| } | |
| } | |
| if ( attribute_coding_type == 1 ) { //RAHT<br>raht_prediction_enabled_flag | u(1) |
| if (raht_prediction_enabled_f lag) { | |
| raht_prediction_threshold0 | ue(v) |
| raht_prediction_threshold1 | ue(v) |
| } | |
| if( sps_projection_flag ) | |
| sps_seq_parameter_set_id | |
| else if(gps_projection_param_present_flag ) | |
| gps_geom_parameter_set_id | |
| else { | |
| aps_projection_param_present_flag<br>if(aps_projection_param_present_flag ) | |
| projection_info ( ) | |
| } | |
| .... | |
| aps_extension _flag | u(1) |
| if( aps_extension _flag ) | |
| while( more_data_in_byte_stream( ) ) | |
| aps_extension_data_flag | u(1) |
| byte_alignment( ) | |
| } | |

FIG. 38

| tile_inventory( ) { | Descriptor |
|---|---|
| num_tiles | ue(v) |
| for( i = 0; i < num_tiles; i++ ) {<br>tile_bounding_box_offset_x[ i ] | <br>se(v) |
| tile_bounding_box_offset_y[ i ] | se(v) |
| tile_bounding_box_offset_z[ i ] | se(v) |
| tile_bounding_box_size_width[ i ] | ue(v) |
| tile_bounding_box_size_height[ i ] | ue(v) |
| tile_bounding_box_size_depth[ i ] | ue(v) |
| projection_flag | u(1) |
| if(projection_flag)<br>projection_info ( ) | |
| } | |
| byte_alignment( ) | |
| } | |

FIG. 39

| geometry_slice_bitstream( ) { | Descriptor |
|---|---|
| geometry_slice_header( ) | |
| geometry_slice_data( ) | |
| } | |

FIG. 40

| geometry_slice_header( ) { | Descriptor |
|---|---|
| gsh_geometry_parameter_set_id | ue(v) |
| gsh_tile_id | ue(v) |
| gsh_slice_id | ue(v) |
| frame_idx | u(n) |
| gsh_num_points | u(24) |
| if( gps_box_present_flag ) { | |
| if( gps_gsh_box_log2_scale_present_flag )<br>gsh_box_log2_scale | ue(v) |
| gsh_box_origin_x | ue(v) |
| gsh_box_origin_y | ue(v) |
| gsh_box_origin_z | ue(v) |
| }<br>if ( gps_implicit_geom_partition_flag ) { | |
| gsh_log2_max_nodesize_x | ue(v) |
| gsh_log2_max_nodesize_y_minus_x | se(v) |
| gsh_log2_max_nodesize_z_minus_y | se(v) |
| } else { | |
| gsh_log2_max_nodesize | ue(v) |
| } | |
| if( geom_scaling_enabled_flag ) { | |
| geom_slice_qp_offset | se(v) |
| geom_octree_qp_offsets_enabled_flag | u(1) |
| if( geom_octree_qp_offsets_enabled_flag ) | |
| geom_octree_qp_offsets_depth | ue(v) |
| } | |
| projection_flag | |
| if(projection_flag) | |
| projection_info ( ) | |
| byte_alignment( ) | |
| } | |

FIG. 41

| geometry_slice_data( ) { | Descriptor |
|---|---|
| for( depth = 0; depth < MaxGeometryOctreeDepth; depth++ ) { | |
| for( nodeIdx = 0; nodeIdx < NumNodesAtDepth[ depth ]; nodeIdx++ ) { | |
| xN = NodeX[ depth ][ nodeIdx ] | |
| yN = NodeY[ depth ][ nodeIdx ] | |
| zN = NodeZ[ depth ][ nodeIdx ] | |
| geometry_node( depth, nodeIdx, xN, yN, zN ) | |
| } | |
| } | |
| if ( log2_trisoup_node_size > 0 ) | |
| geometry_trisoup_data( ) | |
| } | |

FIG. 42

| attribute_slice_bitstream( ) { | Descriptor |
| --- | --- |
| attribute_slice_header( ) | |
| attribute_slice_data( ) <br> } | |

FIG. 43

| attribute_slice_header( ) { | Descriptor |
| --- | --- |
| ash_attr_parameter_set_id | ue(v) |
| ash_attr_sps_attr_idx | ue(v) |
| ash_attr_geom_slice_id | ue(v) |
| if ( aps_slice_qp_delta_present_flag ) { | |
| ash_qp_delta_luma | se(v) |
| ash_qp_delta_chroma | se(v) |
| } | |
| projection_flag | u(1) |
| if(projection_flag) | |
| projection_info ( ) | |
| byte_alignment( ) | |
| } | |

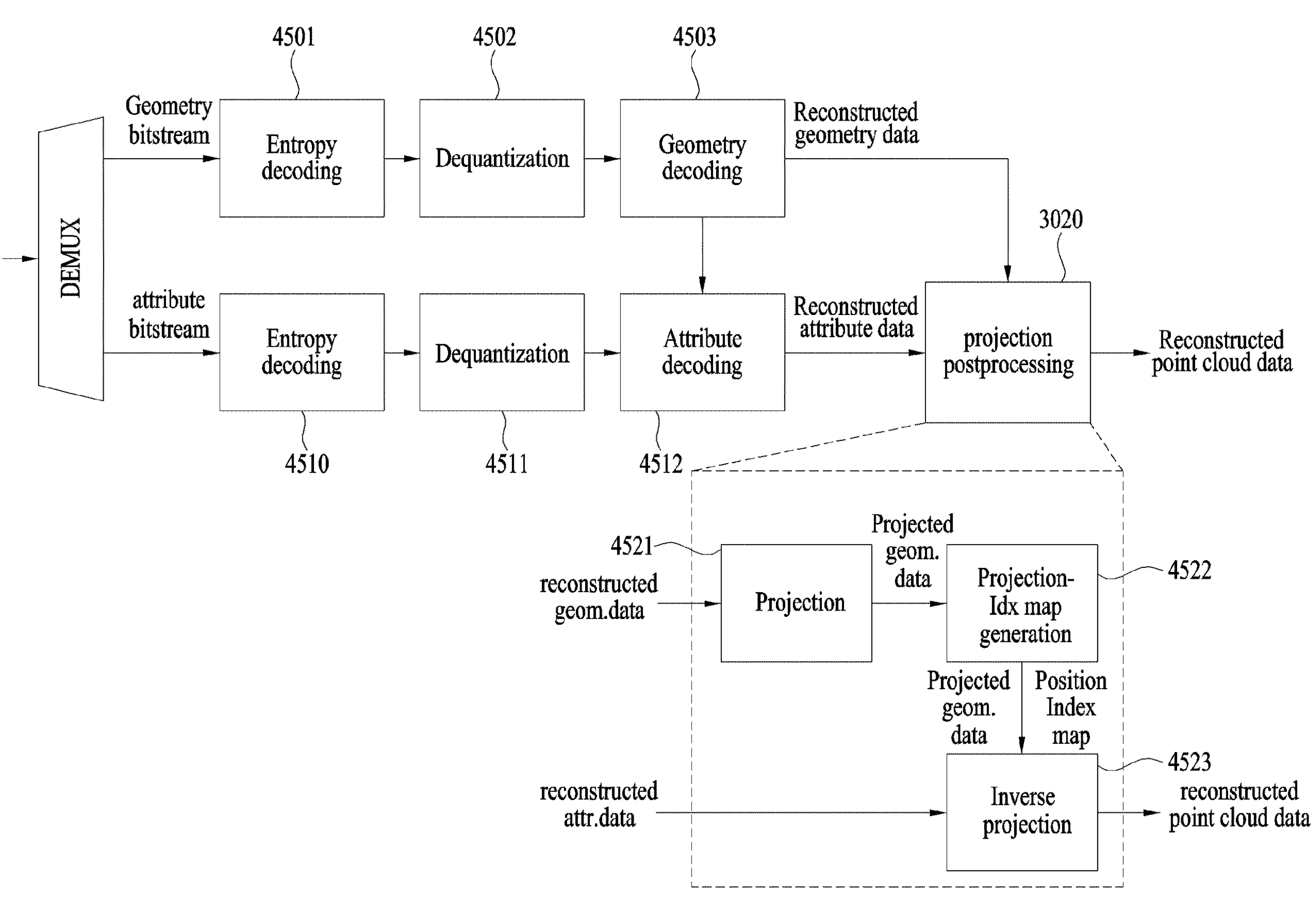
FIG. 45
DEMUX
Geometry bitstream
attribute bitstream
4501
Entropy decoding
4502
Dequantization
4503
Geometry decoding
4510
Entropy decoding
4511
Dequantization
4512
Attribute decoding
Reconstructed geometry data
Reconstructed attribute data
3020
projection postprocessing
Reconstructed point cloud data
4521
reconstructed geom.data
Projection
Projected geom. data
4522
Projection-Idx map generation
Projected geom. data
Position Index map
4523
reconstructed attr.data
Inverse projection
reconstructed point cloud data

FIG. 50

| C2_ai | lossy geometry, lossy attributes [all intra] | | | | | |
|---|---|---|---|---|---|---|
| | End-to-End BD-AttrRate [%] | | | | Geom. BD-TotGeomRate [%] | |
| | Luma | Chroma Cb | Chroma Cr | Reflectance | D1 | D2 |
| Cat1-A average | | | | | | |
| Cat1-B average | | | | | | |
| Cat3-fused average | | | | | | |
| Cat3-frame average | | | | 0.6% | -9.1% | -8.9% |
| Overall average | | | | 0.6% | -9.1% | -8.9% |
| Avg. Enc Time [%] | 95% | | | | | |
| Avg. Dec Time [%] | 100% | | | | | |

| CW_ai | lossless geometry, lossless attributes [all intra] | | | |
|---|---|---|---|---|
| | bpip ratio [%] | | | |
| | Geometry | Colour | Reflectance | Total |
| Cat1-A average | | | | |
| Cat1-B average | | | | |
| Cat3-fused average | | | | |
| Cat3-frame average | 112.1% | | 100.0% | 109.6% |
| Overall average | 112.1% | | 100.0% | 109.6% |
| Avg. Enc Time [%] | 100% | | | |
| Avg. Dec Time [%] | 100% | | | |

FIG. 51

| C2_ai | Total | | Geometry | |
|---|---|---|---|---|
| | Avg. Enc Time [%] | Avg. Dec Time [%] | Avg. Enc Time [%] | Avg. Dec Time [%] |
| Cat1-A average | | | | |
| Cat1-B average | | | | |
| Cat3-fused average | | | | |
| Cat3-frame average | 95% | 100% | 81% | 99% |

| CW_ai | Total | | Geometry | |
|---|---|---|---|---|
| | Avg. Enc Time [%] | Avg. Dec Time [%] | Avg. Enc Time [%] | Avg. Dec Time [%] |
| Cat1-A average | | | | |
| Cat1-B average | | | | |
| Cat3-fused average | | | | |
| Cat3-frame average | 100% | 100% | 100% | 102% |

FIG. 52

C2_ai-lossy geometry, lossy attribute

| Class | Sequence | shift in G:T bits ratio [pp] | shift in G:T bits ratio [pp] | Geom. BD-TotGeomRate | | End-to-End BD-AttrRate [%] | | | | Geom. BD-TotGeomRate | | End-to-End BD-AttrRate [%] | | | |
|---|---|---|---|---|---|---|---|---|---|---|---|---|---|---|---|
| | | | | D1 | D2 | Luma | Chroma Cb | Chroma Cr | Reflectance | D1 | D2 | Luma | Chroma Cb | Chroma Cr | Reflectance |
| cat3-frame | ford_01_q1mm | 0% | 0% | -2.0% | 0% | | | | 1.8% | -1.2% | 0.4% | | | | -8.0% |
| | ford_02_q1mm | 0% | 0% | -2.3% | 0% | | | | 1.4% | -1.4% | 0.6% | | | | -8.3% |
| | ford_03_q1mm | 0% | 0% | -1.8% | 0% | | | | 0.6% | -1.2% | -0.2% | | | | -8.7% |
| | qnxadas-junction-approach | -1% | -1% | -14.4% | -1% | | | | 0.0% | -13.8% | -14.4% | | | | -12.4% |
| | qnxadas-junction-exit | -1% | -1% | -14.4% | -1% | | | | 0.4% | -13.7% | -14.2% | | | | -12.8% |
| | qnxadas-motorway-join | -1% | -1% | -14.0% | -1% | | | | 0.2% | -13.4% | -14.1% | | | | -12.1% |
| | qnxadas-motorway-bends | -1% | -1% | -14.6% | -1% | | | | 0.1% | -14.0% | -15.2% | | | | -12.2% |
| | Cat3-frame average | | -1% | -9.1% | -8.9% | | | | 0.6% | -8.4% | -8.1% | | | | -10.6% |
| | Overall average | | | -9.1% | -8.9% | | | | 0.6% | -8.4% | -8.1% | | | | -10.6% |

FIG. 53

| Cw_ai-lossless geometry, lossless attribute | | | | | | | |
|---|---|---|---|---|---|---|---|
| Class | Sequence | bpip ratio [%] | | | | shift in G:T bits ratio [pp] | shift in G:T bits ratio [pp] |
| | | Total | Geometry | Colour | Reflectance | | |
| cat3-frame | ford_01_q1mm | 124.1% | 132.2% | | 100.0% | 5% | 5% |
| | ford_02_q1mm | 124.1% | 132.5% | | 100.0% | 5% | 5% |
| | ford_03_q1mm | 1224.% | 129.8% | | 100.0% | 5% | 5% |
| | qnxadas-junction-approach | 93.0% | 91.3% | | 100.0% | -1% | -1% |
| | qnxadas-junction-exit | 92.2% | 91.0% | | 100.0% | -1% | -1% |
| | qnxadas-motorway-join | 92.8% | 91.6% | | 100.0% | -1% | -1% |
| | qnxadas-motorway-bends | 93.7% | 92.3% | | 100.0% | -1% | -1% |
| | Cat3-fused average | | | | | | |
| | Cat3-frame average | 109.6% | 112.1% | | 100.0% | | 1% |
| | Overall average | 109.6% | 112.1% | | 100.0% | | |

FIG. 54

| attribute_parameter_set() { | Descriptor |
|---|---|
| ... | |
| attr_coord_conv_enable_flag | u(1) |
| if(attr_coord_conv_enable_flag) { | |
| for( i = 0; i < 3; i++) | |
| attr_coord_conv_scale[i] | ue(v) |
| } | |
| ... | |
| } | |

POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

This application is a National Phase application under 35 U.S.C. 371 of International Application No. PCT/KR2021/013833, filed on Oct. 7, 2021, which claims the benefit of U.S. Provisional Application Nos. 63/088,999, filed on Oct. 7, 2020, the contents of which are incorporated by reference herein in their entirety.

TECHNICAL FIELD

Embodiments relate to a method and apparatus for processing point cloud content.

BACKGROUND ART

Point cloud content is content represented by a point cloud, which is a set of points belonging to a coordinate system representing a three-dimensional space (or volume). The point cloud content may express media configured in three dimensions, and is used to provide various services such as virtual reality (VR), augmented reality (AR), mixed reality (MR), extended reality (XR), and self-driving services. However, tens of thousands to hundreds of thousands of point data are required to represent point cloud content. Therefore, there is a need for a method for efficiently processing a large amount of point data.

DISCLOSURE

Technical Problem

An object of the present disclosure devised to solve the above-described problems is to provide a point cloud data transmission device, a point cloud data transmission method, a point cloud data reception device, and a point cloud data reception method for efficiently transmitting and receiving a point cloud.

Another object of the present disclosure is to provide a point cloud data transmission device, a point cloud data transmission method, a point cloud data reception device, and a point cloud data reception method for addressing latency and encoding/decoding complexity.

Another object of the present disclosure is to provide a point cloud data transmission device, a point cloud data transmission method, a point cloud data reception device, and a point cloud data reception method for efficiently transmitting and receiving a geometry-point cloud compression (G-PCC) bitstream.

Another object of the present disclosure is to provide a point cloud data transmission device, a point cloud data transmission method, a point cloud data reception device, and a point cloud data reception method for increasing compression efficiency of point cloud data by encoding and decoding attribute information on a projection basis.

The objects of the present disclosure are not limited only what has been described hereinabove and the scope of the present disclosure may be extended to other objects that may be inferred by those skilled in the art based on the entire contents of the present document.

Technical Solution

The object of the present disclosure can be achieved by providing a method of transmitting point cloud data. The method may include encoding geometry data of point cloud data, encoding attribute data of the point cloud data based on the geometry data, and transmitting the encoded geometry data, the encoded attribute data, and signaling data. The encoding of the geometry data may include converting coordinates of the geometry data from a first coordinate system to a second coordinate system.

In one embodiment, the first coordinate system may be a Cartesian coordinate system, and the second coordinate system may have coordinates of (radius, angular index, laser index).

In one embodiment, the point cloud data may be acquired by one or more lasers, wherein the angular index may be acquired based on the number of times of sampling per horizontal turn of the lasers.

In one embodiment, the signaling data contains information for identifying the number of times of sampling per horizontal turn of the lasers.

In one embodiment, the encoding of the geometry data may include generating a predictive tree based on the geometry data converted to the second coordinate system, performing prediction based on the predictive tree, and compressing the geometry data.

A device for transmitting point cloud data according to embodiments may include a geometry encoder configured to encode geometry data of point cloud data, an attribute encoder configured to encode attribute data of the point cloud data based on the geometry data, and a transmitter configured to transmit the encoded geometry data, the encoded attribute data, and signaling data, wherein the geometry encoder may convert coordinates of the geometry data from a first coordinate system to a second coordinate system for compression of the geometry data.

In one embodiment, the first coordinate system may be a Cartesian coordinate system and the second coordinate system may have coordinates of (radius, angular index, laser index).

In one embodiment, the point cloud data may be acquired by one or more lasers, wherein the angular index may be acquired based on the number of times of sampling per horizontal turn of the lasers.

In one embodiment, the signaling data may contain information for identifying the number of times of sampling per horizontal turn of the lasers.

In one embodiment, the geometry encoder is configured to generate a predictive tree based on the geometry data converted to the second coordinate system, perform prediction based on the predictive tree, and compress the geometry data.

A method of receiving point cloud data according to embodiments may include receiving geometry data, attribute data, and signaling data, decoding the geometry data based on the signaling data, decoding the attribute data based on the signaling data and the decoded geometry data, and rendering the decoded point cloud data based on the signaling data, wherein the decoding of the geometry data may include converting coordinates of the decoded geometry data from a first coordinate system to a second coordinate system.

In one embodiment, the first coordinate system may be a coordinate system having coordinates of (radius, angular index, laser index), and the second coordinate system may be a Cartesian coordinate system.

In one embodiment, the angular index may be acquired based on the number of times of sampling per horizontal turn of a corresponding laser.

In one embodiment, the signaling data may contain information for identifying the number of times of sampling per horizontal turn of the corresponding laser.

In one embodiment, the decoding of the geometry data may include generating a predictive tree based on the geometry data in the first coordinate system, performing prediction based on the predictive tree and reconstructing the geometry data, and converting coordinates of the reconstructed geometry data into the second coordinate system.

Advantageous Effects

A point cloud data transmission method, a point cloud data transmission device, a point cloud data reception method, and a point cloud data reception device according to embodiments may provide a good-quality point cloud service.

A point cloud data transmission method, a point cloud data transmission device, a point cloud data reception method, and a point cloud data reception device according to embodiments may achieve various video codec methods.

A point cloud data transmission method, a point cloud data transmission device, a point cloud data reception method, and a point cloud data reception device according to embodiments may provide universal point cloud content such as a self-driving service (or an autonomous driving service).

A point cloud data transmission method, a point cloud data transmission device, a point cloud data reception method, and a point cloud data reception device according to embodiments may perform space-adaptive partition of point cloud data for independent encoding and decoding of the point cloud data, thereby improving parallel processing and providing scalability.

A point cloud data transmission method, a point cloud data transmission device, a point cloud data reception method, and a point cloud data reception device according to embodiments may perform encoding and decoding by partitioning the point cloud data in units of tiles and/or slices, and signal necessary data therefore, thereby improving encoding and decoding performance of the point cloud.

A point cloud data transmission method, point cloud data transmission device, point cloud data reception method, and point cloud data reception device according to embodiments may increase the compression efficiency of the geometry by applying an improved coordinate system in prediction-based geometry coding.

A point cloud data transmission method, point cloud data transmission device, point cloud data reception method, and point cloud data reception device according to embodiments may be more effective for compressing category 3, that is, LiDAR data.

DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure.

FIG. 3 illustrates an exemplary process of capturing a point cloud video according to embodiments.

FIG. 7 illustrates an example of a neighbor node pattern according to embodiments.

FIG. 18 is a diagram illustrating an example of coordinate conversion of point cloud data according to embodiments.

FIG. 21 is a diagram illustrating an example of a coordinate projection of point cloud data according to embodiments.

FIG. 22 is a diagram illustrating an example of adjustment of a laser position of point cloud data according to embodiments.

FIG. 23 is a diagram illustrating an example of voxelization according to embodiments.

FIGS. 33 and 34 show an example of a syntax structure of projection related signaling information (projection_info( )) according to embodiments.

FIG. 35 shows an embodiment of a syntax structure of a sequence parameter set according to embodiments.

FIG. 36 shows an example of a syntax structure of a geometry parameter set according to embodiments.

FIG. 37 shows an example of a syntax structure of an attribute parameter set.

FIG. 38 shows an example of a syntax structure of a tile parameter set according to embodiments.

FIG. 39 shows an example of a syntax structure of a geometry slice bitstream (according to embodiments.

FIG. 40 shows an example of a syntax structure of a geometry slice header according to embodiments.

FIG. 41 shows an example of a syntax structure of geometry slice data according to embodiments.

FIG. 42 shows an example of a syntax structure of an attribute slice bitstream( ) according to embodiments.

FIG. 43 shows an example of a syntax structure of an attribute slice header according to embodiments.

FIG. 45 is a block diagram illustrating an example of operations of a point cloud reception device according to embodiments.

FIGS. 50 to 53 are tables showing a summary of the experimental results of lossy compression and lossless compression of coordinate conversion applied to geometry and/or attribute coding according to embodiments.

FIG. 54 shows an example of a syntax structure in which an attr_coord_conv_enable_flag field that may be included in the APS.

BEST MODE

Figure 1:
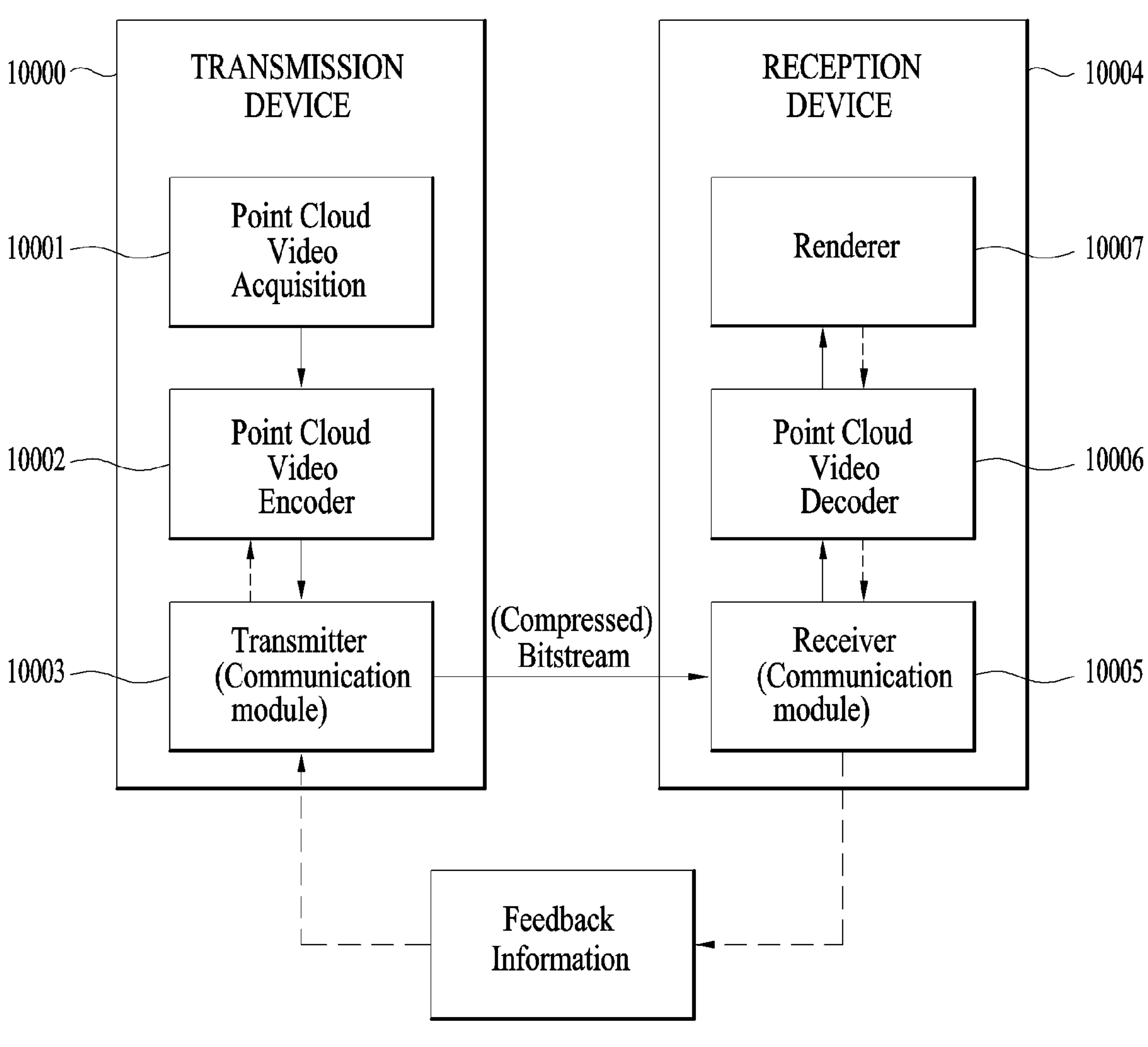
FIG. 1 illustrates an exemplary point cloud content providing system according to embodiments.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. It should be noted that the following examples are only for embodying the present disclosure and do not limit the scope of the present disclosure. What can be easily inferred by an expert in the technical field to which the present disclosure belongs from the detailed description and examples of the present disclosure is to be interpreted as being within the scope of the present disclosure.

The detailed description in this present specification should be construed in all aspects as illustrative and not restrictive. The scope of the disclosure should be determined by the appended claims and their legal equivalents, and all changes coming within the meaning and equivalency range of the appended claims are intended to be embraced therein.

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details. Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings. In addition, the following drawings and detailed description should not be construed as being limited to the specifically described embodiments, but should be construed as including equivalents or substitutes of the embodiments described in the drawings and detailed description.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquisition unit 10001, a point cloud video encoder 10002, and/or a transmitter (or communication module) 10003.

The point cloud video acquisition unit 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding.

The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (e.g., a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (e.g., a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component or module) separate from the receiver 10005.

The point cloud video decoder 10006 decodes the bitstream containing the point cloud video data. The point cloud video decoder 10006 may decode the point cloud video data according to the method by which the point cloud video data is encoded (for example, in a reverse process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. According to an embodiment, the renderer 10007 may render the decoded point cloud data according to a viewport. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to the embodiments may represent information about a position, orientation, angle, and motion of a user's head. The reception device 10004 according to the embodiments may calculate viewport information based on the head orientation information. The viewport information is information about a region of a point cloud video that the user is viewing (that is, a region that the user is currently viewing). That is, the viewport information is information about a region that the user is currently viewing in the point cloud video. In other words, the viewport or viewport region may represent a region that the user is viewing in the point cloud video. A viewpoint is a point that the user is viewing in the point cloud video, and may represent a center point of the viewport region. That is, the viewport is a region centered on a viewpoint, and the size and shape of the region may be determined by a field of view (FOV). Accordingly, the reception device 10004 may extract the viewport information based on a vertical or horizontal FOV supported by the device as well as the head orientation information. In addition, the reception device 10004 may perform gaze analysis or the like based on the head orientation information and/or the viewport information to determine the way the user consumes a point cloud video, a region that the user gazes at in the point cloud video, and the gaze time. According to embodiments, the reception device 10004 may transmit feedback information including the result of the gaze analysis to the transmission device 10000. According to embodiments, a device such as a VR/XR/AR/MR display may extract a viewport region based on the position/orientation of a user's head and a vertical or horizontal FOV supported by the device. According to embodiments, the head orientation information and the viewport information may be referred to as feedback information, signaling information, or metadata.

The feedback information according to the embodiments may be acquired in the rendering and/or display process. The feedback information may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The feedback information may not only be transmitted to the transmitting side, but also be consumed by the receiving side. That is, the point cloud content providing system may process (encode/decode/render) point cloud data based on the feedback information. For example, the point cloud video decoder 10006 and the renderer 10007 may preferentially decode and render only the point cloud video for a region currently viewed by the user, based on the feedback information, that is, the head orientation information and/or the viewport information.

The reception device 10004 may transmit the feedback information to the transmission device 10000. The transmission device 10000 (or the point cloud video encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmitting device, a transmitter, a transmission system, or the like, and the reception device 10004 may be called a decoder, a receiving device, a receiver, a reception system, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
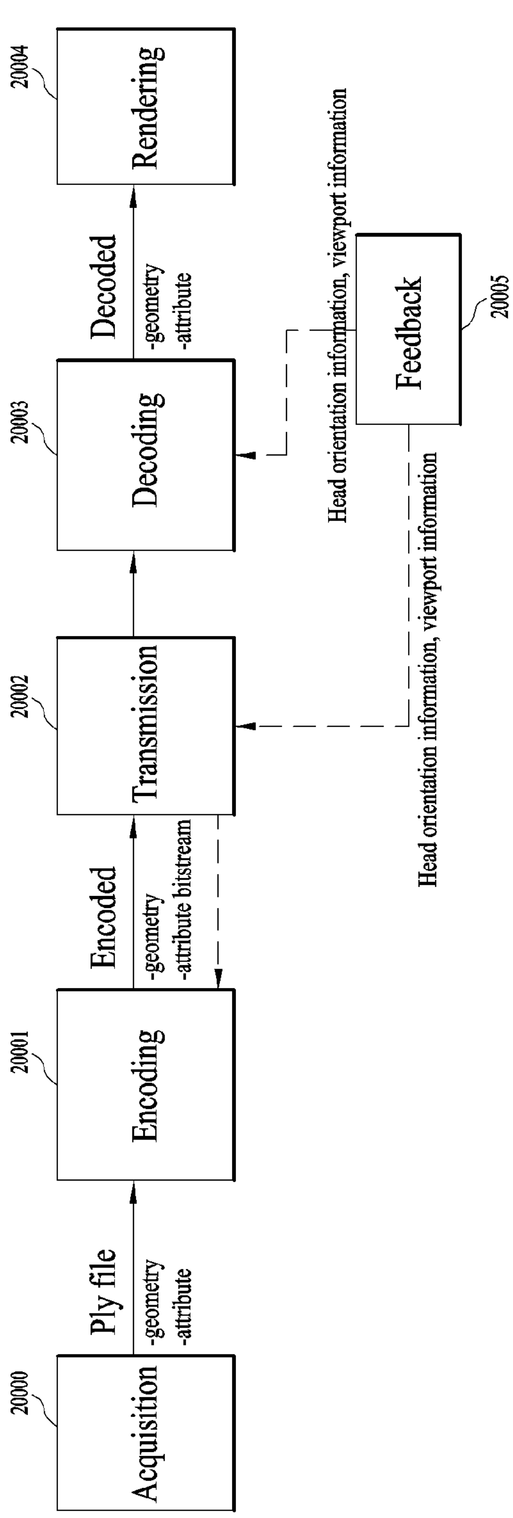
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC). The point cloud content providing system according to the embodiments (e.g., the point cloud transmission device 10000 or the point cloud video acquisition unit 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (e.g., values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like.

The point cloud content providing system (e.g., the point cloud transmission device 10000 or the point cloud video acquisition unit 10001) may secure point cloud data from information (e.g., depth information, color information, etc.) related to the acquisition process of the point cloud video.

The point cloud content providing system (e.g., the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (e.g., the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (e.g., signaling information related to the geometry encoding and the attribute encoding). The point cloud content providing system may encapsulate a bitstream that carries the encoded point cloud data and transmit the same in the form of a file or segment.

The point cloud content providing system (e.g., the reception device 10004 or the receiver 10005) according to the embodiments may receive the bitstream containing the encoded point cloud data. In addition, the point cloud content providing system (e.g., the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (e.g., the reception device 10004 or the point cloud video decoder 10005) may decode the point cloud video data based on the signaling information related to encoding of the point cloud video data contained in the bitstream. The point cloud content providing system (e.g., the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (e.g., the reception device 10004 or the point cloud video decoder 10005) may reconstruct the point cloud video based on the positions according to the reconstructed geometry and the decoded attributes.

The point cloud content providing system according to the embodiments (e.g., the reception device 10004 or the renderer 10007) may render the decoded point cloud data (20004). The point cloud content providing system (e.g., the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (e.g., the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in FIG. 3, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (e.g., a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
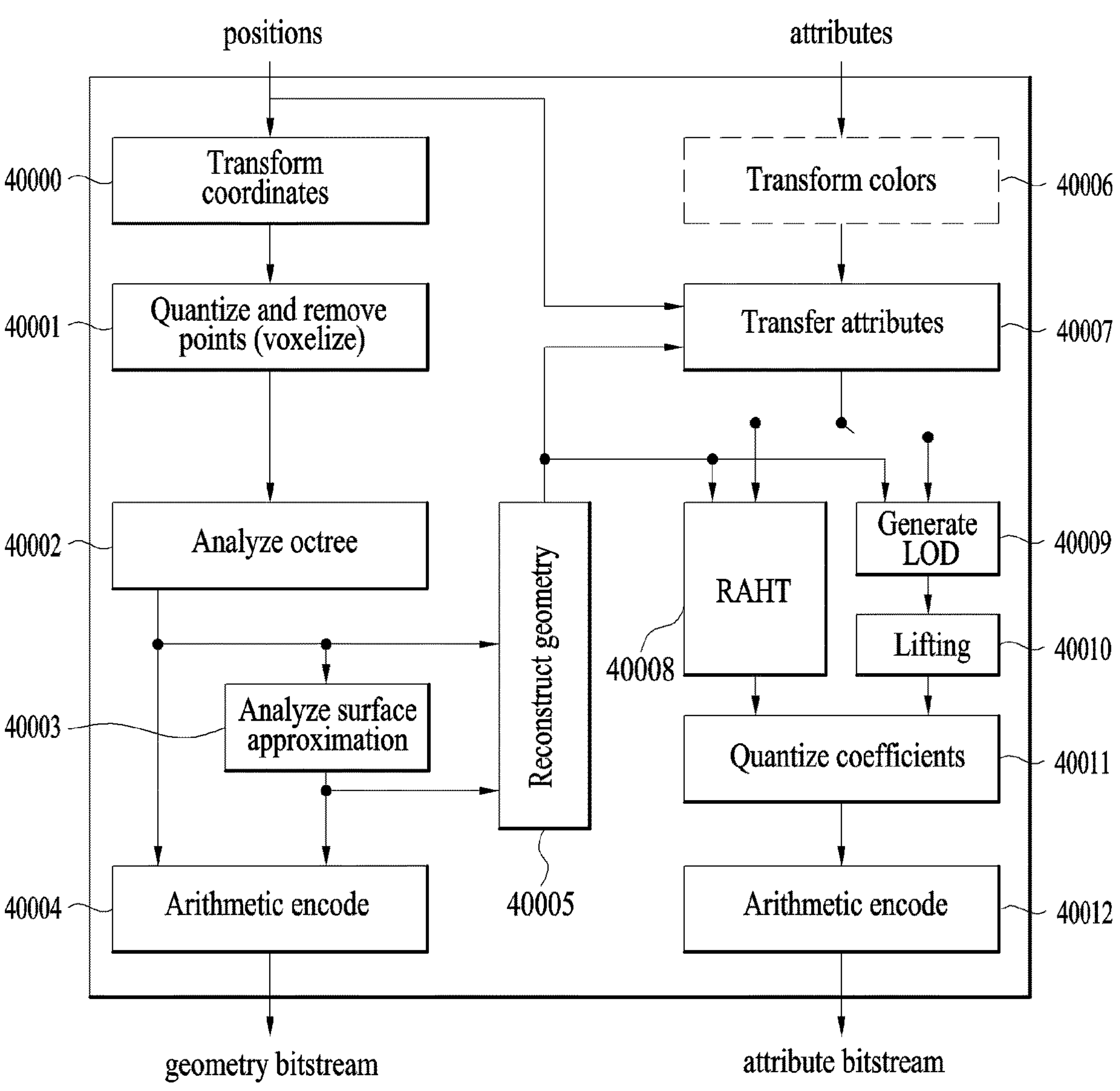
FIG. 4 illustrates an exemplary block diagram of point cloud video encoder according to embodiments.

FIG. 4 illustrates an exemplary point cloud video encoder according to embodiments.

FIG. 4 shows an example of the point cloud video encoder 10002 of FIG. 1. The point cloud video encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 and 2, the point cloud video encoder may perform geometry encoding and attribute encoding. The geometry encoding is performed before the attribute encoding.

The point cloud video encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometry reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (e.g., a three-dimensional space represented by an XYZ coordinate system). The position information in the three-dimensional space according to the embodiments may be referred to as geometry information.

The quantizer 40001 according to the embodiments quantizes the geometry information. For example, the quantizer 40001 may quantize the points based on a minimum position value of all points (e.g., a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. The voxelization means a minimum unit representing position information in 3D space. Points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center point of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (e.g., from RGB to YCbCr). The operation of the color transformer 40006 according to embodiments may be optionally applied according to the color values included in the attributes.

The geometry reconstructor 40005 according to the embodiments reconstructs (decompresses) the octree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) can be performed quickly. The Morton code is generated by presenting coordinates (e.g., (x, y, z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD). The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud video encoder of FIG. 4 may be implemented by hardware including one or more processors or integrated circuits configured to communicate with one or more memories included in the point cloud content providing apparatus, software, firmware, or a combination thereof. The one or more processors may perform at least one of the operations and/or functions of the elements of the point cloud video encoder of FIG. 4 described above. Additionally, the one or more processors may operate or execute a set of software programs and/or instructions for performing the operations and/or functions of the elements of the point cloud video encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
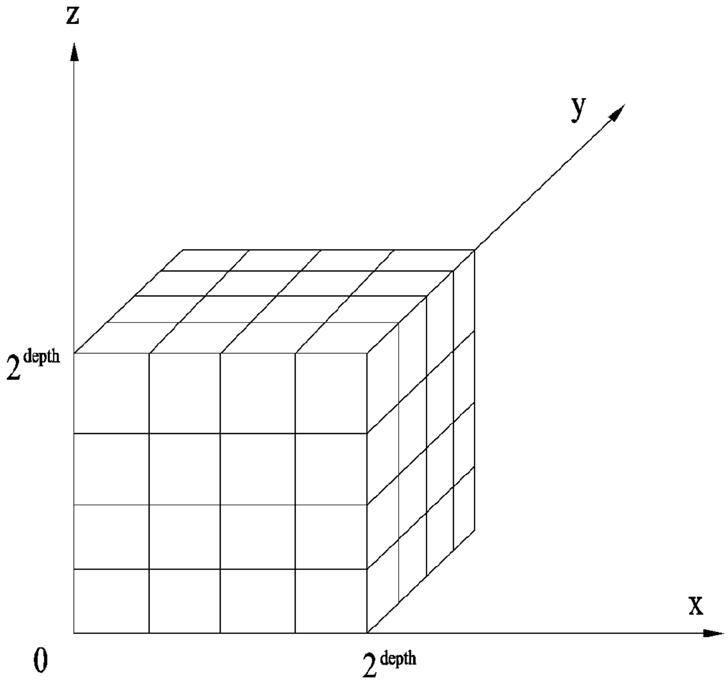
FIG. 5 illustrates an example of voxels in a 3D space according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud video encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and ($2^d$, $2^d$, $2^d$) is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

Figure 6:
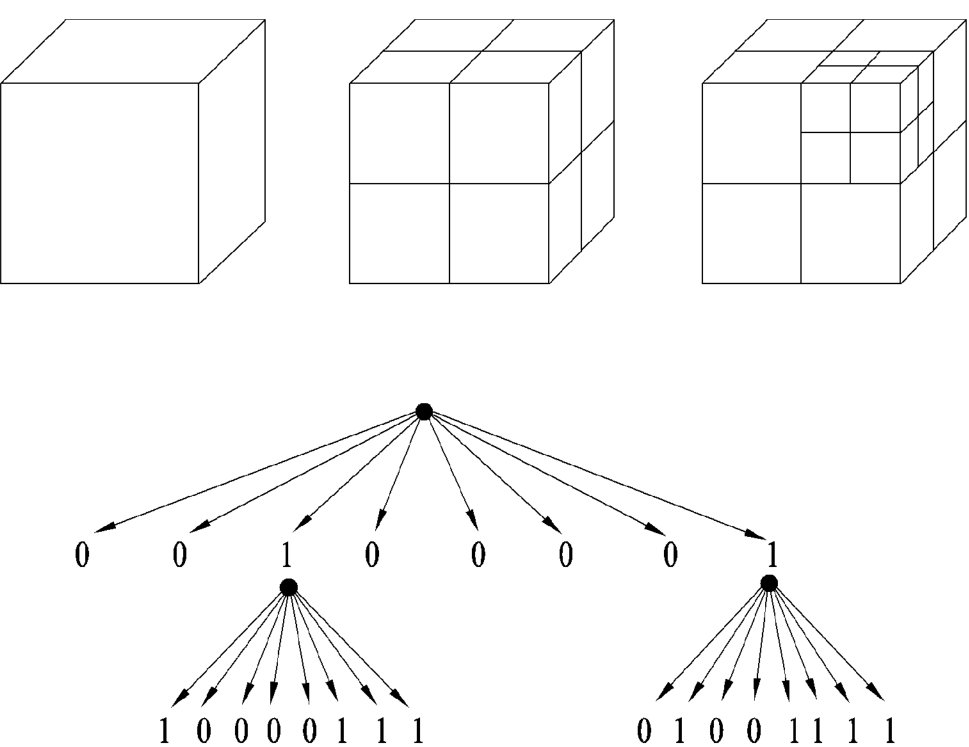
FIG. 6 illustrates an example of octree and occupancy code according to embodiments.

FIG. 6 shows an example of an octree and occupancy code according to embodiments.

As described with reference to FIGS. 1 to 4, the point cloud content providing system (point cloud video encoder 10002) or the octree analyzer 40002 of the point cloud video encoder performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and ($2^d$, $2^d$, $2^d$) Here, $2^d$ may be set to a value constituting the smallest bounding box surrounding all points of the point cloud content (or point cloud video). Here, d denotes the depth of the octree. The value of d is determined in Equation 1. In Equation 1, $$\left(x_n^{int}, y_n^{int}, z_n^{int}\right)$$

denotes the positions (or position values) of quantized points.

$$d = \mathrm{Ceil}\left(\mathrm{Log2}\left(\mathrm{Max}\left(x_n^{int}, y_n^{int}, z_n^{int}, n = 1, \ldots, N\right) + 1\right)\right) \quad \text{Equation 1}$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud video encoder (e.g., the arithmetic encoder 40004) according to the embodiments may perform entropy encoding on the occupancy codes. In order to increase the compression efficiency, the point cloud video encoder may perform intra/inter-coding on the occupancy codes. The reception device (e.g., the reception device 10004 or the point cloud video decoder 10006) according to the embodiments reconstructs the octree based on the occupancy codes.

The point cloud video encoder (e.g., the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud video encoder according to the embodiments may skip voxelization and perform direct coding to directly code the positions of points included in the specific region. The coordinates of a direct coding point according to the embodiments are referred to as direct coding mode (DCM). The point cloud video encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud video decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud video encoder (or the arithmetic encoder 40004) according to the embodiments may perform entropy coding on the positions (or position values) of the points.

The point cloud video encoder (e.g., the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud video encoder according to the embodiments may specify a level at which trisoup geometry encoding is to be applied. For example, when the specific level is equal to the depth of the octree, the point cloud video encoder does not operate in the trisoup mode. In other words, the point cloud video encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud video encoder according to the embodiments may perform entropy encoding on the starting point (x, y, z) of the edge, the direction vector (Δx, Δy, Δz) of the edge, and the vertex position value (relative position value within the edge). When the trisoup geometry encoding is applied, the point cloud video encoder according to the embodiments (e.g., the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed according to Equation 2 by: i) calculating the centroid value of each vertex, ii) subtracting the center value from each vertex value, and iii) estimating the sum of the squares of the values obtained by the subtraction.

Equation 2

$$①\begin{bmatrix}\mu_x\\ \mu_y\\ \mu_z\end{bmatrix}=\frac{1}{n}\sum_{i=1}^{n}\begin{bmatrix}x_i\\ y_i\\ z_i\end{bmatrix}②\begin{bmatrix}\bar{x}_i\\ \bar{y}_i\\ \bar{z}_i\end{bmatrix}=\begin{bmatrix}x_i\\ y_i\\ z_i\end{bmatrix}-\begin{bmatrix}\mu_x\\ \mu_y\\ \mu_z\end{bmatrix}③\begin{bmatrix}\sigma_x^2\\ \sigma_y^2\\ \sigma_z^2\end{bmatrix}=\sum_{i=1}^{n}\begin{bmatrix}\bar{x}_i^2\\ \bar{y}_i^2\\ \bar{z}_i^2\end{bmatrix}$$

Then, the minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of θ is estimated through a tan 2(bi, ai), and the vertices are ordered based on the value of θ. Table 1 below shows a combination of vertices for creating a triangle according to the number of the vertices. The vertices are ordered from 1 to n. Table 1 below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

[Table 1] Triangles formed from vertices ordered 1, . . . , n

TABLE 1

| n | Triangles |
|---|---|
| 3 | (1, 2, 3) |
| 4 | (1, 2, 3), (3, 4, 1) |
| 5 | (1, 2, 3), (3, 4, 5), (5, 1, 3) |

TABLE 1-continued

| n | Triangles |
|---|---|
| 6 | (1, 2, 3), (3, 4, 5), (5, 6, 1), (1, 3, 5) |
| 7 | (1, 2, 3), (3, 4, 5), (5, 6, 7), (7, 1, 3), (3, 5, 7) |
| 8 | (1, 2, 3), (3, 4, 5), (5, 6, 7), (7, 8, 1), (1, 3, 5), (5, 7, 1) |
| 9 | (1, 2, 3), (3, 4, 5), (5, 6, 7), (7, 8, 9), (9, 1, 3), (3, 5, 7), (7, 9, 3) |
| 10 | (1, 2, 3), (3, 4, 5), (5, 6, 7), (7, 8, 9), (9, 10, 1), (1, 3, 5), (5, 7, 9), (9, 1, 5) |
| 11 | (1, 2, 3), (3, 4, 5), (5, 6, 7), (7, 8, 9), (9, 10, 11), (11, 1, 3), (3, 5, 7), (7, 9, 11), (11, 3, 7) |
| 12 | (1, 2, 3), (3, 4, 5), (5, 6, 7), (7, 8, 9), (9, 10, 11), (11, 12, 1), (1, 3, 5), (5, 7, 9), (9, 11, 1), (1, 5, 9) |

The upsampling process is performed to add points in the middle along the edge of the triangle and perform voxelization. The added points are generated based on the upsampling factor and the width of the block. The added points are called refined vertices. The point cloud video encoder according to the embodiments may voxelize the refined vertices. In addition, the point cloud video encoder may perform attribute encoding based on the voxelized positions (or position values).

FIG. 7 shows an example of a neighbor node pattern according to embodiments. In order to increase the compression efficiency of the point cloud video, the point cloud video encoder according to the embodiments may perform entropy coding based on context adaptive arithmetic coding.

The point cloud video encoder may entropy encode based on a context adaptive arithmetic coding to enhance compression efficiency of the point cloud video.

As described with reference to FIGS. 1 to 6, the point cloud content providing system or the point cloud video encoder 10002 of FIG. 1, or the point cloud video encoder or arithmetic encoder 40004 of FIG. 4 may perform entropy coding on the occupancy code immediately. In addition, the point cloud content providing system or the point cloud video encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using 23=8 methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud video encoder according to the embodiments determines occupancy of neighbor nodes of each node of the octree and obtains a value of a neighbor pattern. The neighbor node pattern is used to infer the occupancy pattern of the node. The upper part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The lower part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud video encoder may perform coding according to the neighbor node pattern value (for example, when the neighbor node pattern value is 63, 64 kinds of coding may be performed). According to embodiments, the point cloud video encoder may reduce coding complexity by changing a neighbor node pattern value (based on, for example, a table by which 64 is changed to 10 or 6).

Figure 8:
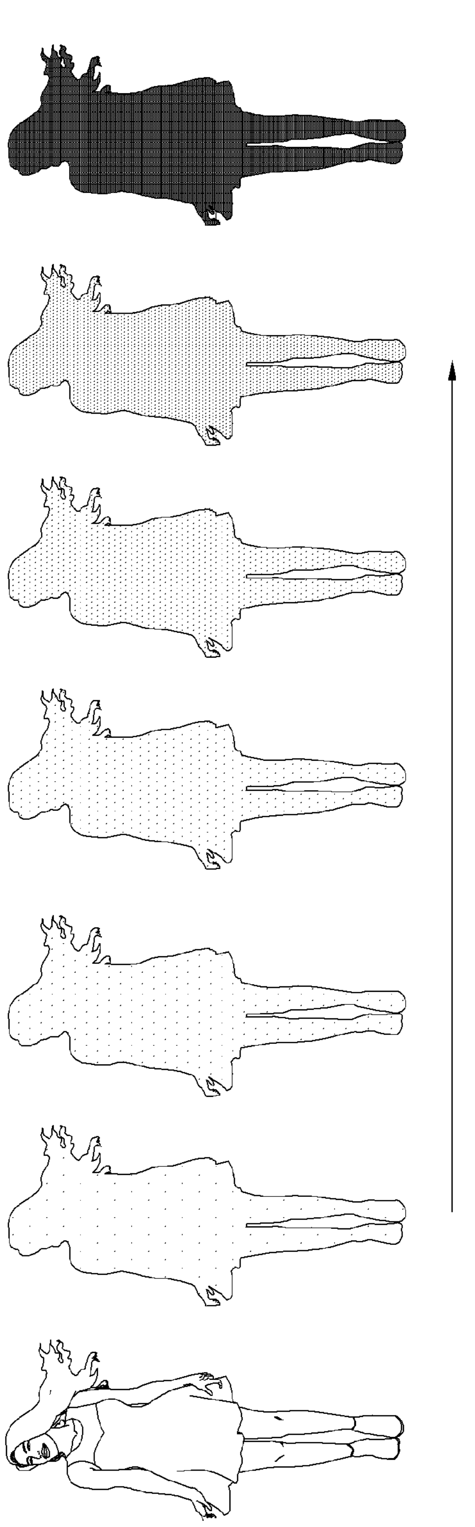
FIG. 8 illustrates an example of point configuration of a point cloud content for each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, upsampling, and voxelization. Since the attribute depends on the geometry, attribute encoding is performed based on the reconstructed geometry.

The point cloud video encoder (e.g., the LOD generator 40009) may classify (or reorganize) points by LOD. FIG. 8 shows the point cloud content corresponding to LODs. The leftmost picture in FIG. 8 represents original point cloud content. The second picture from the left of FIG. 8 represents distribution of the points in the lowest LOD, and the rightmost picture in FIG. 8 represents distribution of the points in the highest LOD. That is, the points in the lowest LOD are sparsely distributed, and the points in the highest LOD are densely distributed. That is, as the LOD rises in the direction pointed by the arrow indicated at the bottom of FIG. 8, the space (or distance) between points is narrowed.

Figure 9:
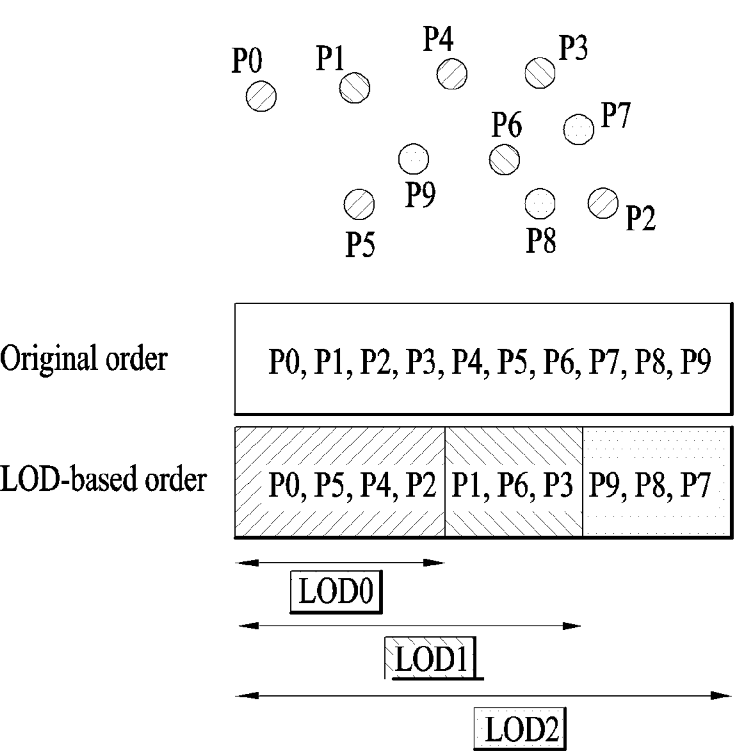
FIG. 9 illustrates an example of point configuration of a point cloud content for each LOD according to embodiments.

FIG. 9 illustrates an example of point configuration for each LOD according to embodiments.

As described with reference to FIGS. 1 to 8, the point cloud content providing system, or the point cloud video encoder (e.g., the point cloud video encoder 10002 of FIG. 1, the point cloud video encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud video encoder, but also by the point cloud video decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud video encoder according to the embodiments may perform prediction transform coding based on LOD, lifting transform coding based on LOD, and RAHT transform coding selectively or in combination.

The point cloud video encoder according to the embodiments may generate a predictor for points to perform prediction transform coding based on LOD for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud video encoder according to the embodiments (e.g., the coefficient quantizer 40011) may quantize and inversely quantize the residual of each point (which may be called residual attribute, residual attribute value, attribute prediction residual value or prediction error attribute value and so on) obtained by subtracting a predicted attribute (or attribute value) each point from the attribute (i.e., original attribute value) of each point. The quantization process performed for a residual attribute value in a transmission device is configured as shown in table 2. The inverse quantization process performed for a residual attribute value in a reception device is configured as shown in Table 3.

TABLE 2

```
int PCCQuantization(int value, int quantStep) {
if( value >=0) {
return floor(value / quantStep + 1.0 / 3.0);
} else {
return -floor(-value / quantStep + 1.0 / 3.0);
}
}
```

TABLE 3

```
int PCCInverseQuantization(int value, int quantStep) {
if( quantStep == 0) {
return value;
} else {
return value * quantStep;
}
}
```

When the predictor of each point has neighbor points, the point cloud video encoder (e.g., the arithmetic encoder 40012) according to the embodiments may perform entropy coding on the quantized and inversely quantized residual attribute values as described above.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.
2) Lift prediction process: Subtract the value obtained by multiplying the attribute value of the point by the weight from the existing attribute value to calculate a predicted attribute value.
3) Create temporary arrays called updateweight and update and initialize the temporary arrays to zero.
4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.
5) Lift update process: Divide the attribute values of the update array for all predictors by the weight value of the updateweight array of the predictor index, and add the existing attribute value to the values obtained by the division.
6) Calculate predicted attributes by multiplying the attribute values updated through the lift update process by the weight updated through the lift prediction process (stored in the QW) for all predictors. The point cloud video encoder (e.g., coefficient quantizer 40011) according to the embodiments quantizes the predicted attribute values. In addition, the point cloud video encoder (e.g., the arithmetic encoder 40012) performs entropy coding on the quantized attribute values.

The point cloud video encoder (e.g., the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud video encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

Equation 3 below represents a RAHT transformation matrix. In Equation 3, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are $w1=w_{l_{2x,y,z}}$ an $w2=w_{l_{2x+1,y,z}}$.

$$\begin{bmatrix} g_{l-1_{x,y,z}} \\ h_{l-1_{x,y,z}} \end{bmatrix} = T_{w1w2} \begin{bmatrix} g_{l_{2x,y,z}} \\ g_{l_{2x+1,y,z}} \end{bmatrix} \quad \text{Equation 3}$$

$$T_{w1w2} = \frac{1}{\sqrt{w1+w2}} \begin{bmatrix} \sqrt{w1} & \sqrt{w2} \\ -\sqrt{w2} & \sqrt{w1} \end{bmatrix}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (e.g., encoding by the arithmetic encoder 40012). The weights are calculated as $w_{l-1_{x,y,z}}=w_{l_{2x,y,z}}+w_{l_{2x+1,y,z}}$. The root node is created through the $g_{1_{0,0,0}}$ and $g_{1_{0,0,1}}$ as Equation 4.

$$\begin{bmatrix} gDC \\ h_{0_{0,0,0}} \end{bmatrix} = T_{w1000w1001} \begin{bmatrix} g_{1_{0,0,0z}} \\ g_{1_{0,0,1}} \end{bmatrix} \quad \text{Equation 4}$$

The value of gDC is also quantized and subjected to entropy coding like the high-pass coefficients.

Figure 10:
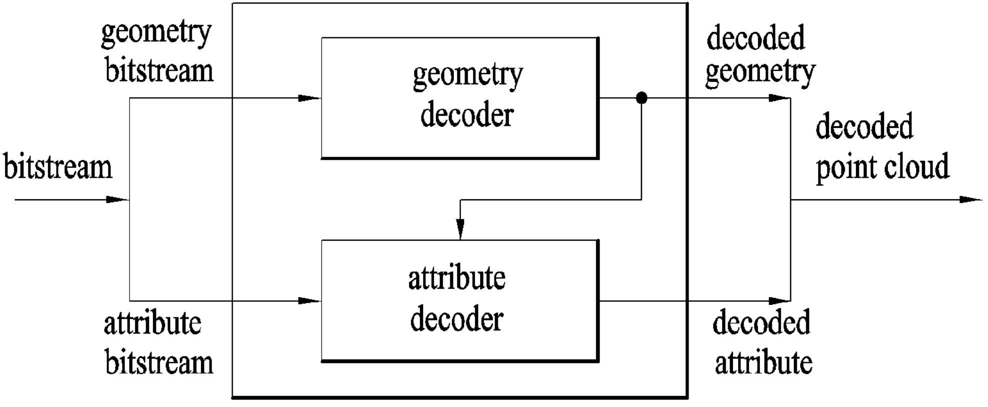
FIG. 10 illustrates an example of a block diagram of a point cloud video decoder according to embodiments.

FIG. 10 illustrates a point cloud video decoder according to embodiments.

The point cloud video decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud video decoder may receive a geometry bitstream and an attribute bitstream contained in one or more bitstreams. The point cloud video decoder includes a geometry decoder and an attribute decoder. The geometry decoder performs geometry decoding on the geometry bitstream and outputs decoded geometry. The attribute decoder performs attribute decoding on the attribute bitstream based on the decoded geometry, and outputs decoded attributes. The decoded geometry and decoded attributes are used to reconstruct point cloud content (a decoded point cloud).

Figure 11:
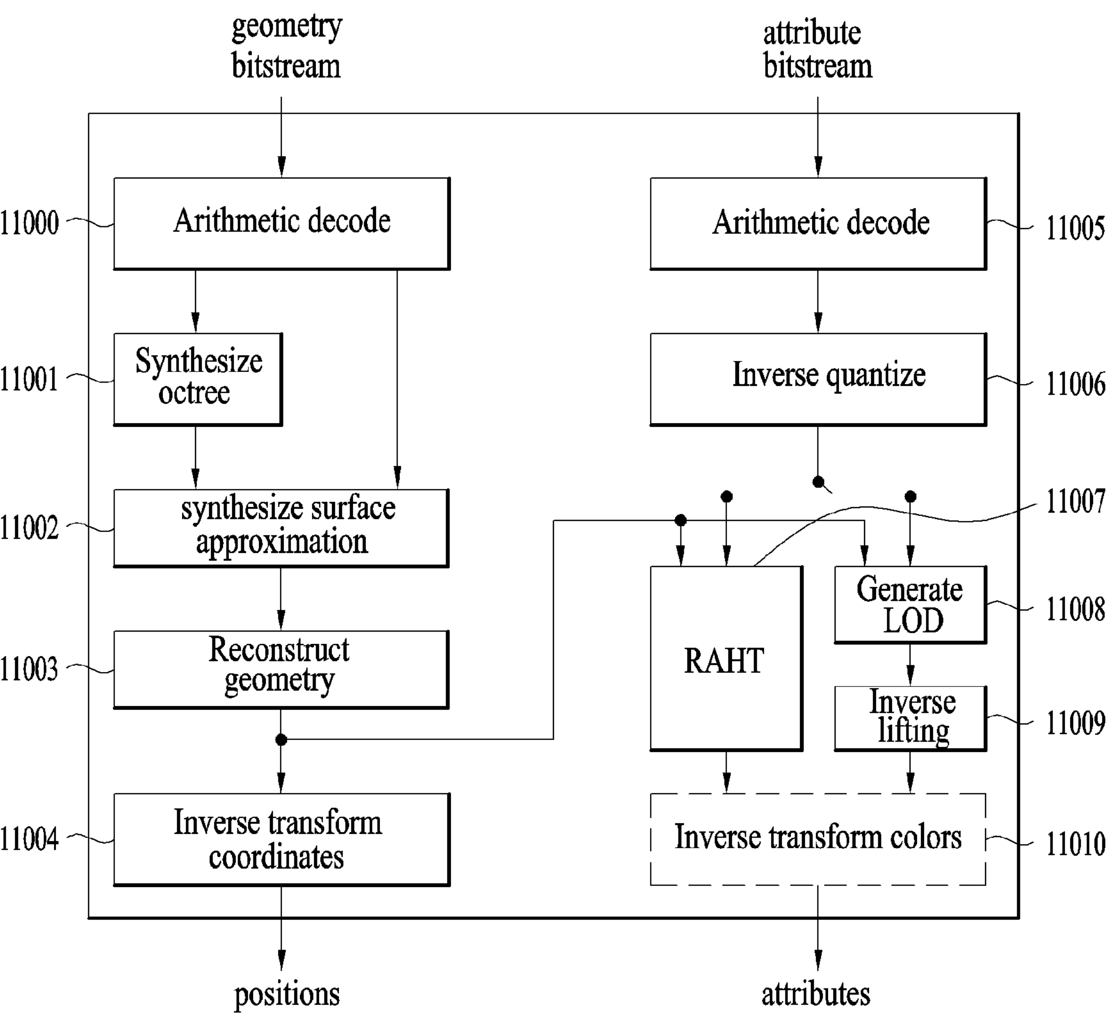
FIG. 11 illustrates an example of a point cloud video decoder according to embodiments.

FIG. 11 illustrates a point cloud video decoder according to embodiments.

The point cloud video decoder illustrated in FIG. 11 is an example of the point cloud video decoder illustrated in FIG. 10, and may perform a decoding operation, which is a reverse process of the encoding operation of the point cloud video encoder illustrated in FIGS. 1 to 9.

As described with reference to FIGS. 1 and 10, the point cloud video decoder may perform geometry decoding and attribute decoding. The geometry decoding is performed before the attribute decoding.

The point cloud video decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct decoding and trisoup geometry decoding. The direct decoding and trisoup geometry decoding are selectively applied. The geometry decoding is not limited to the above-described example, and is performed as an inverse process of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud video encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud video encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud video encoder.

Although not shown in the figure, the elements of the point cloud video decoder of FIG. 11 may be implemented by hardware including one or more processors or integrated circuits configured to communicate with one or more memories included in the point cloud content providing apparatus, software, firmware, or a combination thereof. The one or more processors may perform at least one or more of the operations and/or functions of the elements of the point cloud video decoder of FIG. 11 described above. Additionally, the one or more processors may operate or execute a set of software programs and/or instructions for performing the operations and/or functions of the elements of the point cloud video decoder of FIG. 11.

Figure 12:
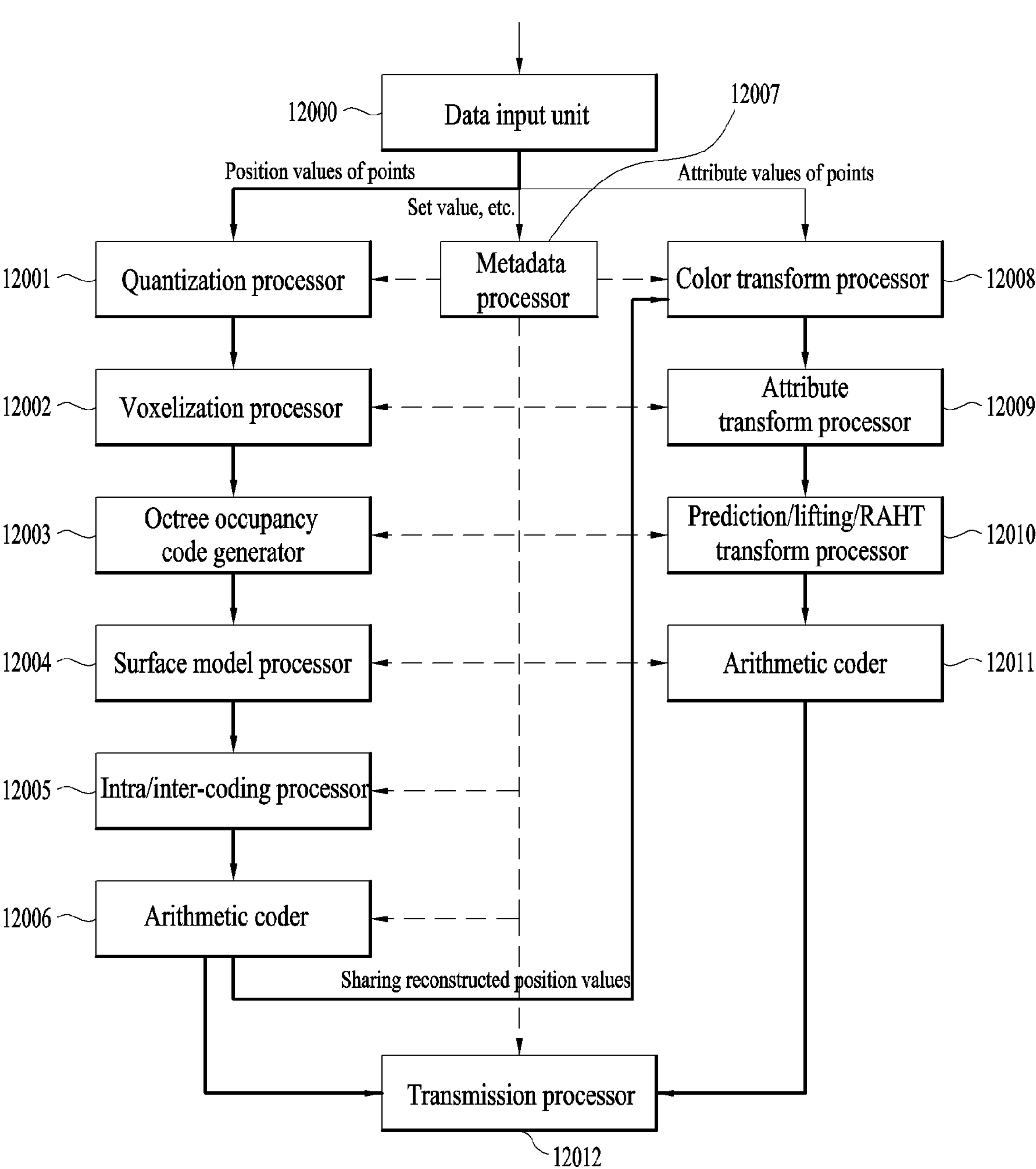
FIG. 12 illustrates a configuration for point cloud video encoding of a transmission device according to embodiments.

FIG. 12 illustrates a transmission device according to embodiments.

The transmission device shown in FIG. 12 is an example of the transmission device 10000 of FIG. 1 (or the point cloud video encoder of FIG. 4). The transmission device illustrated in FIG. 12 may perform one or more of the operations and methods the same as or similar to those of the point cloud video encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same as or similar to the operation and/or acquisition method of the point cloud video acquisition unit 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same as or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same as or similar to the operation and/or quantization of the quantizer 40001 described with reference to FIG. 4. Details are the same as those described with reference to FIGS. 1 to 9.

The voxelization processor 12002 according to embodiments voxelizes the quantized position values of the points. The voxelization processor 12002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same as or similar to the operation and/or method of the point cloud video encoder (or the octree analyzer 40002) described with reference to FIGS. 4 and 6. Details are the same as those described with reference to FIGS. 1 to 9.

The surface model processor 12004 according to the embodiments may perform trisoup geometry encoding based on a surface model to reconstruct the positions of points in a specific region (or node) on a voxel basis. The surface model processor 12004 may perform an operation and/or method the same as or similar to the operation and/or method of the point cloud video encoder (e.g., the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same as or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same as or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same as or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same as or similar to the operation and/or method of the color transformer 40006 described with reference to FIG. 4 is performed. A detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same as or similar to the operation and/or method of the attribute transformer 40007 described with reference to FIG. 4. A detailed description thereof is omitted. The prediction/lifting/RAHT transform processor 12010 according to the embodiments may code the transformed attributes by any one or more combinations of RAHT coding, prediction transform coding, and lifting transform coding. The prediction/lifting/RAHT transform processor 12010 performs at least one of the operations the same as or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same as or similar to the operation and/or method of the arithmetic encoder 40012.

The transmission processor 12012 according to the embodiments may transmit each bitstream containing encoded geometry and/or encoded attributes and metadata, or transmit one bitstream configured with the encoded geometry and/or the encoded attributes and the metadata. When the encoded geometry and/or the encoded attributes and the metadata according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS or tile inventory) for signaling of a tile level, and slice data. The slice data may include information about one or more slices. One slice according to embodiments may include one geometry bitstream $Geom0^0$ and one or more attribute bitstreams $Attr0^0$ and Attrb $1^0$. The TPS (or tile inventory) according to the embodiments may include information about each tile (e.g., coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 13:
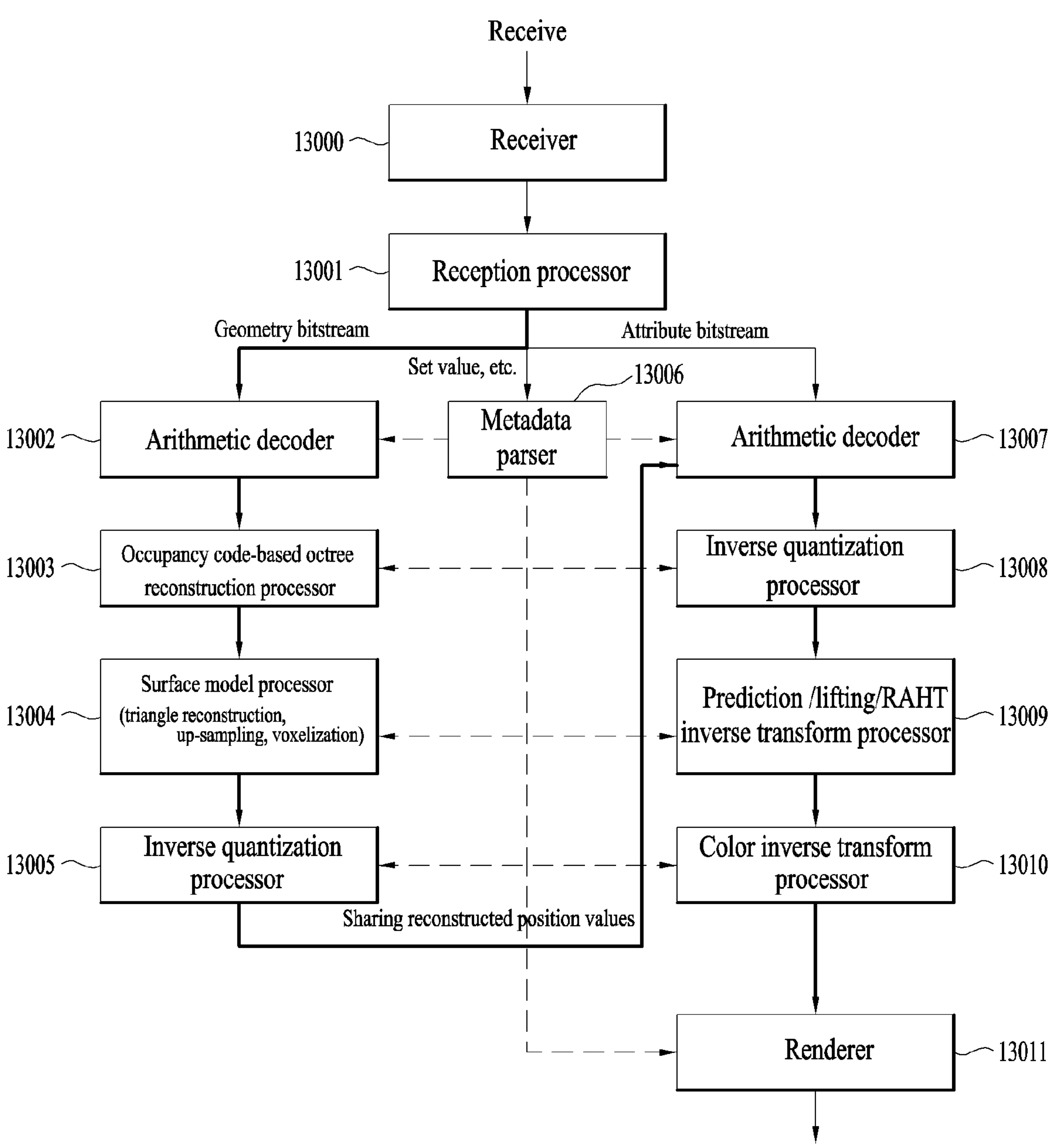
FIG. 13 illustrates a configuration for point cloud video decoding of a reception device according to embodiments.

FIG. 13 illustrates a reception device according to embodiments.

The reception device illustrated in FIG. 13 is an example of the reception device 10004 of FIG. 1 (or the point cloud video decoder of FIGS. 10 and 11). The reception device illustrated in FIG. 13 may perform one or more of the operations and methods the same as or similar to those of the point cloud video decoder described with reference to FIGS. 1 to 11.

The reception device according to the embodiment may include a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform a reverse process of the operation of a corresponding element for encoding according to the embodiments.

The receiver 13000 according to the embodiments receives point cloud data. The receiver 13000 may perform an operation and/or reception method the same as or similar to the operation and/or reception method of the receiver 10005 of FIG. 1. A detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 1305 may perform geometry decoding. The geometry decoding according to embodiments is the same as or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same as or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same as or similar to the operation and/or octree generation method of the octree synthesizer 11001. When the trisoup geometry encoding is applied, the surface model processor 13004 according to the embodiments may perform trisoup geometry decoding and related geometry reconstruction (e.g., triangle reconstruction, up-sampling, voxelization) based on the surface model method. The surface model processor 13004 performs an operation the same as or similar to that of the surface approximation synthesizer 11002 and/or the geometry reconstructor 11003.

The inverse quantization processor 13005 according to the embodiments may inversely quantize the decoded geometry.

The metadata parser 13006 according to the embodiments may parse metadata contained in the received point cloud data, for example, a set value. The metadata parser 13006 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same as or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same as or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same as or similar to the operation and/or inverse quantization method of the inverse quantizer 11006.

The prediction/lifting/RAHT inverse transform processor 13009 according to the embodiments may process the reconstructed geometry and the inversely quantized attributes. The prediction/lifting/RAHT inverse transform processor 13009 performs one or more of operations and/or decoding which are the same as or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same as or similar to the operation and/or inverse transform coding of the color inverse transformer 11010. The renderer 13011 according to the embodiments may render the point cloud data.

Figure 14:
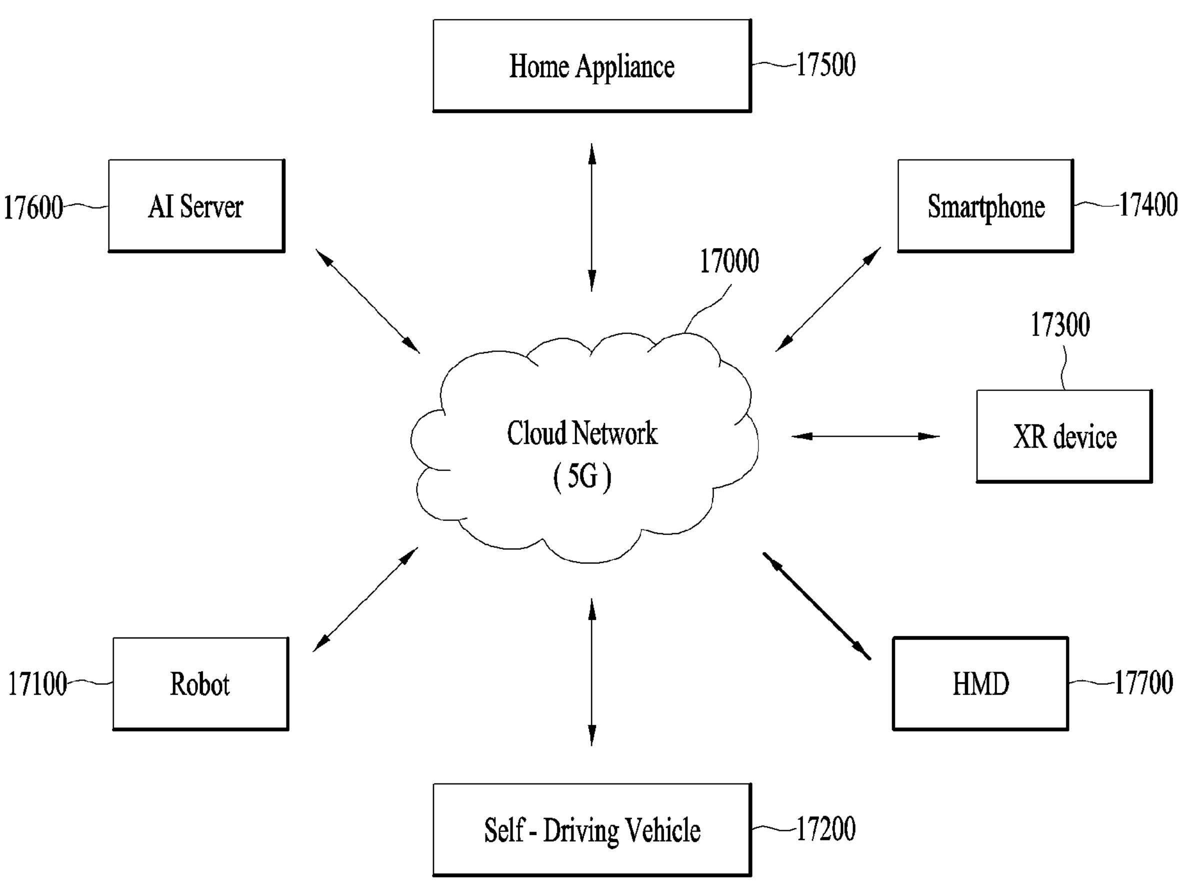
FIG. 14 illustrates an exemplary structure operable in connection with point cloud data methods/devices according to embodiments.

FIG. 14 shows an exemplary structure operatively connectable with a method/device for transmitting and receiving point cloud data according to embodiments.

The structure of FIG. 14 represents a configuration in which at least one of a server 17600, a robot 17100, a self-driving vehicle 17200, an XR device 17300, a smartphone 17400, a home appliance 17500, and/or a head-mount display (HMD) 17700 is connected to a cloud network 17000. The robot 17100, the self-driving vehicle 17200, the XR device 17300, the smartphone 17400, or the home appliance 17500 is referred to as a device. In addition, the XR device 17300 may correspond to a point cloud compressed data (PCC) device according to embodiments or may be operatively connected to the PCC device.

The cloud network 17000 may represent a network that constitutes part of the cloud computing infrastructure or is present in the cloud computing infrastructure. Here, the cloud network 17000 may be configured using a 3G network, 4G or Long Term Evolution (LTE) network, or a 5G network.

The server 17600 may be connected to at least one of the robot 17100, the self-driving vehicle 17200, the XR device 17300, the smartphone 17400, the home appliance 17500, and/or the HMD 17700 over the cloud network 17000 and may assist in at least a part of the processing of the connected devices 17100 to 17700.

The HMD 17700 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 17100 to 17500 to which the above-described technology is applied will be described. The devices 17100 to 17500 illustrated in FIG. 14 may be operatively connected/coupled to a point cloud data transmission device and reception according to the above-described embodiments.

<PCC+XR>

The XR/PCC device 17300 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 17300 may analyze 3D point cloud data or image data acquired through various sensors or from an external device and generate position data and attribute data about 3D points. Thereby, the XR/PCC device 17300 may acquire information about the surrounding space or a real object, and render and output an XR object. For example, the XR/PCC device 17300 may match an XR object including auxiliary information about a recognized object with the recognized object and output the matched XR object.

<PCC+Self-Driving+XR>

The self-driving vehicle 17200 may be implemented as a mobile robot, a vehicle, an unmanned aerial vehicle, or the like by applying the PCC technology and the XR technology.

The self-driving vehicle 17200 to which the XR/PCC technology is applied may represent a self-driving vehicle provided with means for providing an XR image, or a self-driving vehicle that is a target of control/interaction in the XR image. In particular, the self-driving vehicle 17200 which is a target of control/interaction in the XR image may be distinguished from the XR device 17300 and may be operatively connected thereto.

The self-driving vehicle 17200 having means for providing an XR/PCC image may acquire sensor information from sensors including a camera, and output the generated XR/PCC image based on the acquired sensor information. For example, the self-driving vehicle 17200 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 17200 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud compression data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

As described with reference to FIGS. 1 to 14, the point cloud data may include a set of points, and each point may have a geometry (referred to also as geometry information) and an attribute (referred to as attribute information). The geometry information represents three-dimensional (3D) position information (xyz) of each point. That is, the position of each point is represented by parameters in a coordinate system representing a 3D space (e.g., parameters (x, y, z) of three axes, X, Y, and Z axes, representing a space). The attribute information represents color (RGB, YUV, etc.), reflectance, normal vectors, transparency, etc. of the point.

According to embodiments, point cloud data may be classified into category 1 of static point cloud data, category 2 of dynamic point cloud data, and category 3, which is acquired through dynamic movement, by the type and acquisition method of data. In one embodiment, Category 1 is composed of a single-frame point cloud with very dense points for an object or space. Category 3 may be divided into frame-based data having multiple frames acquired while moving around, and fused data of a single frame configured by matching a point cloud acquired through a lidar sensor and a color image acquired as a 2D image.

Figure 15:
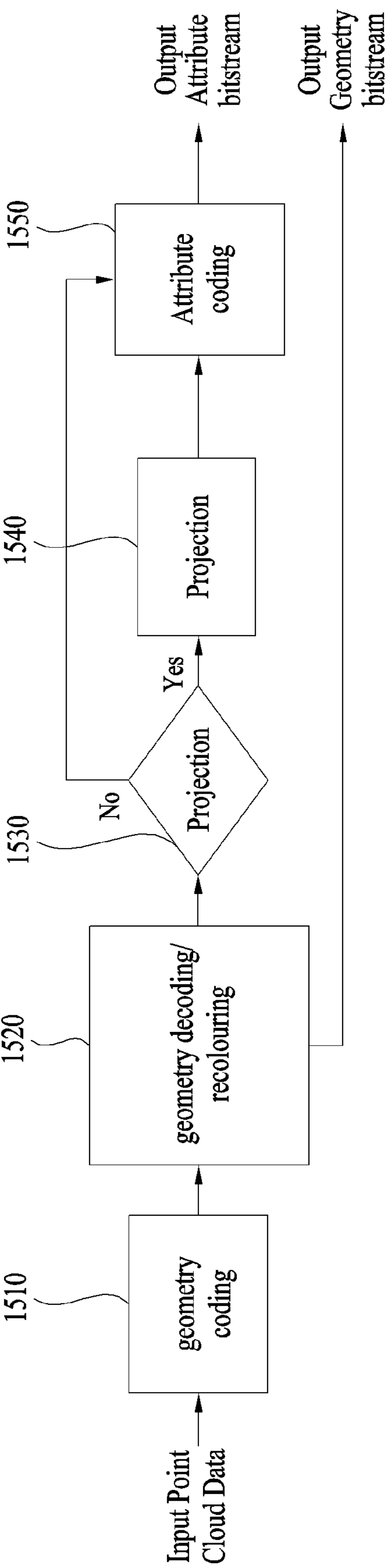
FIG. 15 is a diagram illustrating an operation of a point cloud data transmission device according to embodiments.

FIG. 15 is a diagram illustrating an operation of a point cloud data transmission device according to embodiments.

FIG. 15 illustrates an example of the operation of a point cloud transmission device (or referred to as a point cloud data transmission device) that performs projection to increase the compression efficiency of attribute encoding according to embodiments. The projection according to the embodiments is applied to geometry (or geometry information) as a preprocessing process of attribute encoding. Point cloud data (e.g., LiDAR data, etc.) acquired in a certain pattern has a different density of data distribution according to the acquisition pattern. As described with reference to FIGS. 1 to 14, attribute encoding is performed based on original and/or reconstructed (or decoded) geometry. Attribute compression efficiency may be reduced when attributes (or attribute information) are encoded based on unevenly distributed geometry. Therefore, in order to increase the attribute compression efficiency of point cloud data according to the present disclosure, the projection of point cloud data may be performed as a preprocessing process of the attribute encoding.

According to embodiments, the projection is applied to point cloud data that may be subjected to position change to increase attribute compression efficiency. The projection refers to converting a coordinate system (e.g., an orthogonal coordinate system consisting of x-axis, y-axis, and z-axis) representing the position (geometry) of each point and converting the converted coordinates into a coordinate system representing a compressible shape (e.g., a cuboid space). The projection according to the embodiments may be referred to as coordinate conversion.

As described with reference to FIGS. 1 to 14, the point cloud transmission device (e.g., the transmission devices in FIG. 1, the point cloud video encoder in FIG. 4, and the transmission device in FIG. 12) performs coding (geometry encoding) on the geometry (1510). The geometry coding according to the embodiments corresponds to a combination of at least one of the operations of the coordinate transformer 40000, the quantizer 40001 the octree analyzer 40002, the surface approximation analyzer 40003, the arithmetic encoder 40004, and the geometry reconstructor 40005 described with reference to FIG. 4, but is not limited thereto. Also, the geometry coding according to the embodiments corresponds to a combination of at least one of the operations of data input unit 12000, the quantization processor 12001, the voxelization processor 12002, the octree occupancy code generator 12003, the surface model processor 12004, the intra/inter-coding processor 12005, and the arithmetic coder 12006, and the metadata processor 12007, but is not limited thereto. The geometry coding according to the embodiments may be referred to as geometry encoding.

When lossy coding is performed, the point cloud transmission device according to the embodiments decodes encoded geometry and performs re-coloring (attribute transfer) (1520). The point cloud transmission device may minimize attribute distortion by matching the reconstructed geometry with the attributes. The point cloud transmission device may determine whether to perform a projection on the reconstructed geometry (1530), and may perform a projection (or a projection process) (1540).

The projection 1540 may include converting coordinates representing the positions of points presented in a first coordinate system into a second coordinate system, and projecting the positions of points based on coordinates representing the converted positions of the points presented in a second coordinate system.

The projection 1540 of FIG. 15 may include converting coordinates representing the positions of points presented in the first coordinate system into a second coordinate system. In addition, the projection 1540 of FIG. 15 may include projecting the positions of points based on coordinates representing the converted positions of the points presented in the second coordinate system. The first coordinate system may include a Cartesian coordinate system, and the second coordinate system may include a spherical coordinate system, a cylindrical coordinate system, or a fan-shaped coordinate system. The projecting of the positions of the points according to the embodiments may be based on the converted coordinates represent the positions of the points in the second coordinate system and a scale value.

The point cloud transmission device according to the embodiments performs attribute coding based on the projected geometry (1550). The attribute coding according to the embodiments corresponds to a combination of at least one of the operations of the color transformer 40006, the attribute transformer 40007, the RAHT transformer 40008, the LOD generator 40009, the lifting transformer 40010, the coefficient quantizer 40011, and/or the arithmetic encoder 40012 described with reference to FIG. 4, but is not limited thereto. In addition, the attribute coding according to the embodiments corresponds to a combination of at least one of the operations of the color transform processor 12008, the attribute transform processor 12009, the prediction/lifting/RAHT transform processor 12010, and the arithmetic coder 12011 described with reference to FIG. 12, but is not limited thereto example. The attribute coding according to the embodiments may be referred to as attribute encoding. The point cloud transmission device performs the attribute coding to output an attribute bitstream.

The geometry coding and the attribute coding according to the embodiments is the same as those described with reference to FIGS. 1 to 14, and thus a detailed description thereof is omitted.

Figure 16:
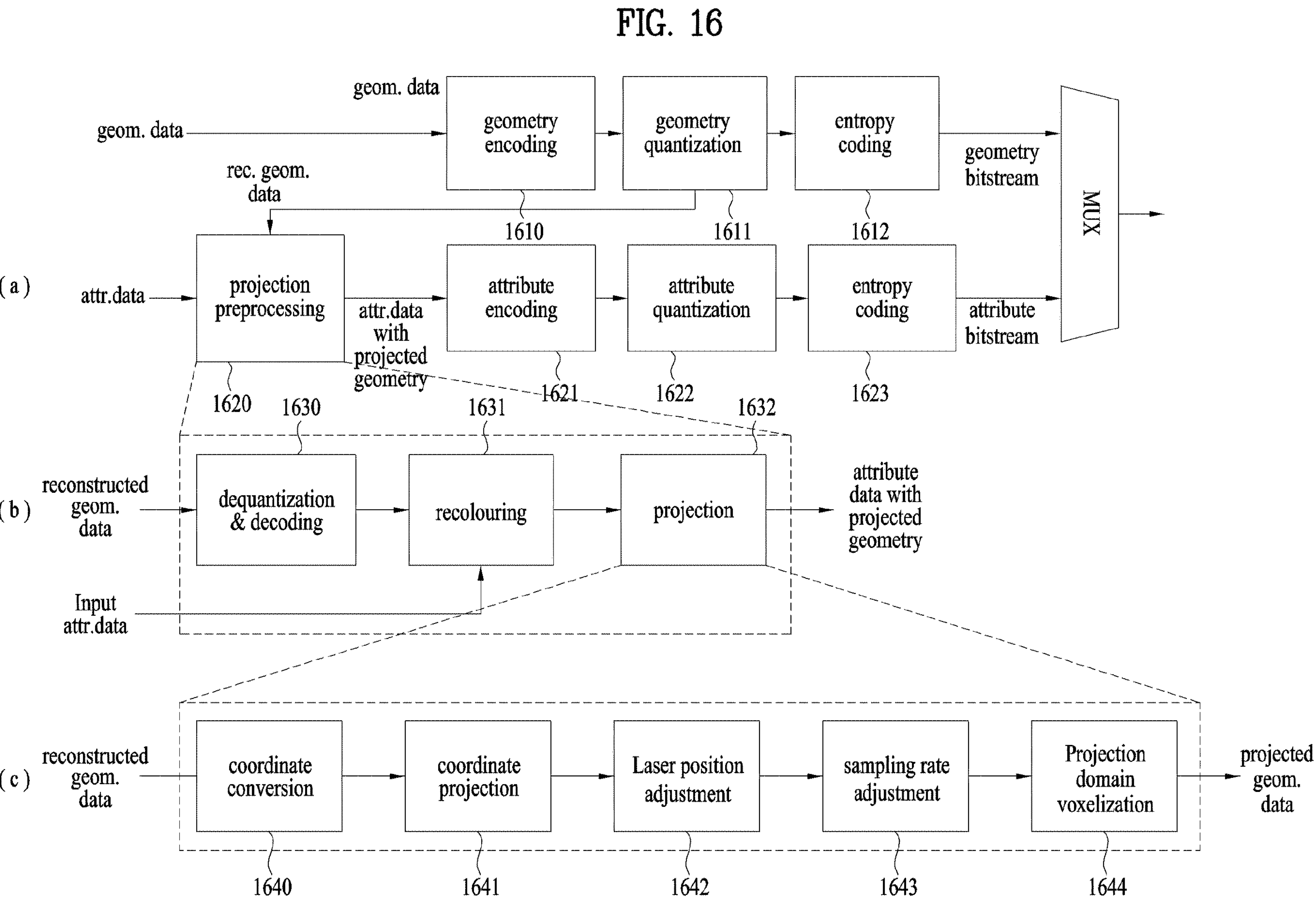
FIGS. 16-(*a*) to 16-(*c*) are block diagrams illustrating an example of a point cloud data transmission device according to embodiments.

FIGS. 16-(*a*) to 16-(*c*) are block diagrams illustrating an example of a point cloud data transmission device according to embodiments.

FIG. 16-(*a*) is a block diagram illustrating an embodiment of a point cloud data transmission device, and FIG. 16-(*b*) is a detailed block diagram illustrating an embodiment of the projection preprocessor 1620 in FIG. 16-(*a*). FIG. 16-(*c*) is a detailed block diagram illustrating an embodiment of the projector 1632 in FIG. 16-(*b*). The projection preprocessor 1620 according to the embodiments may be referred to as an attribute preprocessor.

FIGS. 16-(*a*) to 16-(*c*) specifically illustrate the operation of the point cloud data transmission device (or point cloud transmission device) of FIG. 15. The order of data processing by the point cloud transmission device is not limited to this example. In addition, the operation represented by the components of the point cloud data transmission device according to the embodiments may be performed by hardware, software, processes, or a combination thereof that constitutes the point cloud transmission device.

The geometry encoder of the point cloud transmission device according to the embodiments performs geometry coding (e.g., geometry coding (1510) described with reference to FIG. 15) on geometry data (or geometry information) to output a geometry bitstream. The geometry encoder according to the embodiments may include a geometry encoding unit 1610, a geometry quantization unit 1611, and an entropy coding unit 1612. The geometry encoding unit 1610 may perform at least one of octree geometry encoding, trisoup geometry encoding, or predictive geometry coding, but is not limited thereto. The geometry encoder is the same as or similar to that described with reference to FIG. 4, and thus a description thereof will be omitted.

The projection preprocessor 1620 receives reconstructed geometry data from the geometry quantization unit 1611, and performs projection preprocessing (e.g., the projection described with reference to FIG. 15) based on the reconstructed geometry data. The projection preprocessor 1620 of the point cloud transmission device may perform projection preprocessing to output projected geometry and attributes. The projection preprocessor 1620 may include a dequantization and decoding unit (dequantization & decoding) 1630 configured to perform dequantization and decoding on the reconstructed geometry, a recolorer (recolouring) 1631, and a projector (projection) 1632 as shown in FIG. 16-(*b*).

The dequantization and decoding unit 1630 of the projection preprocessor 1620 according to the embodiments performs dequantization and decoding on the reconstructed geometry (or geometry data). The recolorer 1631 performs recoloring to match the decoded geometry and attribute data. The projector 1632 performs a projection on the recolored point cloud data (e.g., geometry and attributes).

The projector 1632 may include at least one of a coordinate converter (coordinate conversion) 1640, a coordinate projector (coordinate projection) 1641, a laser position adjuster (laser position adjustment) 1642, a sampling rate adjuster (sampling rate adjustment) 1643, and a projection domain voxelizer (projection domain voxelization) 1644. Geometry (or referred to as geometry information or geometry data) represents the positions of points, and the position of each point is presented in a coordinate system (e.g., a 2/3D Cartesian coordinate system, a 2/3D cylindrical coordinate system, a spherical coordinate system, etc.).

To present the position of each point represented by the input geometry as a position in a 3D space, the coordinate converter 1640 according to the embodiments performs coordinate conversion, which includes selecting a coordinate system and converting the geometry into information (e.g., vector values, etc.) in the selected coordinate system. For example, the coordinate converter 1640 may perform coordinate conversion including Cartesian-cylindrical coordinate conversion for converting the Cartesian coordinate system into the cylindrical coordinate system and Cartesian-spherical coordinate conversion for converting the Cartesian coordinate system into the spherical coordinate system. Coordinate systems and coordinate conversion according to embodiments are not limited to the above-described examples. The point cloud transmission device according to the embodiments may generate and/or signal information about the converted coordinate system (such as, for example, the center position and range in the converted coordinate system, cylinder_center_x/y/z, cylinder_radius_max, cylinder_degree_max, cylinder_z_max, ref_vector_x/y/z, normal_vector_x/y/z, clockwise_degree_flag, etc.).

The coordinate projector 1641 according to the embodiments performs the coordinate projection, which includes projecting the geometry presented in the converted coordinate system obtained by the coordinate converter 1640 in a compressible form (e.g., a cuboid space). A projection type according to embodiments is indicated through signaling information such as projection_type. The signaling information is transmitted through the bitstream described with reference to FIGS. 1 to 14. The signaling information may include a range of projected data and information related to scaling in the projection operation (e.g., bounding_box_x/y/z_length, granularity_radius/angular/normal, etc.).

The laser position adjuster 1642 and the sampling rate adjuster 1643 according to the embodiments perform laser position adjustment and/or sampling rate adjustment to increase the accuracy of the projection. The laser position adjustment and the sampling rate adjustment are operations for projection correction. The adjustments may be selectively performed according to the characteristics of point cloud data and the characteristics of the point cloud data acquisition device, or may be performed concurrently, performed sequentially, or sequentially selected and performed. Alternatively, they may be skipped. As described above, when the prediction is performed on the point cloud data (e.g., LiDAR data, etc.) acquired in a specific pattern, the data may be less accurate due to a difference in density. Therefore, to address this issue, the laser position adjuster 1642 performs the laser position adjustment for correcting the projected point cloud data (e.g., projected geometry) in consideration of the position of the point cloud data acquisition device (e.g., laser).). Signaling information related to the laser position adjustment (e.g., information (laser_position_adjustment_flag) indicating whether the laser position adjustment has been performed, information (e.g., num_laser, r_laser, z_laser, theta_laser, etc.) necessary for the laser position adjustment) is included in the above-described signaling information and transmitted through a bitstream.

In addition, the sampling rate adjuster 1643 performs the sampling rate adjustment to correct the projected point cloud data (e.g. projected geometry) by applying a scale factor based on the mechanical characteristics of the point cloud data acquisition device. The sampling rate adjustment may be applied to each axis of a coordinate system in which the point cloud data is presented, and information related to the sampling rate adjustment (e.g., signaling information such as sampling_adjustment_cubic_flag, sampling_adjustment_spread_bbox_flag, and sampling_adjustment_type) is included in the above-described signaling information and transmitted through the bitstream.

In addition, the projection domain voxelizer 1644 performs domain voxelization of converting the projected geometry into a compression-efficient domain and outputs the projected geometry data. That is, the projected geometry data is converted into position information in an integer unit for compression through voxelization.

The attribute encoder of the point cloud transmission device according to the embodiments outputs an attribute bitstream by performing attribute coding (e.g., the attribute coding 1550 described with reference to FIG. 15) based on the geometry projected by the projection preprocessor 1620. The attribute encoder for attribute coding according to the embodiments includes an attribute encoding unit 1621, an attribute quantization unit 1622, and an entropy coding unit 1623, as shown in FIG. 16-(*a*). Attribute coding according to the embodiments may be referred to as attribute encoding. The attribute encoding unit 1621 performs an operation corresponding to at least one or a combination of one or more of RAHT coding, predictive transform coding, and lifting transform coding according to the point cloud content. For example, the RAHT coding and lifting transform coding may be used for lossy coding, which compresses point cloud content data to a significant size. The predictive transform coding may be used for lossless coding. The attribute quantization unit 1622 quantizes the lossy-coded or lossless-coded attribute information (e.g., attribute residual information) based on the projected geometry, and the entropy coding unit 1623 entropy-codes the quantized attribute information.

The above-described projection may be applied to geometry coding and/or attribute coding, and signaling information indicating whether the projected data is applied (e.g., geo_projection_enable_flag indicating that the converted data is used for the geometry coding and attr_projection_enable_flag indicating whether the converted data is used for the attribute coding) is transmitted through the above-described bitstream. If the projection is applied only to the attribute coding, geometry information is encoded through general geometry coding and the encoded geometry is projected. Then, the attribute information is coded based on the projected geometry.

As shown in the figure, the geometry bitstream and the attribute bitstream output by the geometry encoder and the attribute encoder are multiplexed and transmitted by the multiplexer.

Figure 17:
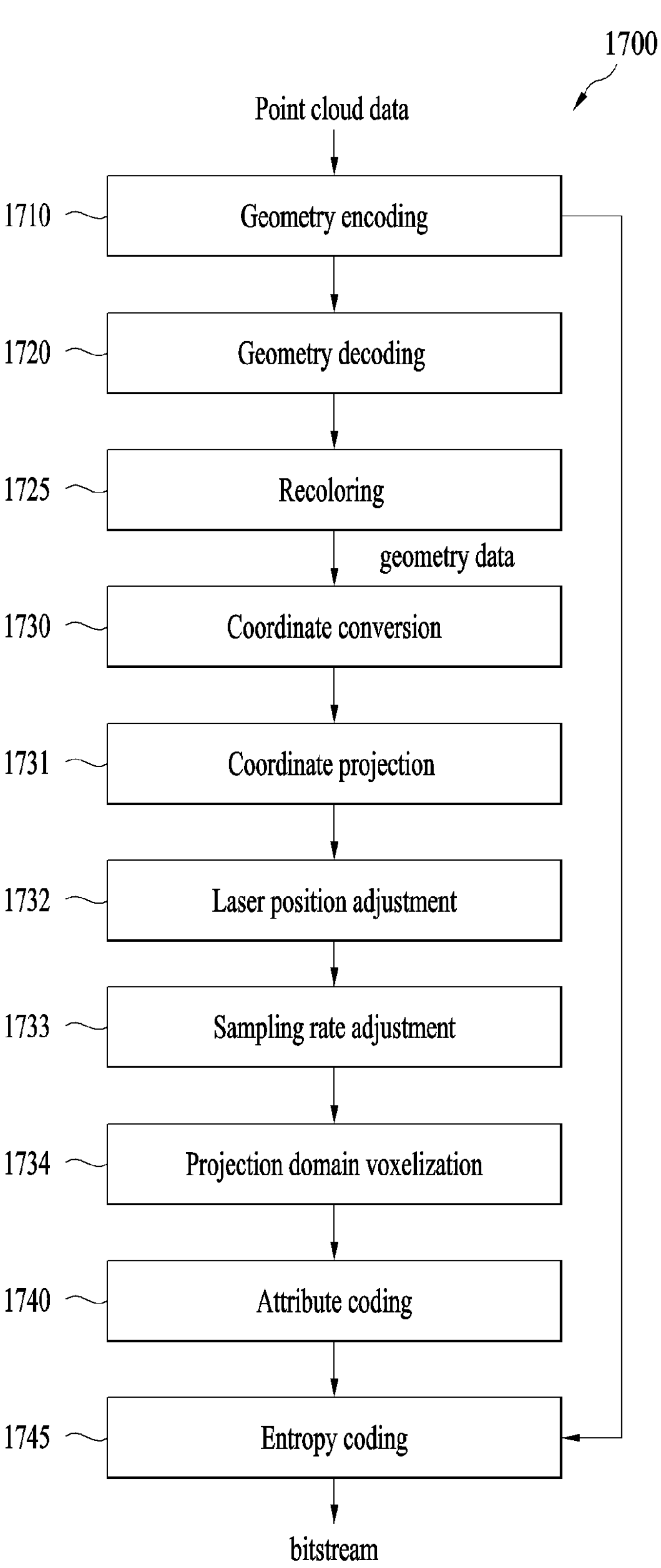
FIG. 17 is a flowchart illustrating an example of a processing process of a point cloud transmission device according to embodiments.

FIG. 17 is a flowchart illustrating an example of a processing process of a point cloud transmission device according to embodiments.

The flowchart 1700 shown in the figure illustrates an example of the processing process of the point cloud transmission device described with reference to FIGS. 15 and 16-(*a*) to 16-(*c*). The operation of the point cloud transmission device is not limited to this example, and the operations corresponding to the respective elements may be performed in the order shown in FIG. 17 or may not be performed sequentially.

As described with reference to FIGS. 15 and 16-(*a*) to 16-(*c*), the point cloud transmission device performs geometry encoding on the geometry of the input point cloud data (1710). The encoded geometry is output to operation 1745 for multiplexing with encoded attributes, and the geometry reconstructed based on the encoded geometry is output to operation 1720 for attribute encoding. The geometry encoding 1710 is the same as the geometry coding 1510 described with reference to FIG. 15, and the geometry encoding, geometry quantization, and entropy coding of the geometry encoder described with reference to FIG. 16-(*a*), and thus a detailed description thereof is omitted. The point cloud transmission device performs geometry decoding on the encoded geometry (or reconstructed geometry) (1720) and recoloring for matching the decoded geometry and attributes (1725). The geometry decoding 1720 and the recoloring 1725 are the same as the geometry decoding/recoloring described with reference to FIG. 15 and the dequantization/decoding and recoloring in FIG. 16-(*b*), and thus a detailed description thereof is omitted. The point cloud transmission device according to the embodiments performs a projection operation on the recolored geometry data. The projection operation according to the embodiments includes coordinate conversion 1730, coordinate projection 1731, laser position adjustment 1732, sampling rate adjustment 1733, and projection domain voxelization 1734. In the coordinate conversion 1730, coordinate conversion of the colored geometry data is performed. The coordinate conversion according to the embodiments is the same as the coordinate conversion described with reference to FIG. 16, and thus a detailed description thereof is omitted. In the coordinate projection 1731, coordinate projection is performed on the coordinate-converted geometry data. The coordinate projection according to the embodiments is the same as the coordinate projection described with reference to FIG. 16, and thus a detailed description thereof is omitted. The point cloud transmission device according to the embodiments may perform the laser position adjustment operation 1732, the sampling rate adjustment operation 1733, and the projection domain voxelization operation 1734 sequentially or selectively to correct the projection. The laser position adjustment, sampling rate adjustment, and projection domain voxelization performed in FIG. 17 are the same as the laser position adjustment, sampling rate adjustment, and voxelization described with reference to FIG. 16, and thus detailed descriptions thereof will be omitted.

Attribute coding 1740 and entropy coding 1745 are performed based on the geometry for which the projection has been corrected by performing at least one of the operations 1732 to 1734. The attribute coding and entropy coding in FIG. 17 are the same as the attribute coding described with reference to FIG. 15 and the attribute encoding and entropy coding described with reference to FIG. 16-(*a*), and thus detailed descriptions thereof will be omitted.

FIG. 18 is a diagram illustrating an example of coordinate conversion of point cloud data according to embodiments.

As described with reference to FIGS. 15 to 17, the point cloud transmission device converts coordinates of the geometry (i.e., the positions of the points). The geometry is information indicating the positions (e.g., locations, etc.) of points in a point cloud. As described with reference to FIG. 4, the geometry may be represented as values of 2-dimensional coordinates (e.g., parameters (x, y) of Cartesian coordinates composed of x-axis and y-axis, parameters (r, θ)

of cylindrical coordinates) or 3-dimensional coordinates (e.g., parameters (x, y, z) of 3-dimensional orthogonal coordinates, parameters (r, θ, z) of cylindrical coordinates, parameters (ρ, θ, ϕ) of spherical coordinates, etc.). However, depending on the type and/or coordinates of the point cloud data, the positions of points indicated by the geometry may be expressed as having irregular positions or distribution. For example, the geometry of LiDAR data represented as Cartesian coordinates indicates that the distance between points increases as the distance from the origin increases. For example, for a geometry presented in a cylindrical coordinate system, a uniform distribution may be presented even for points far from the origin, but may not be presented for points close to the origin because the distance between the points increases. A larger amount of information, that is, geometry, is required to express the irregular positions and distribution of points, which may result in lowered efficiency of geometry coding. Therefore, the point cloud encoder according to the embodiments (e.g., the point cloud encoder described with reference to FIGS. 1, 4, 11, 14, and 15) may convert some and/or all of the coordinates of the geometry in order to increase the efficiency of geometry coding. In other words, the point cloud encoder according to the embodiments may uniformly distribute the points of the point cloud data by projecting (converting the positions) of the point cloud data (e.g., LiDAR data acquired through LiDAR).

FIG. 18 illustrates an example of converting coordinates to perform a projection process in a point cloud transmission device or transmission method according to embodiments.

In particular, FIG. 18 shows examples of mutually convertible coordinate systems, namely, a 3D orthogonal coordinate 1800, a cylindrical coordinate system 1810, and a spherical coordinate system 1820. Coordinate systems according to embodiments are not limited to these examples.

The 3D orthogonal coordinate system 1800 may be converted to the cylindrical coordinate system 1810, and vice versa.

The 3D orthogonal coordinate system 1800 may be composed of X-axis, Y-axis, and Z-axis orthogonal to each other at the origin. A point (or parameter) in the 3D orthogonal coordinate system may be expressed as (x, y, z). The X-Y plane formed by the X and Y axes, the Y-Z plane formed by the Y and Z axes, and the X-Z plane formed by the X and Z axes may perpendicularly intersect each other at the origin. The names of the X-axis, Y-axis, and Z-axis according to the embodiments are terms merely used to distinguish among the axes, and may be replaced with other names.

The cylindrical coordinate system 1810 may be composed of X-axis, Y-axis, and Z-axis orthogonal to each other at the origin. Any point (or parameter) P in the cylindrical coordinate system 1810 may be expressed as (r, θ, z). Here, r denotes the distance from the origin to a point obtained by orthogonally projecting point P in the coordinate space onto the X-Y plane. 0 denotes the angle between the positive direction of the X axis and a straight line connecting the origin to the point obtained by orthogonally projecting point P onto the X-Y plane. z denotes the distance between point P and the point obtained by projecting point P onto the X-Y plane. The names of the X-axis, Y-axis, and Z-axis according to the embodiments are terms merely used to distinguish among the axes, and may be replaced with other names.

Equation 1811 shown in FIG. 18 represents an equation used to express geometry information represented by orthogonal coordinates as cylindrical coordinates in converting the orthogonal coordinate system into the cylindrical coordinate system according to the orthogonal-to-cylindrical coordinate conversion. That is, Equation 1811 shows that the parameters of the cylindrical coordinate system may be expressed with one or more parameters of the orthogonal coordinate system according to the coordinate conversion (e.g., $r=\sqrt{x^2+y^2}$).

Equation 1812 shown in FIG. 18 represents an equation used to express geometry information represented by cylindrical coordinates as orthogonal coordinates in converting the cylindrical coordinates into orthogonal coordinates according to the cylindrical-to-orthogonal coordinate conversion. That is, Equation 1812 shows that the parameters of the orthogonal coordinate system may be expressed with one or more parameters of the cylindrical coordinate system according to the coordinate conversion (e.g., $x=r \cos \theta$).

The 3D orthogonal coordinate system 1800 may be converted into the spherical coordinate system 1820, and vice versa.

The spherical coordinate system 1820 may be composed of X-axis, Y-axis, and Z-axis orthogonal to each other at the origin. Any point (or parameter) P in the spherical coordinate system 1820 may be expressed as (ρ, Ø, θ). ρ denotes the distance from the origin to point P and has a value greater than or equal to 0 ($\rho \geq 0$). Ø denotes the angle between the positive direction of the Z axis and P, and has a value in a specific range ($0 \leq Ø \leq \pi$). θ denotes the angle between a point obtained by orthogonally projecting point P onto the X-Y plane and the positive direction of the X-axis, and has a value within a specific range ($0 \leq \theta \leq 2\pi$). The names of the X-axis, Y-axis, and Z-axis according to the embodiments are terms merely used to distinguish among the axes, and may be replaced with other names.

Equation 1821 shown in FIG. 18 represents an equation used to express geometry information represented by orthogonal coordinates as spherical coordinates in converting the orthogonal coordinates into spherical coordinates according to the orthogonal-to-spherical coordinate conversion. That is, Equation 1821 shows that the parameters of the spherical coordinate system may be expressed with one or more parameters of the orthogonal coordinate system according to the coordinate conversion (e.g., $\rho=\sqrt{x^2+y^2+z^2}$).

Equation 1822 shown in FIG. 18 represents an equation used to express geometry information represented by spherical coordinates as orthogonal coordinates in converting the spherical coordinates into orthogonal coordinates according to the spherical-to-orthogonal coordinate conversion. That is, Equation 1822 shows that the parameters of the orthogonal coordinate system may be expressed with one or more parameters of the spherical coordinate system according to the coordinate conversion (e.g., $z=\rho \cos \theta$).

Figure 19:
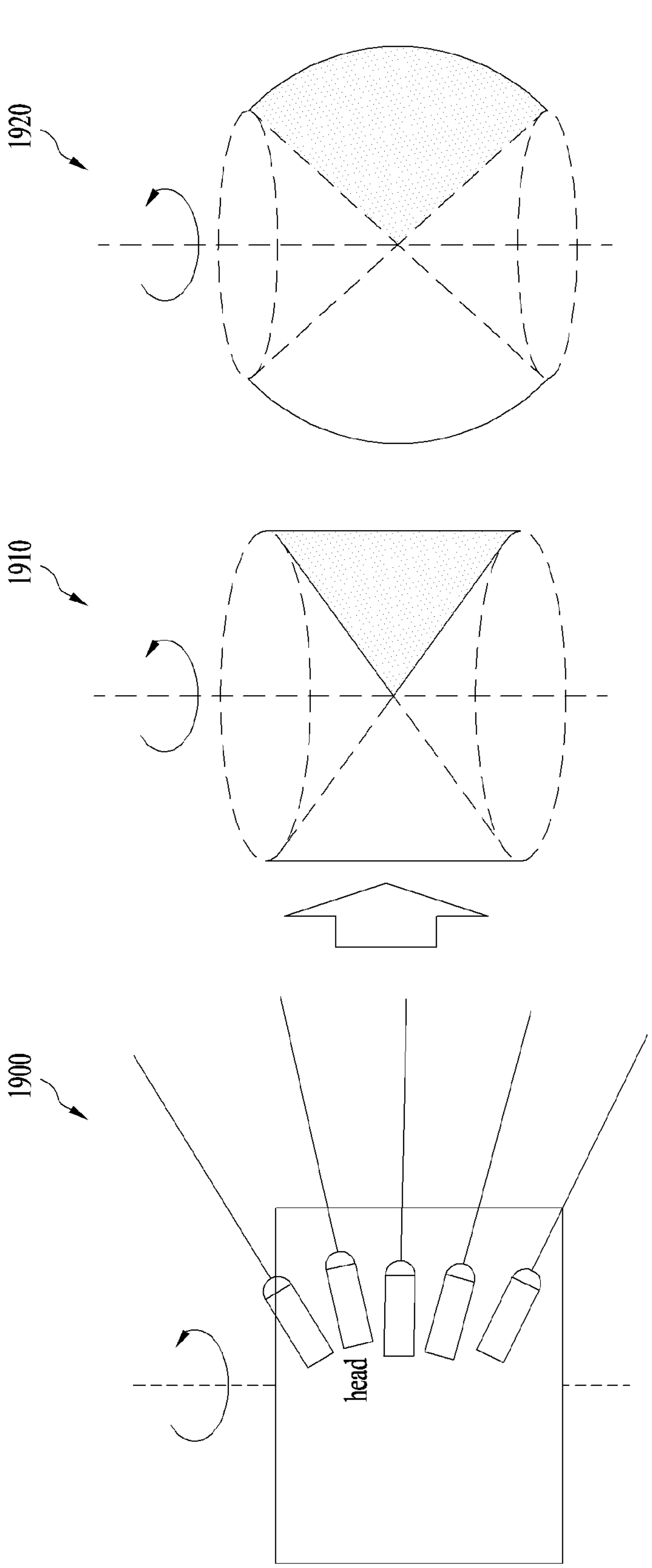
FIG. 19 is a diagram illustrating an example of a fan-shaped coordinate system according to embodiments.

FIG. 19 is a diagram illustrating an example of fan-shaped coordinate systems according to embodiments. The fan-shaped coordinate systems according to the embodiments may be additional options other than the cylindrical coordinate system and the spherical coordinate system for coordinate conversion. The fan-shaped coordinate systems are employed, considering that data is acquired while lasers of the LiDAR arranged in a vertical plane rotate horizontally.

FIG. 19 illustrates an example of coordinate systems considering the arrangement of laser modules of LiDAR data. The left part of FIG. 19 shows a LiDAR (Light Detection And Ranging or Light Imaging, Detection, And Ranging) head 1900 that collects LiDAR data. LiDAR data is secured using the LiDAR technique, by which the distance is measured by radiating laser to a target. The LiDAR head 1900 includes one or more laser modules (or laser sensors) disposed at regular angular intervals in the vertical plane and horizontally rotates about the vertical axis to acquire data. Times (and/or wavelengths) taken for the laser beams output from the respective laser modules to return after reflecting on an object may be the same or different from each other. Therefore, LiDAR data is a 3D representation constructed based on the difference in time and/or wavelength of laser beams returning from the object. In order to have a wider coverage, the laser modules are disposed to output the laser radially. Accordingly, the coordinate system according to the embodiments includes a fan-shaped cylindrical coordinate system 1910 formed by rotating a fan-shaped plane corresponding to the shape of laser output from the laser modules 360 degrees around the axis of the cylindrical coordinate system, and a fan-shaped spherical coordinate system 1920 formed by rotating a fan shape corresponding to a portion of a combination of the cylindrical coordinate system and the spherical coordinate system 360 degrees around the axis of the spherical coordinate system. When the vertical direction of the cylindrical coordinate system is expressed as an elevation, the fan-shaped cylindrical coordinate system 1910 has a specific range. Also, when the vertical direction of the spherical coordinate system is expressed as an elevation, the fan-shaped spherical coordinate system 1920 has a specific range.

Figure 20:
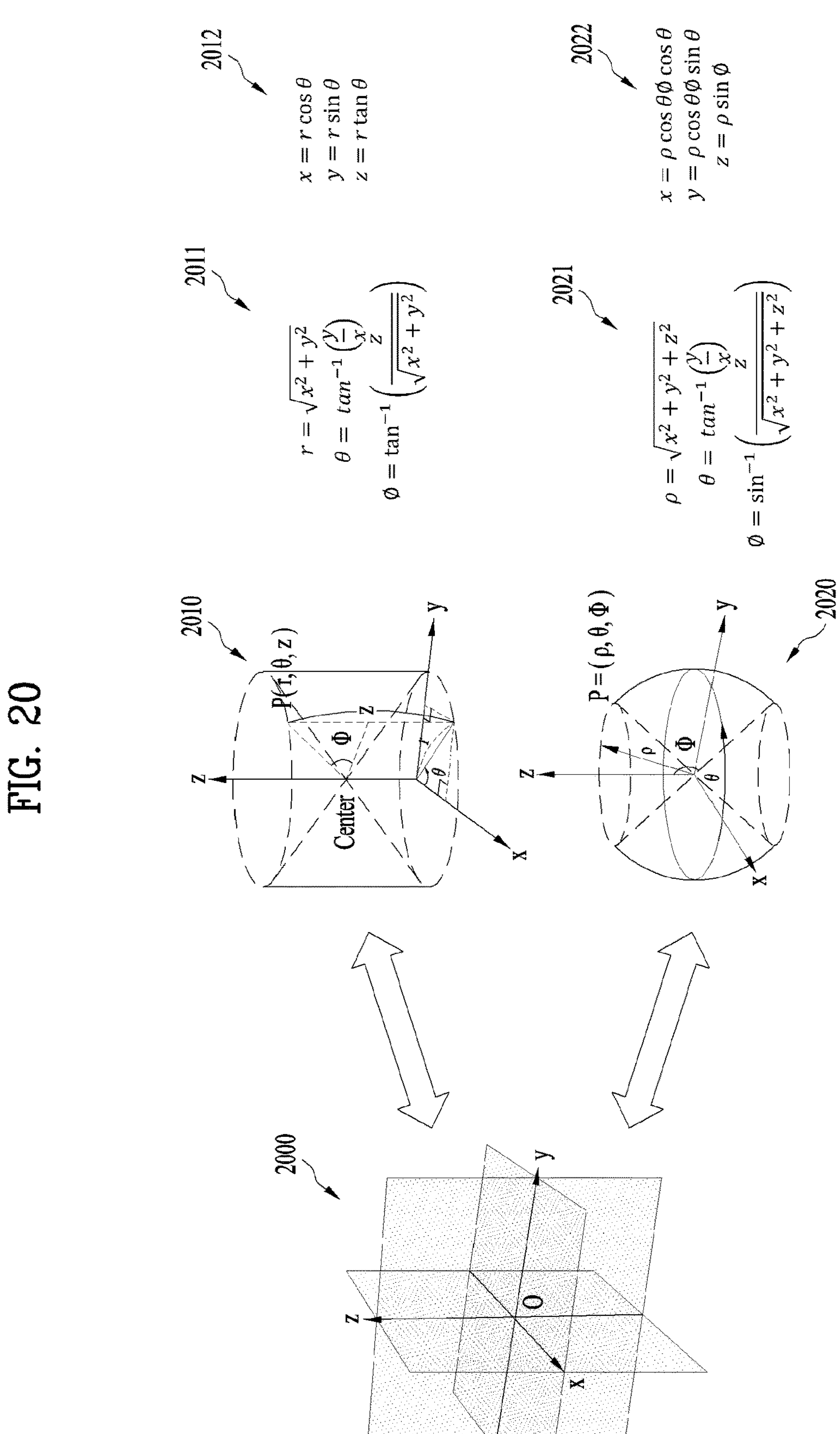
FIG. 20 is a diagram illustrating an example of conversion of the fan-shaped coordinate system of point cloud data according to embodiments.

FIG. 20 is a diagram illustrating an example of conversion of the fan-shaped coordinate system of point cloud data according to embodiments.

As described with reference to FIGS. 15 to 17, the point cloud transmission device performs coordinate conversion. FIG. 20 illustrates coordinate conversion of converting an orthogonal coordinate system 2000 (e.g., the orthogonal coordinate system 1800 described with reference to FIG. 18) into a fan-shaped cylindrical coordinate system 2010 (e.g., the fan-shaped cylindrical coordinate system 1910 described with reference to FIG. 19) and a fan-shaped spherical coordinate system 2020 (e.g., the fan-shaped spherical coordinate system 1920 described with reference to FIG. 19) based on the characteristics of the laser modules, and vice versa. Convertible coordinate systems according to embodiments are not limited to the above-described examples.

The orthogonal coordinate system 2000 may be converted into the fan-shaped cylindrical coordinate system 2010, and vice versa.

The orthogonal coordinate system 2000 is the same as the 3D orthogonal coordinate system 1800 described with reference to FIG. 18, and thus a detailed description thereof is omitted.

The fan-shaped cylindrical coordinate system 2010 may be composed of X-axis, Y-axis, and Z-axis orthogonal to each other at the origin. Any point (or parameter) P in the fan-shaped cylindrical coordinate system 2010 may be expressed as ($r$, $\theta$, $\phi$). $r$ denotes the distance from the origin to a point obtained by orthogonally projecting point P in the coordinate space onto the X-Y plane. $\theta$ denotes the angle between the positive direction of the X axis and a straight line connecting the origin to the point obtained by orthogonally projecting point P onto the X-Y plane. $\phi$ denotes the angle between a straight line that passes through the center of the planar fan shape described with reference to FIG. 19 and is perpendicular to the straight line connecting point P and the point obtained by orthogonally projecting point P onto the X-Y plane, and the straight line connecting the center and point P (shown as a dotted line). The names of the X-axis, Y-axis, and Z-axis according to the embodiments are terms merely used to distinguish among the axes, and may be replaced with other names.

Equation 2011 shown in FIG. 20 represents an equation used to express geometry information represented by orthogonal coordinates as cylindrical coordinates in converting the orthogonal coordinate system 2000 into the fan-shaped cylindrical coordinate system according to the orthogonal-to-fan-shaped cylindrical coordinate conversion. That is, Equation 2011 shows that the parameters of the fan-shaped cylindrical coordinate system may be expressed with one or more parameters of the orthogonal coordinate system according to the coordinate conversion (e.g., $r=\sqrt{x^2+y^2}$).

Equation 2012 shown in FIG. 20 represents an equation used to express geometry information represented by fan-shaped cylindrical coordinates as orthogonal coordinates in converting the fan-shaped cylindrical coordinates into orthogonal coordinates according to the fan-shaped cylindrical-to-orthogonal coordinate conversion. That is, Equation 2012 shows that the parameters of the orthogonal coordinate system may be expressed with one or more parameters of the fan-shaped cylindrical coordinate system according to the coordinate conversion (e.g., $x=r\cos\theta$).

The orthogonal coordinate system 2000 according to the embodiments may be converted into the fan-shaped spherical coordinate system 2020, and vice versa.

The fan-shaped spherical coordinate system 2020 may be composed of X-axis, Y-axis, and Z-axis orthogonal to each other at the origin. Any point (or parameter) P in the fan-shaped spherical coordinate system 2020 may be expressed as ($\rho$, $\theta$, $\phi$). $\rho$ denotes the distance from the origin to point P and has a value greater than or equal to 0 ($\rho\geq 0$). $\theta$ denotes the angle between a point obtained by projecting point P onto the X-Y plane along the curved surface and the positive direction of the X-axis, and has a value within a specific range ($0\leq\theta\leq 2\pi$). $\phi$ denotes the angle between the line connecting point P and the point obtained by orthogonally projecting point P onto the X-Y plane along the curved surface and the straight line connecting the origin and point P (shown as a dotted line). The names of the X-axis, Y-axis, and Z-axis according to the embodiments are terms merely used to distinguish among the axes, and may be replaced with other names.

Equation 2021 shown in FIG. 20 represents an equation used to express geometry information represented by orthogonal coordinates as fan-shaped spherical coordinates in converting the orthogonal coordinates into fan-shaped spherical coordinates according to the orthogonal-to-fan-shaped spherical coordinate conversion. That is, Equation 2021 shows that the parameters of the fan-shaped spherical coordinate system may be expressed with one or more parameters of the orthogonal coordinate system according to the coordinate conversion (e.g., $\rho=\sqrt{x^2+y^2+z^2}$).

Equation 2022 shown in FIG. 20 represents an equation used to express geometry information represented by fan-shaped spherical coordinates as orthogonal coordinates in converting the fan-shaped spherical coordinates into orthogonal coordinates according to the fan-shaped spherical-to-orthogonal coordinate conversion. That is, Equation 2022 shows that the parameters of the orthogonal coordinate system may be expressed with one or more parameters of the fan-shaped spherical coordinate system according to the coordinate conversion (e.g., $z=\rho\sin\varphi$).

According to embodiments, the coordinate conversion may include selecting a coordinate system and applying the coordinate conversion application. In the coordinate system selection, coordinate conversion information is induced. The coordinate conversion information may include whether to perform coordinate conversion or coordinate system information. The coordinate conversion information may be signaled in a unit such as a sequence, frame, tile, slice, block, or the like. In addition, the coordinate conversion information may be derived based on a coordinate conversion status of a neighbor block, the size of the block, the number of points, the quantization value, the block partition depth, the position of the unit, and the distance between the unit and the origin. The application of the coordinate conversion is an operation of converting a coordinate system based on the coordinate system selected in the coordinate system selection. In the application of the coordinate conversion, coordinate conversion may be performed based on the coordinate conversion information. Alternatively, the coordinate conversion may not be performed based on the coordinate conversion status information.

That is, the point cloud data transmission device according to the embodiments (e.g., the point cloud data transmission device described with reference to FIGS. 1, 11, 14, and 15) may generate signaling information related to coordinate conversion transmit the same to a point cloud data reception device (e.g., the point cloud data transmission device described with reference to FIGS. 1, 13, 14, and 16). The signaling information related to the coordinate conversion (e.g., the coordinate conversion information) may be signaled at a sequence level, a frame level, a tile level, a slice level, or the like. The point cloud decoder according to the embodiments (e.g., the point cloud decoder described with reference to FIGS. 1, 13, 14, and 16) may perform a decoding operation, which is the reverse process of the encoding operation of the point cloud encoder, based on the signaling information related to the coordinate conversion (e.g., the coordinate conversion information). Alternatively, the point cloud decoder may not receive the signaling information related to the coordinate conversion. Instead, it may perform the coordinate conversion by deriving the signaling information based on the coordinate conversion status of a neighbor block, the size of the block, the number of points, the quantization value, and the like.

FIG. 21 is a diagram illustrating an example of a coordinate projection of point cloud data according to embodiments.

The point cloud transmission device according to the embodiments performs coordinate projection for projecting, in a compressible form, the geometry presented in the coordinate system into which the original coordinates are converted according to the coordinate conversion described with reference to FIGS. 15 to 20. FIG. 21 illustrates an example of the coordinate projection described with reference to FIGS. 15 to 17. FIG. 21 illustrates a process of converting (projecting) a fan-shaped cylindrical coordinate system 2100 (e.g., the fan-shaped cylindrical coordinate system 1910 described with reference to FIG. 19, the fan-shaped cylindrical coordinate system 2010 described with reference to FIG. 20) and a fan-shaped spherical coordinate system 2110 (e.g., the fan-shaped spherical coordinate system 1920 described with reference to FIG. 19 and the fan-shaped spherical coordinate system 2020 described with reference to FIG. 20) into a cuboid space 2120, and vice versa.

The cuboid space 2120 may be presented in a 3D coordinate system composed of an x-axis, a y-axis, and a z-axis (or an x'-axis, a y'-axis, and a z'-axis), and may be referred as a bounding box. In addition, each of the x'-axis, y'-axis, and z'-axis has a maximum value (x_max, y_max, z_max) and a minimum value (x_min, y_min, z_min). In the conversion process shown in FIG. 21, the parameters (r, θ, ϕ) representing a point P in the fan-shaped cylindrical coordinate system 2100 and the parameters (ρ, θ, ϕ) representing a point P in the fan-shaped spherical coordinate system 2110 are expressed as parameters of the x'-axis, y'-axis, and z'-axis, respectively. Each parameter of the parameters (r, θ, ϕ) and parameters (ρ, θ, ϕ) corresponds to one of the x'-axis, y'-axis, and z'-axis (e.g., r corresponds to the X'-axis) or may be converted and correspond thereto according to a separate conversion equation. For example, the parameter ϕ of the fan-shaped cylindrical coordinate system 2100 having a limited range is mapped to the z'-axis by applying a tangent function. Therefore, values mapped to the z'-axis are grouped according to the limited range, and accordingly compression efficiency may be increased.

The projection of the parameters (r, θ, ϕ) of the fan-shaped cylindrical coordinate system 2110 may be performed as in Equation 5.

$$f_x(r) = r = \sqrt{(x-x_c)^2 + (y-y_c)^2},$$
$$f_y(\theta) = \theta = \tan^{-1}\left(\frac{y-y_c}{x-x_c}\right),$$
$$f_z(\phi) - \phi = \tan^{-1}\left(\frac{z-z_c}{\sqrt{(x-x_c)^2 + (y-y_c)^2}}\right)$$
[Equation 5]

That is, $f_x(r)$ represents projection of parameter r onto the x-axis, $f_y(\theta)$ represents projection of parameter θ onto the y-axis, and $f_z(\phi)$ represents projection of parameter ϕ onto the z-axis. The projection that minimizes the calculation of the trigonometric function of Equation 5 may be represented as Equation 6.

$$f_x(r) = r^2 = (x-x_c)^2 + (y-y_c)^2,$$
$$f_y(\theta) = \cos^2\frac{\theta}{2} = \frac{1+\cos\theta}{2} = \left[1 + \frac{x-x_c}{\sqrt{(x-x_c)^2 + (y-y_c)^2}}\right] \Big/ 2 = \frac{r+x-x_c}{2r},$$
$$f_z(\phi) = \tan\phi \frac{z-z_c}{\sqrt{(x-x_c)^2 + (y-y_c)^2}} = \frac{z-z_c}{r}$$
[Equation 6]

The projection of the parameters (ρ, θ, ϕ) of the fan-shaped spherical coordinate system 2110 may be performed as shown in Equation 7.

$$f_x(\rho) = \rho = \sqrt{(x-x_c)^2 + (y-y_c)^2 + (z-z_c)^2},$$
$$f_y(\theta) = \theta = \tan^{-1}\left(\frac{y-y_c}{x-x_c}\right),$$
$$f_z(\phi) = \phi = \sin^{-1}\left(\frac{z-z_c}{\sqrt{(x-x_c)^2 + (y-y_c)^2 + (z-z_c)^2}}\right)$$
[Equation 7]

That is, $f_x(\rho)$ represents projection of parameter ρ onto the x-axis, $f_y(\theta)$ represents projection of parameter θ onto the y-axis, and $f_z(\phi)$ represents projection of parameter ϕ onto the z-axis. The projection that minimizes the calculation of the trigonometric function of Equation 7 may be represented as Equation 8.

$$f_x(\rho) = \rho^2 = (x-x_c)^2 + (y-y_c)^2 + (z-z_c)^2,$$
$$f_y(\theta) = \cos^2\frac{\theta}{2} = \frac{1+\cos\theta}{2} = \left[1 + \frac{x-x_c}{\sqrt{(x-x_c)^2 + (y-y_c)^2}}\right] \Big/ 2 = \frac{r+x-x_c}{2r},$$
[Equation 8]

-continued $$f_z(\phi) = \sin(\phi) = \frac{z - z_c}{\sqrt{(x - x_c)^2 + (y - y_c)^2 + (z - z_c)^2}} = \frac{z - z_c}{\rho}$$

In the above equations, $(x_c, y_c, z_c)$ is the center position of the fan-shaped cylindrical coordinate system 2100 before projection (i.e., conversion), and the center is the same as the center of the planar fan shape described with reference to FIG. 19. Also, $(x_c, y_c, z_c)$ may represent a LiDAR head position (e.g., the origin of xyz coordinates of the world coordinate system).

In the structure of the LiDAR, a plurality of lasers is arranged on the LiDAR head in a vertical plane. In particular, lasers may be disposed on the upper and lower portions of the LiDAR head, respectively, to acquire more point cloud data. In this case, a difference in position between the lasers may occur, which may cause a decrease in accuracy of projection. Accordingly, a method of adjusting the projection in consideration of the positions of the lasers may be used.

FIG. 22 is a diagram illustrating an example of adjustment of a laser position of point cloud data according to embodiments. That is, the figure illustrates projection correction performed in consideration of the laser position of the LiDAR.

The projection correction considering the laser position according to the embodiments may be performed by hardware including the transmission device in FIG. 1, the transmission device in FIG. 4, the transmission device in FIG. 12, the XR device in FIG. 14, the transmission device in FIG. 15, the transmission device in FIG. 16, the transmission method in FIG. 17, and/or one or more processors or integrated circuits configured to communicate with one or more memories, software, firmware, or a combination thereof. Specifically, it may be performed by the projection 1540 in FIG. 15, the projection preprocessor 1620 in FIG. 16, or operation 1732 in FIG. 17 according to the embodiments.

Figure 44:
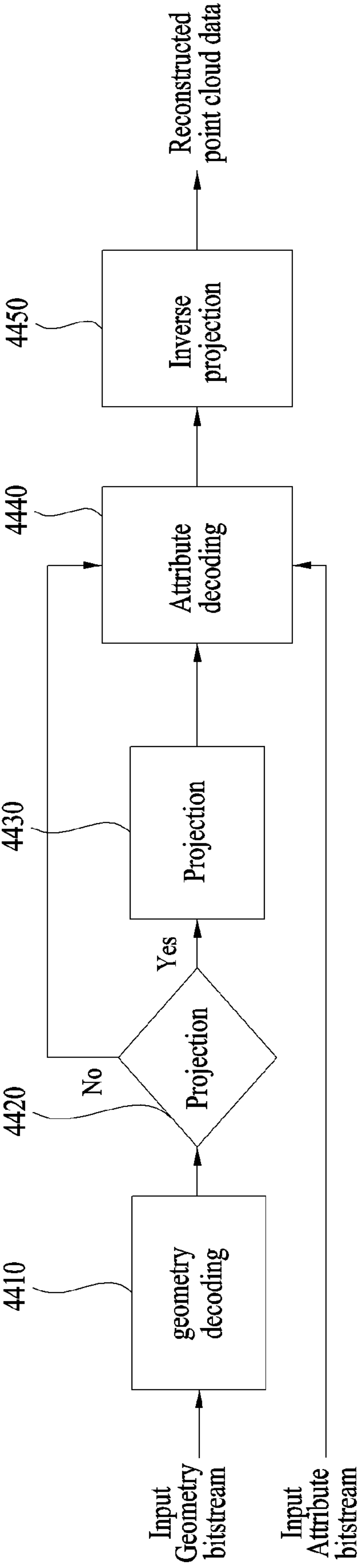
FIG. 44 is a diagram illustrating another example of a point cloud reception device according to embodiments.
Figure 46:
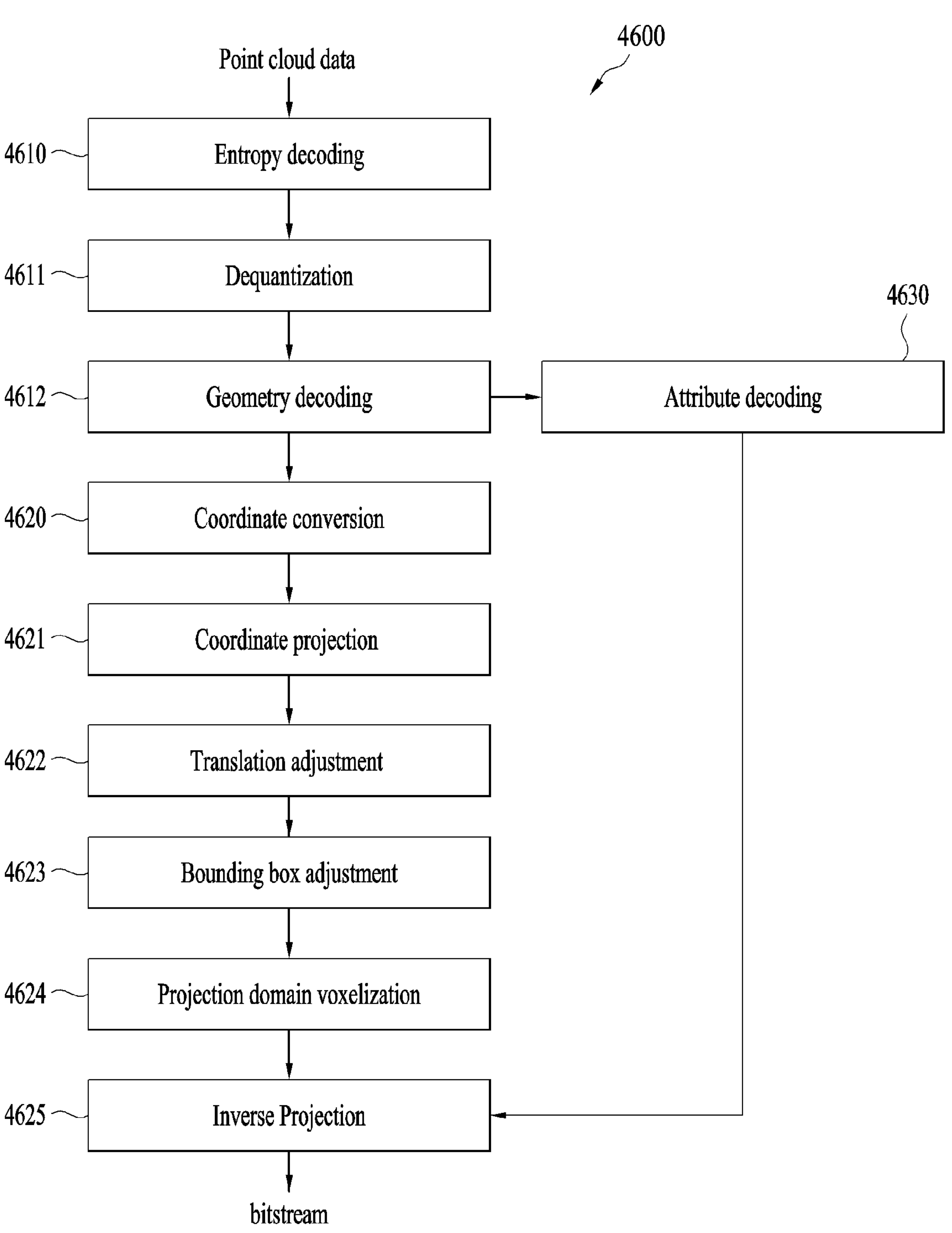
FIG. 46 is a diagram illustrating an example of a processing process of a point cloud reception device according to embodiments.
Figure 48:
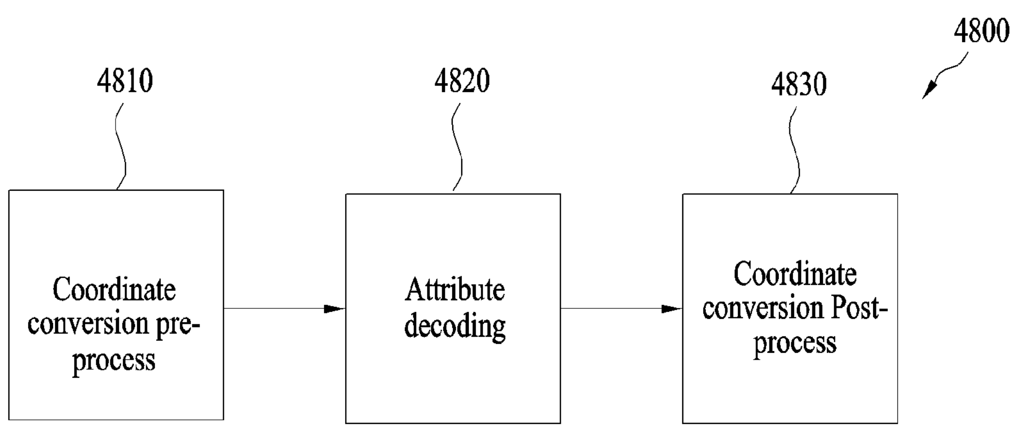
FIG. 48 is a diagram illustrating an example of a processing procedure of a point cloud reception device according to embodiments.

In addition, the projection correction considering the laser position may be performed by hardware including the reception device in FIG. 1, the reception device in FIG. 11, the reception device in FIG. 13, the XR device in FIG. 14, the reception device in FIG. 44, the reception device in FIG. 45, the reception method in FIG. 46, or the reception device in FIG. 48, and/or one or more processors or integrated circuits configured to communicate with one or more memories, software, firmware, or a combination thereof.

FIG. 22 illustrates an example of the laser position adjustment 1642 described with reference to FIG. 16 and the laser position adjustment 1732 described with reference to FIG. 17. As described with reference to FIG. 19, a LiDAR head (e.g., the LiDAR head 1900 described with reference to FIG. 19) includes one or more laser modules arranged in a vertical plane. The one or more laser modules are arranged to emit lasers radially in order to secure a large amount of data with wider coverage. The laser is actually output from the ends of the laser modules. Therefore, the position of the laser is different from the LiDAR head position corresponding to the center of the planar sector described with reference to FIGS. 19 and 20. In addition, there is a difference in position between the uppermost laser output from the laser module disposed at the top of the LiDAR head and the lowest laser output from the laser module disposed at the bottom of the LiDAR head. If the difference in position between these lasers is not reflected, the accuracy of the projection may be lowered. Accordingly, the point cloud transmission device according to the embodiments performs projection by reflecting laser position adjustment such that the starting point of each laser is at the LiDAR head position.

The upper part of FIG. 22 shows a structure 2200 of a LiDAR head including a laser module that outputs a laser. As shown in FIG. 22, the position of the laser output from the laser module is expressed as a relative position away from the LiDAR head position $(x_c, y_c, z_c)$ by $r_L$ in the horizontal direction and by $z_L$ in the vertical direction.

The lower part of FIG. 22 shows an example 2210 of the relative position of the laser presented in a 3D coordinate system. The 3D coordinate system shown in the figure is a coordinate system for presenting the projection described with reference to FIG. 21 (e.g., the cuboid space 2120), and is composed of an x'-axis, a y'-axis, and a z'-axis. The head position described above is set as the origin (0, 0, 0) of the coordinate system, and the relative position of the laser is expressed as $(x_L, y_L, z_L)$. The parameters $x_L$ and $y_L$ may be obtained based on $r_L$ (i.e., a relative distance from the head position in the horizontal direction) as in Equation 9 below.

$$x_L = r_L \cdot \cos\theta. \; y_L = r_L \cdot \sin\theta \qquad \text{[Equation 9]}$$

According to embodiments, $(x_L, y_L, z_L)$ may be directly calculated by the point cloud transmission device and reception device, or may be transmitted to the point cloud transmission device and reception device through signaling.

Values applied to the laser position of the parameters $(r, \theta, \phi)$ of the fan-shaped spherical coordinate system (e.g., the fan-shaped spherical coordinate system 2110) may be obtained as in Equation 10. That is, Equation 10 is an example of conversion in to the fan-shaped cylindrical coordinate system considering the positions of the lasers.

$$r_L = \sqrt{(x - x_c - x_L)^2 + (y - y_c - y_L)^2} = \sqrt{(x - x_c)^2 + (y - y_c)^2} - r_L, \qquad \text{[Equation 10]}$$

$$\theta_L - \tan^{-1}\left(\frac{y - y_c - y_L}{x - x_c - x_L}\right)\theta_l - \tan^{-1}\left(\frac{y - y_c - y_L}{x - x_c - x_L}\right)$$

$$\phi_L = \tan^{-1}\left(\frac{z - z_c - z_L}{\sqrt{(x - x_c - x_L)^2 + (y - y_c - y_L)^2}}\right)$$

Values applied to the laser position of the parameters $(\rho, \theta, \phi)$ of the fan-shaped spherical coordinate system (e.g., the fan-shaped spherical coordinate system 2110) are obtained as in Equation 11 below. That is, Equation 11 is an example of conversion into a fan-shaped spherical coordinate system considering the position of the lasers.

$$\rho_L = \sqrt{(x - x_c - x_L)^2 + (y - y_c - y_L)^2 + (z - z_c - z_L)^2}, \qquad \text{[Equation 11]}$$

$$\theta_L = \tan^{-1}\left(\frac{y - y_c - y_L}{x - x_c - x_L}\right)$$

$$\phi_L \sin^{-1}\left(\frac{z - z_c - z_L}{(x - x_c - x_L)^2 + (y - y_c - y_L)^2 + (z - z_c - z_L)^2}\right)$$

When the relative position of the laser is considered as described above, the start point of each laser may start at the head position through Equation 10 or Equation 11 above.

As described above, the point cloud transmission device may perform attribute coding by re-sorting points based on the Morton code. The Morton code assumes that the position information related to each point is a positive integer. Therefore, the point cloud transmission device performs voxelization (e.g., the voxelization described with reference to FIGS. 4 to 6) such that the parameters representing the position of the projected point cloud data (e.g., parameters ($x_L$, $y_L$, $z_L$) of the coordinate system representing the cuboid space 2120 described with reference to FIGS. 21 and 22) become positive integers. When the distance between points is sufficiently long, lossless compression may be implemented even in the voxelization. However, when the distance between points is short, loss may occur in the voxelization. Accordingly, correction is needed to improve compression performance.

The point cloud transmission device according to the embodiment may perform additional correction by adjusting the sampling rate (e.g., the sampling rate adjustment 1643 described with reference to FIG. 16) for the projected point cloud data (e.g., geometry).

The projection correction considering the sampling characteristics may be performed by hardware including the transmission device in FIG. 1, the transmission device in FIG. 4, the transmission device in FIG. 12, the XR device in FIG. 14, the transmission device in FIG. 15, the transmission device in FIG. 16, the transmission method in FIG. 17, and/or one or more processors or integrated circuits configured to communicate with one or more memories, software, firmware, or a combination thereof. Specifically, it may be performed by the projection 1540 in FIG. 15, the projection preprocessor 1620 in FIG. 16, or operation 1733 in FIG. 17 according to the embodiments.

In addition, the projection correction considering the sampling characteristics may be performed by hardware including the reception device in FIG. 1, the reception device in FIG. 11, the reception device in FIG. 13, the XR device in FIG. 14, the reception device in FIG. 44, the reception device in FIG. 45, the reception method in FIG. 46, or the reception device in FIG. 48, and/or one or more processors or integrated circuits configured to communicate with one or more memories, software, firmware, or a combination thereof.

The sampling rate adjustment according to the embodiments is performed by defining a scale factor for each axis of the projection in consideration of a range of projection values and characteristics of the data acquisition device (e.g., LiDAR). As described with reference to FIGS. 19 to 22, parameter r of the fan-shaped cylindrical coordinate system (e.g., the fan-shaped cylindrical coordinate system 1910, the fan-shaped cylindrical coordinate system 2010, the fan-shaped cylindrical coordinate system 2100, etc.) and parameter ρ of the fan-shaped spherical coordinate system (e.g., the fan-shaped spherical coordinate system 1920, the fan-shaped spherical coordinate system 2020, and the fan-shaped spherical coordinate system 2110) indicates the distance from the center of each coordinate system to the target point (e.g., point P described with reference to FIGS. 19 to 21). Therefore, parameters r and ρ have a value greater than or equal to 0, and the frequency of data is determined according to the interpretation capability of the acquisition device and the resolution according to the distance of the laser. Parameter θ of the fan-shaped cylindrical coordinate system and the fan-shaped spherical coordinate system indicates an azimuthal angle by which rotation is performed about the vertical axis. Therefore, parameter θ may have a range of 0 to 360 degrees, which determines the frequency of data acquired per degree while the LiDAR head (e.g., the LiDAR head described with reference to FIGS. 20 to 22) is rotated. Parameter φ of the fan-shaped spherical coordinate system indicates the elevation angle. The elevation angle is highly correlated with the angle of a single laser, and accordingly parameter φ may range from −π2 to π/2, and the frequency of data may be determined depending on the number of lasers, the vertical positions of the lasers, the accuracy of the lasers, and the like. Accordingly, in the sampling rate adjustment according to the embodiments, scale factors for the projection parameters are defined based on the characteristics of each parameter as described above.

Hereinafter, for simplicity, the scale factors for the projection (parameters r, θ, and φ) of a fan-shaped cylindrical coordinate system is described, but sampling rate adjustment is not limited to this example. Therefore, the sampling rate adjustment may be equally applied to other projections as well as the projection (parameters ρ, θ, and φ) of the fan-shaped spherical coordinate system.

The sampling rate adjustment for the projection of the fan-shaped cylindrical coordinate system according to the embodiments may be performed as shown in Equation 12 below.

$$f_s(r_L) = s_r \cdot f(r_L),\ f_s(\theta_s) = s_\theta \cdot f(\theta_L),\ f_s(\phi_s) = s_\phi \cdot f(\phi_L) \quad \text{[Equation 12]}$$

Here, $r_L$, $\theta_L$, and $\phi_L$ are parameters indicating a point on which the laser position adjustment is performed, and $f(r_L)$, $f(\theta_L)$, and $f(\phi_L)$ represent respective axes of the 3D coordinate system onto which the corresponding parameters are projected. $s_r$ is a scale factor for parameter $r_L$ and is applied to the axis (e.g., X'-axis) represented by $f(r_L)$, and $s_\theta$ is a scale factor for $\theta_L$ and is applied to the axis (e.g., Y'-axis) represented by $f(\theta_L)$. $s_\phi$ is a scale factor for $\phi_L$ and is applied to the axis (e.g., Z'-axis) represented by $f(\phi_L)$.

The sampling rate adjustment for the projection of the fan-shaped cylindrical coordinate system according to the embodiments may be performed as shown in Equation 13 below.

$$x' = s_r \cdot r_L,\ y' = s_\theta \cdot \theta_L,\ z' = s_\phi \cdot \tan\phi_L, \quad \text{[Equation 13]}$$

The scale factor parameters $s_r$, $s_\theta$, and $s_\phi$ may be derived from the maximum length of bounding box edges normalized to a length of a bounding box edge of each axis.

The scale factors may be defined based on mechanical characteristics of the point cloud data acquisition device. For example, when the acquisition device (e.g., the LiDAR head) provided with N vertically arranged lasers rotates in a horizontal direction, reflected laser light is detected M times per degree, and the radius of the spot created by each laser light source is D, the scale factors are defined as Equation 14 below.

$$s_r = k_r,\ s_\theta = k_\theta M,\ s_\phi = k_\phi D \quad \text{[Equation 14]}$$

Here, $k_r$, $k_\theta$, and $k_\phi$ are constants.

For example, when the minimum distance between data acquired per one laser light source is expressed in terms of the elevation, azimuth, and radial directions, the scale factors according to the embodiments may be defined as shown in Equation 15 below.

$$s_r = \frac{k_r}{\min(d_r)},\quad s_\theta = \frac{k_\theta}{\min(d_\theta)},\quad s_\phi = \frac{k_\phi}{\min(d_\phi)} \qquad \text{[Equation 15]}$$

Here, $d_r$, $d_\theta$, and $d_\phi$ denote distances for the radial direction, the rotational angle, and the elevation angle, respectively. min( ) may denote the minimum value within the point cloud data or the minimum value according to physical characteristics.

According to the embodiments, the scale factors may be defined as a function of the density on each axis as shown in Equation 16 below.

$$s_r = k_r N_r / D_r,\ s_\theta = k_\theta N_\theta / D_\theta,\ s_\phi = k_\phi N_\phi / D_\phi \qquad \text{[Equation 16]}$$

That is, a relatively large scale factor is applied to an axis on which the density per length is high, and a relatively small scale factor is applied to an axis on which the density per length is low. Here, N denotes the maximum number of points in a direction parallel to each axis, and D denotes the length of each axis. The value obtained by dividing N by D corresponds to the density on the corresponding axis.

According to the embodiments, the scale factors may be defined according to the importance of information. For example, information close to the origin may be considered as information of relatively high importance, and information far from the origin may be considered as information of relatively low importance. Therefore, the scale factors may be defined to assign a relatively large weight to information close to the origin, front information with respect to the azimuthal/elevation angle, or information close to the horizon, and are expressed as Equation 17 below.

$$s_r = k_r / g(r),\ s_\theta = k_\theta / g(\theta),\ s_\phi = k_\phi / g(\phi) \qquad \text{[Equation 17]}$$

Here, g(r), g(θ), and g(ϕ) denotes weights for the respective axes, and may be expressed as a reciprocal of a step function or an exponential function representing values set according to a range representing an important region.

The sampling rate adjuster of the point cloud transmission device according to the embodiments may shift each axis to start from the origin such that projected point cloud data (e.g., geometry) has a positive value, or may correct the length of each axis to be a power of 2. The projected point cloud data according to the correction may be expressed as Equation 18 below.

$$f_s(r_L) = \frac{2^{nr}-1}{\max_r}[s_r \cdot f(r_L) - \min_r],\quad f_s(\theta)_s = \frac{2^{n\theta}-1}{\max_\theta}[s_\theta \cdot f(\theta_L) - \min_\theta],\quad f_s(\phi)_s = \frac{2^{n\phi}-1}{\max_\phi}[s_\phi \cdot f(\phi_L) - \min_\phi] \qquad \text{[Equation 18]}$$

When the lengths of the three axes are corrected to be equal to each other to increase compression efficiency, the projected point cloud data according to the correction is expressed may be expressed as Equation 19 below. That is, Equation 19 is an example for a case where sampling_adjustment_cubic_flag is equal to 1.

$$f_s'(r_L) = \frac{\max}{\max_r} f_s(r_L),\quad f_s'(\theta_L) = \frac{\max}{\max_\theta} f_s(\theta_L),\quad f_s'(\phi_L) = \frac{\max}{\max_\phi} f_s(\phi_L), \qquad \text{[Equation 19]}$$

where max may denote $\max(\max_r, \max_\theta, \max_\phi)$. Alternatively, it may be a value corresponding to the nearest $2^n-1$ among the numbers greater than $\max(\max_r, \max_\theta, \max_\phi)$.

Information about the sampling rate adjustment (including information about the scale factors) according to the embodiments may be transmitted to a point cloud reception device (e.g., the reception device 10004 of FIG. 1, the point cloud decoder of FIGS. 10 and 11, the reception device of FIG. 13, the reception device of FIG. 44, the reception device of FIG. 45, the reception method of FIG. 46, or the reception device of FIG. 48), and the point cloud reception device obtains the information about the sampling rate adjustment and performs the sampling rate adjustment according to the information.

As described above, the point cloud data transmission device according to the embodiments may change the positions of points in consideration of characteristics (e.g., distribution of points) of the acquired point cloud data. In addition, the point cloud data transmission device according to the embodiments may change the positions of points based on a scale value for each axis according to the distribution of the points. When the scale value for each axis is greater than 1, the positions of the projected points may be sparser than the positions of the points before being projected. On the contrary, when the scale value for each axis is less than 1, the positions of the projected points may be denser than the positions of the points before being projected. For example, when the points of the acquired point cloud data are densely distributed along the x-axis and y-axis and sparsely distributed along the z-axis, the point cloud data transmission device may project the points to be uniformly distributed, based on α and β, which are greater than 1, and γ, which is less than 1.

The point cloud data transmission device according to the embodiments may perform attribute coding based on the positions (or geometry) of the projected points. That is, the point cloud data transmission device according to the embodiments may increase efficiency of attribute coding by using the projected geometry (e.g., geometry with a uniform distribution), thereby securing a higher coding gain.

Next, voxelization will be described.

The voxelization may be performed by the transmission device in FIG. 1, the transmission device in FIG. 4, the transmission device in FIG. 12, the XR device in FIG. 14, the transmission device in FIG. 15, the transmission device in FIG. 16, the transmission method in FIG. 17, and/or hardware including one or more processors or integrated circuits configured to communicate with one or more memories, software, firmware, or a combination thereof. Specifically, it may be performed by the projection 1540 in FIG. 15, the projection preprocessor 1620 in FIG. 16, or operation 1734 in FIG. 17 according to the embodiments.

In addition, the voxelization may be performed by the reception device in FIG. 1, the reception device in FIG. 11, the reception device in FIG. 13, the XR device in FIG. 14, the reception device in FIG. 44, the reception device in FIG. 45, the reception method in FIG. 46, or the reception device in FIG. 48, and/or hardware including one or more processors or integrated circuits configured to communicate with one or more memories, software, firmware, or a combination thereof.

Through the processing operations described with reference to FIGS. 15 to 22, point cloud data represented by X, Y, and Z coordinates may be converted into coordinates efficient for compression, such as a distance and an angle. Through the voxelization, the converted data may be converted into integer position information for applying a point cloud compression technique.

Figure 23:
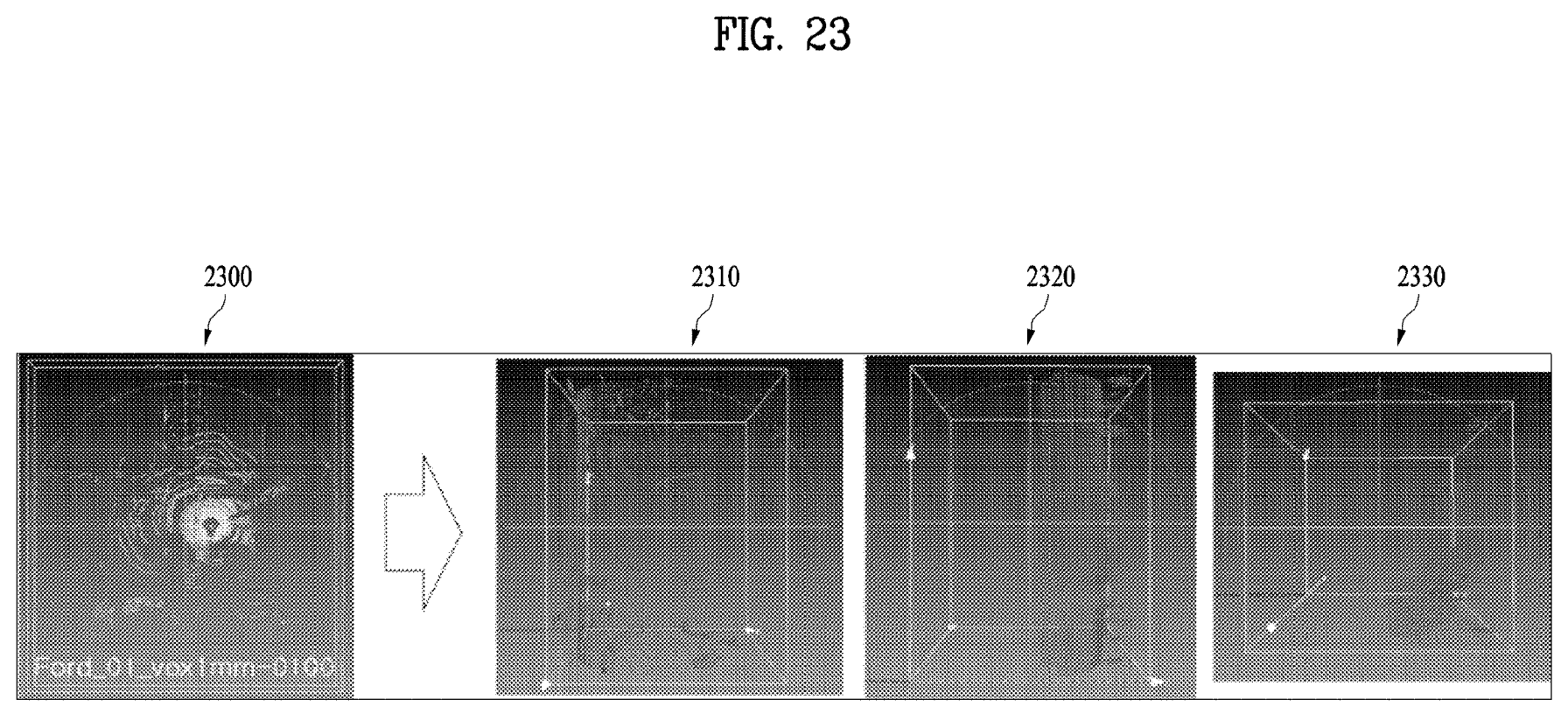

FIG. 23 is a diagram illustrating an example of voxelization according to embodiments.

The left part of FIG. 23 shows an example 2300 of point cloud data as one frame of a point cloud data sequence to which projection is not applied. The right part of FIG. 23 shows an example of point cloud data projected based on a fan-shaped cylindrical coordinate system. Specifically, the first example 2310 shows point cloud data projected onto the r-θ plane. The second example 2320 shows point cloud data projected onto the φ-θ plane. The third example 2330 shows point cloud data projected onto the φ-r plane.

The projection may be applied to all three axes of the coordinate system representing the position of each point, or selectively applied to at least one of the axes. Information indicating the projection type according to the embodiments (e.g., projection_type) may be defined for each axis. For example, information indicating the projection type on the x-axis is defined as projection_type x, information indicating the projection type on the y-axis is defined as projection_type y, and information indicating the projection type on the z-axis is defined as projection_type z. Signaling information including projection_type x, projection_type y, and projection_type z is transmitted to the point cloud data reception device through a bitstream. The signaling information according to the embodiments may or may not include projection_type.

When the value of projection_type x is 0, projection_type x indicates that projection is not performed on the x-axis and the value of x is used without conversion. When the value of projection_type x is 1, projection_type x indicates that a conversion value by a coordinate system (e.g., a cylindrical coordinate system, a spherical coordinate system, a fan-shaped cylindrical coordinate system, a fan-shaped spherical coordinate system, etc.) indicated by coordinate_conversion_type (e.g., the radius in the cylindrical coordinate system) is used. When the value of projection_type x is 2, projection_type x indicates that a simplified conversion value (e.g., the value of x*x+y*y simplified by removing the square root for the radius in the cylindrical coordinate system) is used. When the value of projection_type x is 3, projection_type x indicates that a simplified sum of distances (e.g., the sum of position information about each axis, x+y, x+y+z, etc.) is used. When the value of projection_type x is 4, projection_type x indicates that a conversion value (e.g., log_2(x)) according to a predetermined function is used.

When the value of projection_type y is 0, projection_type y indicates that projection is not performed on the y-axis and the value of x is used without conversion. When the value of projection_type y is 1, projection_type y indicates that a conversion value by a coordinate system (e.g., a cylindrical coordinate system, a spherical coordinate system, a fan-shaped cylindrical coordinate system, a fan-shaped spherical coordinate system, etc.) indicated by coordinate_conversion_type (e.g., an azimuthal angle by the cylindrical coordinate system) is used. When the value of projection_type y is 2, projection_type y indicates that a simplified conversion value (e.g., a tangent value calculated to reduce the inverse tangent operation to obtain an angle as an angle value, assuming tan_phi=phi) is used. When the value of projection_type y is 3, projection_type y indicates that a simplified sum of distances (e.g., the difference in position information between the axes, x−y, y−x−z, or the like) is used. When the value of projection_type y is 4, projection_type y indicates that a conversion value (e.g., log_2(y)) according to a predetermined function is used.

When the value of projection_type y is 0, projection_type z indicates that projection is not performed on the z-axis and the value of x is used without conversion. When the value of projection_type z is 1, projection_type z indicates that a conversion value by a coordinate system (e.g., a cylindrical coordinate system, a spherical coordinate system, a fan-shaped cylindrical coordinate system, a fan-shaped spherical coordinate system, etc.) indicated by coordinate_conversion_type (e.g., an elevation angle by the cylindrical coordinate system) is used. When the value of projection_type z is 2, projection_type z indicates that a simplified conversion value (e.g., a tangent value calculated to reduce the inverse tangent operation to obtain an angle as an angle value, or a laser index derived to be used to acquire data based on the number of lasers and the positions of the uniformly distributed lasers, etc.) is used. When the value of projection_type z is 3, projection_type z indicates that a simplified sum of distances (e.g., the difference in position information between the axes, z−x−y, or the like) is used. When the value of projection_type z is 4, projection_type z indicates that a conversion value (e.g., log_2(z)) according to a predetermined function is used.

The information indicating the projection type applied to each axis (projection_type x, projection_type y, and projection_type z described above) according to the embodiments may be defined for one coordinate conversion, or may indicate different coordinate conversions for the respective axes.

For example, when coordinate_conversion_type is set to 1 and projection_type_x, projection_type_y, and projection_type_z are all set to 1, projection_type_x, projection_type_y, and projection_type_z indicate the radius, azimuth angle or azimuthal angle, and elevation angle of the cylindrical coordinate system, respectively.

When coordinate_conversion_type is set to 2 and projection_type_x, projection_type_y, and projection_type_z are all set to 1, projection_type_x, projection_type_y, and projection_type_z indicate the radius, azimuth angle, and elevation angle of the spherical coordinate system, respectively.

When coordinate_conversion_type is set to 1 and projection_type_x, projection_type_y, and projection_type_z are all set to 0, projection_type_x, projection_type_y, and projection_type_z indicate that no projection has occurred (or there is only a scaling change on each axis by granularity_radius, granularity_angular, and granularity_normal).

When coordinate_conversion_type is set to 2, projection_type_x and projection_type_y are all set to 0, and projection_type_z is set to 1, projection_type_x, projection_type_y, and projection_type_z indicate that conversion is performed to the x-axis, the y-axis and the elevation angle of the cylindrical coordinate system, respectively.

When coordinate_conversion_type is set to 1, projection_type_x and projection_type_y are all set to 0, and projection_type_z is set to 2, projection_type_x, projection_type_y, and projection_type_z indicate that conversion is performed to the x-axis, y-axis and laser index, respectively.

When coordinate_conversion_type is set to 1 and projection_type_x, projection_type_y, and projection_type_z are all set to 2, projection_type_x, projection_type_y, and projection_type_z indicate that conversion is performed to the simplified radius, simplified azimuth angle, and laser index for the cylindrical coordinate system, respectively.

The coordinate_conversion_type and projection type according to the embodiments may indicate a coordinate conversion type for each sequence. The coordinate_conversion_type and projection type may indicate a coordinate conversion type according to a sequence type. For example, the coordinate_conversion_type and projection type (projection_type_x, projection_type_y, and projection_type_z) may indicate that cylindrical coordinate conversion and the conversion values of radius, azimuth angle, and elevation angle are applied to a sequence of type A. For example, the coordinate_conversion_type and projection type (projection_type_x, projection_type_y, and projection_type_z) may indicate that cylindrical coordinate conversion and the conversion values of x-axis, y-axis, and laser index are applied to a sequence of type B. For example, the coordinate_conversion_type and projection type (projection_type_x, projection_type_y, and projection_type_z) may indicate that spherical coordinate conversion, and the conversion values of radius, azimuth angle, and elevation angle are applied to a sequence of type C.

Figure 24:
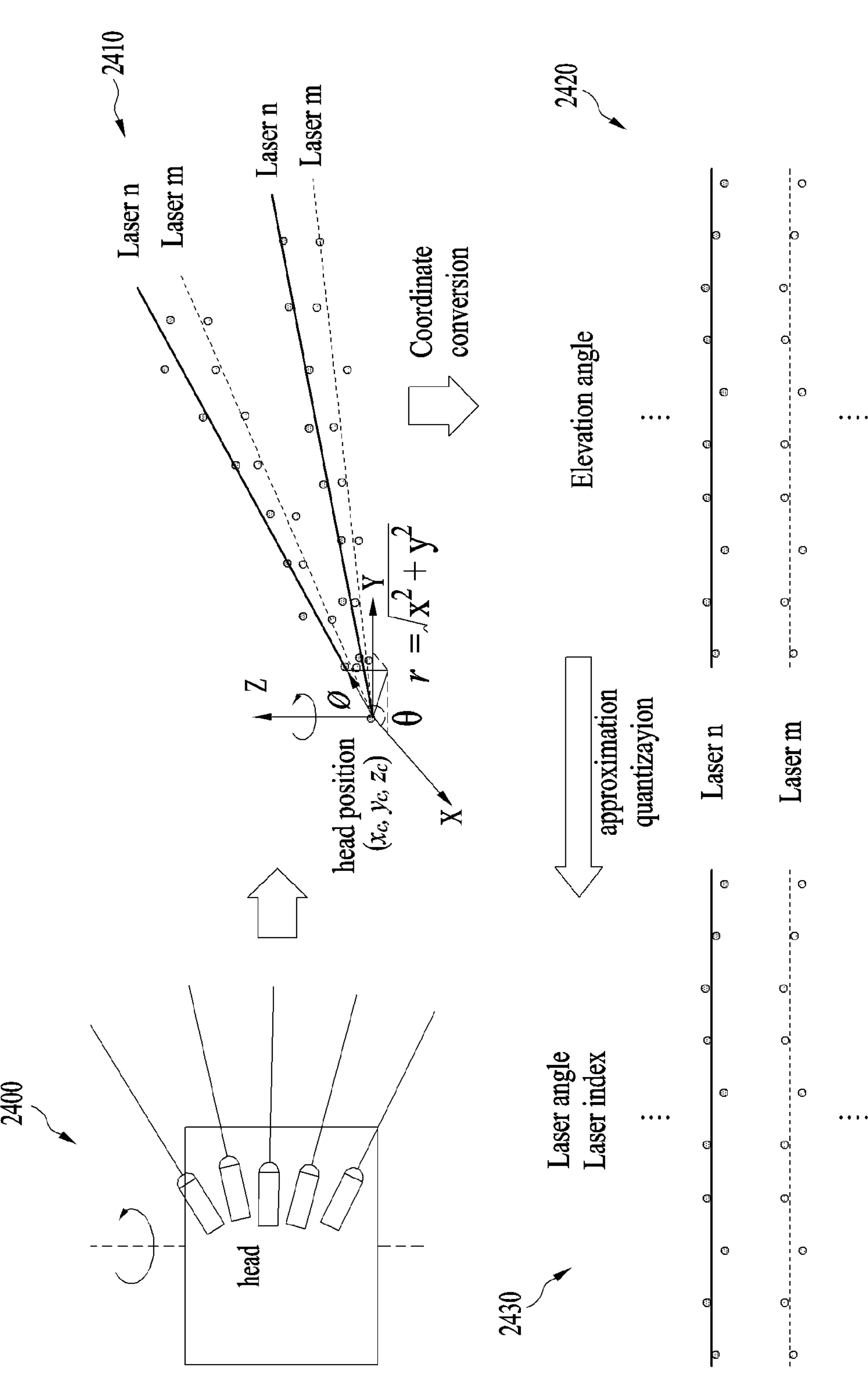
FIG. 24 illustrates an example of points arranged based on a laser index according to embodiments.

FIG. 24 illustrates an example of converting point cloud data into indexes according to embodiments. When projection_type_z is equal to 2, the elevation angle may be expressed as a laser index. That is, FIG. 24 illustrates an example of points arranged based on a laser index according to embodiments.

An example 2400 shown in the upper left part of FIG. 24 represents a LiDAR head (e.g., the LiDAR head 1900 described with reference to FIG. 19) configured to output one or more lasers. As described with reference to FIG. 19, LiDAR data is secured through the LiDAR technique, by which the distance is measured by radiating a laser to a target. The LiDAR head 2400 includes one or more laser modules (or laser sensors) disposed at regular angular intervals in a vertical plane and rotates about the vertical axis. Times (and/or wavelengths) taken for the laser beams output from the respective laser modules to return after reflecting on an object may be the same or different from each other. Therefore, LiDAR data is a 3D representation constructed based on a difference in time and/or wavelength between laser beams returning from the object. In order to have a wider coverage, the laser modules are disposed to output the laser radially.

An example 2410 shown in the upper right part of FIG. 24 is an example of use of a laser index as a simplified conversion value of an elevation angle when projection_type z according to the embodiments is equal to 2. As described above, the LiDAR head 2400 outputs one or more lasers (Laser n and Laser m) while rotating horizontally around the header position (or origin). As shown in FIG. 24, the trajectory of the laser is represented by a dotted line or a solid line. Here, the dotted line and the solid line are examples used to distinguish different lasers. Accordingly, the position of an object is estimated based on the difference in emission and/or reception time when laser beams distributed at different angles in the vertical direction are reflected on the object. One or more points located on a line (the above-described dotted line or solid line) representing the trajectory of laser n shown in FIG. 24 are points obtained to represent the object when lasers reflected on the object are received. Accordingly, the one or more points may be present on a straight line corresponding to the trajectory of laser n. However, due to the influence of noise and the like, the actual points may not be located on the trajectory of the laser, but may be located around the trajectory (and expressed as +/− displacement from the trajectory). The position of each point is expressed as an elevation angle. The elevation angle may be expressed as a positive/negative (+/−) value relative to the angle of the laser.

An example 3420 in the lower right part of FIG. 24 shows the actual positions of points located around the trajectory of each laser. As shown in FIG. 24, the elevation angle of each point corresponds to a positive/negative (+/−) value with respect to the elevation angle (or laser angle, for example, n in the figure) of the laser. The laser angle and the laser index according to the embodiments may be included in the signaling information.

The point cloud transmission device according to the embodiments (e.g., the point cloud transmission device described with reference to FIGS. 1 to 23) may perform approximation quantization on the position (i.e., the elevation angle) of each point in consideration of the associated laser angle or the index of the corresponding laser. An example 2430 in the lower left part of FIG. 24 shows a result of approximate quantization. The point cloud transmission device performs approximate quantization for estimating a point on a laser trajectory without considering a difference in elevation angle of each point. That is, as shown in the figure, all points are estimated to be located on the corresponding laser trajectory. Therefore, the elevation angle of each point has the same value as the elevation angle (or laser angle) of the corresponding laser. For example, the elevation angle of points corresponding to laser n is estimated to be the same as the elevation angle of laser n. Also, the points are sorted according to the index of the corresponding laser. For example, points corresponding to laser n are sorted according to laser index n.

Figure 25:
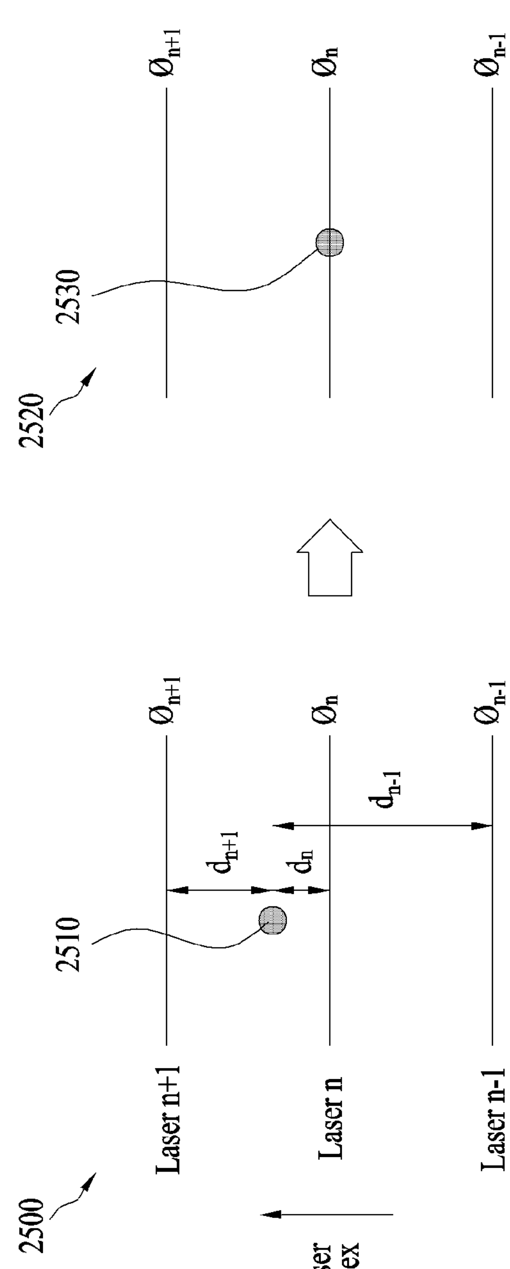
FIG. 25 illustrates an example of points arranged based on a laser index according to embodiments.

FIG. 25 illustrates an example of points arranged based on a laser index according to embodiments.

An example 2500 on the left side in FIG. 25 shows straight lines representing trajectories of one or more lasers (Laser n−1, Laser n, and Laser n+1) described with reference to FIG. 24. The arrow shown on the left indicates an increasing direction of the laser index. The laser angle of laser n, which is the n-th laser, is represented by $\phi_n$, and the laser angle of laser n−1, which is the n−1-th laser, is represented by $\phi_{n-1}$. The laser angle of laser n+1, which is the n+1-th laser, is expressed as $\phi_{n+1}$. The example 2500 shows a point 2510 located between laser n and laser n+1.

As described with reference to FIG. 24, the elevation angle of a point located around a laser trajectory may be estimated to have the same value as the elevation angle of a corresponding laser. Conditions to be satisfied for the point 2510 shown in the example 2500 to correspond to laser n are represented as Equation 20 below.

$$0.5*\phi_n+0.5*\phi_{n-1}\le\phi<0.5*\phi_n+0.5*\phi_{n+1} \quad \text{[Equation 20]}$$

$$d_n=|\phi-\phi_n|,\ d_{n+1}=|\phi-\phi_{n+1}|,\ d_{n-1}=|\phi-\phi_{n-1}|$$

Here, $\phi$ denotes the elevation angle of point 2510. $d_n$ denotes the difference between the elevation angle of point 2510 and the elevation angle of laser n, $d_{n+1}$ denotes the difference between the elevation angle of point 2510 and the elevation angle of laser n+1, and $d_{n-1}$ denotes the difference between the elevation angle of point 2510 and the elevation angle of laser n−1. When the value of $d_n$ is the least value, point 2510 corresponds to laser n. When the value of $d_{n-1}$ is the least value, point 2510 corresponds to laser n−1. That is, the differences in elevation angle between the current point and each laser in the vertical direction, $d_n=|\phi-\phi_n$, $d_{n+1}=|\phi-\phi_{n+1}|$, and $d_{n-1}=|\phi-\phi_{n-1}$, may be calculated, respectively, and a laser for which the difference is minimized may be defined as a laser by which the point has been acquired. An example 2520 on the right side in the figure shows a point 2530 located on the trajectory of laser n according to the estimated position of the point 2510 (the elevation angle of laser n) when the above conditions are satisfied.

When the total number of lasers is N, points determined to correspond to adjacent lasers according to the above equation are divided into N groups. That is, points each having an elevation angle are approximated to laser angles or laser indexes and quantized into N groups. At least one of scale factors (or scaling factors) of the respective axes represented by signaling information (granularity_angular, granularity_radius, and granularity_normal) may be used as a discriminator for discriminating the N quantized groups. For example, for LiDAR data to which coordinate conversion using a radius, an azimuthal angle, and a laser index as conversion values is applied, when the scaling factor is 1, distance 1 on the radius has the same meaning as distance 1 between lasers. Therefore, when a neighbor point search is performed for points, it is determined that the distance between adjacent lasers is excessively smaller than the actual distance, and thus the possibility of searching for points corresponding to the cross laser index as neighbor points increases. Therefore, in order to address this issue, a distance between lasers represented by laser indices may be kept constant based on a value indicated by granularity_normal, and a neighbor point in between one or more lasers may be prevented from being searched for. The granularity_normal according to the embodiments may be represented as in Equation 21 below. That is, when a laser index or a laser angle is used, a probability of searching for a similar point may be increased in searching for neighbors between points.

$$\text{granularity\_normal} >= \text{minimum inter-laser distance} >= \text{maximum } k\text{-}th \text{ neighbor distance in a laser plane: } \left(\sqrt{(x_k(n)-x_l(n))^2+(y_k(n)-y_l(n))^2+(z_k(n)-z_l(n))^2}\right) \quad \text{[Equation 21]}$$

Here, $(x_k(n), y_k(n), z_k(n))$ and $(x_l(n), y_l(n), z_l(n))$ represent the position values (xyz values) of adjacent points belonging to laser n. A laser plane according to the embodiments represents a plane to which points associated with one laser belong or a plane scanned by one laser. The maximum k-th neighbor distance in a laser plane denotes the longest distance among the distances to the k-th neighbor point in performing a neighbor search for points in the laser plane when k neighbors are obtained. The maximum k-th neighbor distance in a laser plane may be measured for each sequence by the point cloud transmission device, or may be signaled through a bitstream and transmitted to the point cloud reception device, or may be pre-stored in the point cloud reception device. The maximum k-th neighbor distance in a laser plane is used to independently compress points in the laser plane of each laser while maintaining a distance between at least two lasers greater than or equal to a specific value, or to determine the surrounding characteristics of the laser. The minimum inter-laser distance denotes the minimum distance between at least two lasers. The minimum inter-laser distance may be greater than or equal to the maximum k-th neighbor distance in a laser plane.

In the embodiments, granularity_normal, which is a scale factor, may be defined based on the value of the maximum k-th neighbor distance in a laser plane as in the above equation, and may be adaptively defined as a different value according to each laser plane.

Figure 26:
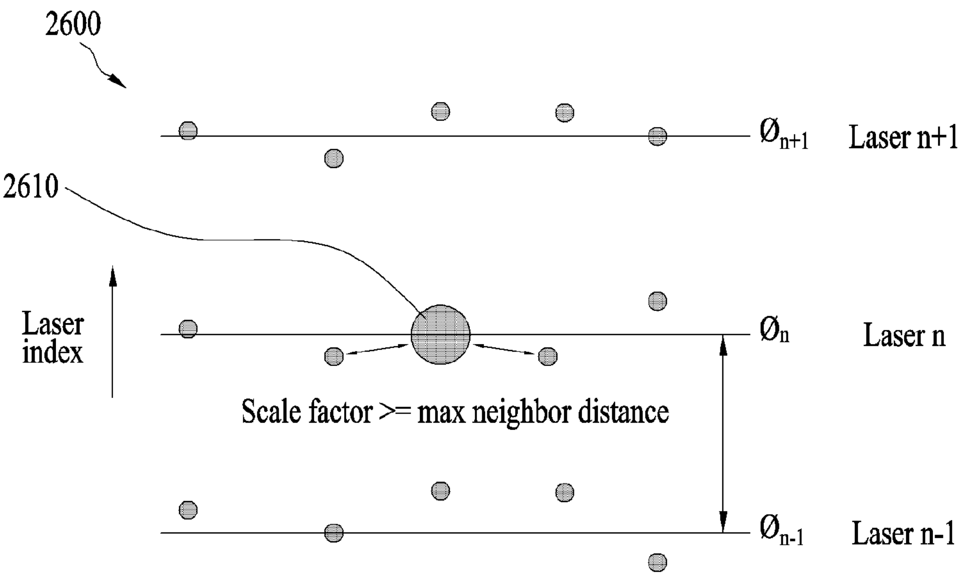
FIG. 26 illustrates an example of a distance between one or more lasers according to embodiments.

FIG. 26 illustrates an example of a distance between one or more lasers according to embodiments.

FIG. 26 shows an example 2600 in which points are arranged according to indexes of one or more lasers (laser n−1, laser n, and laser n+1) whose distance is maintained based on a scale factor. According to the embodiments, the scale factor may be determined based on the maximum k-th neighbor distance in a laser plane described above. The maximum k-th neighbor distance in a laser plane may be a preset value and be transmitted to the point cloud reception device through a bitstream. According to the embodiments, the scale factor may be determined after measuring the distances between a point 2610 on the trajectory of a laser represented by the laser index (e.g., laser n shown in the figure) and neighbor points, and may be signaled for each sequence to which the points of the laser belong. That is, FIG. 26 shows that a neighbor search error is prevented by maintaining the spacing between laser indexes based on a scaling factor. The maximum neighbor distance for determining the scaling factor is defined through an experiment. Alternatively, after the encoder according to the embodiments measures the neighbor distance within the laser index, and then be defined according to a sequence characteristic and signaled through signaling information.

Coordinates converted to a laser index may be efficiently used without signaling. In searching for neighbors of a point, only points with the same laser index or laser angle may be searched for, or only points within a certain range of the laser index or laser angle may be searched for.

Figure 27:
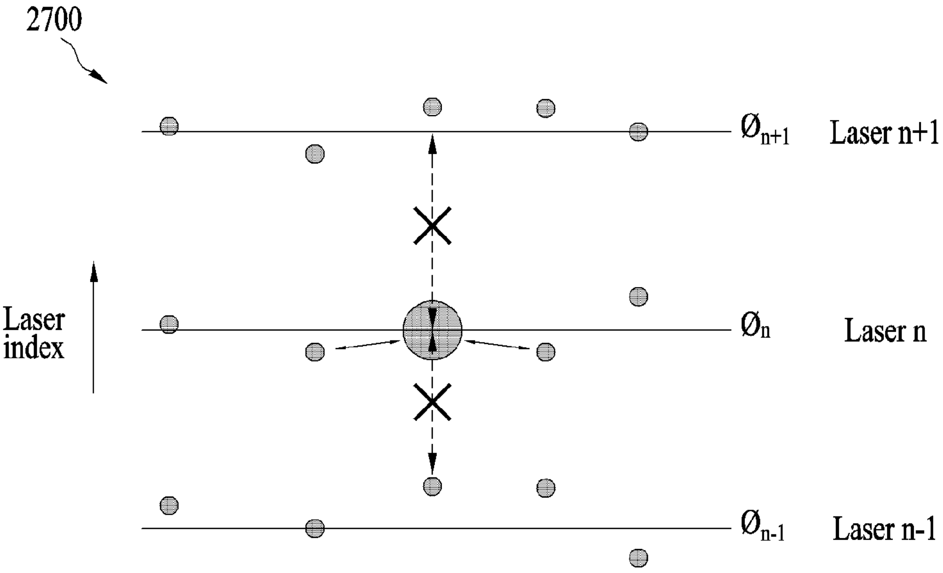
FIG. 27 illustrates an example of a neighbor point search according to embodiments.

FIG. 27 illustrates an example of a neighbor point search according to embodiments.

The neighbor point search is performed based on the distance between points or based on the Morton code of the points. The point cloud transmission device according to the embodiments may perform the neighbor point search only for points having the same laser index or laser angle (nearest neighbor=minimum distanced point within the same laser index). FIG. 27 shows an example 2700 in which points to which coordinate conversion using a radius, an azimuthal angle, and a laser index as conversion values is applied are arranged in the elevation direction with respect to the radius/azimuth plane according to the laser index. Arrows shown in the figure indicate directions in which neighbor points are searched for based on vertical and horizontal distances of points belonging to laser n. The point cloud transmission device according to the embodiments does not select points belonging to other laser indices (e.g., laser n+1 and laser n−1) or points having other laser angles as neighbor points. In sorting the points, the point cloud transmission device according to the embodiments may group and sort points belonging to the same laser index. In addition, the point cloud transmission device may perform the neighbor point search shown in FIG. 27 for attribute coding (e.g., predictive-lifting coding, etc.).

This index-based neighbor point search may be applied in a nearest neighbor search of predictive-lifting attribute coding or may be applied in predictive attribute coding. In addition, it may be used as a condition for collecting points acquired from a single laser by prioritizing sorting points having the same laser index into groups in the point sorting process.

When a laser index or a laser angle is used, corresponding information may be included for each point. That is, laser index or laser angle information may be added to previously added xyz position information. Alternatively, laser index or laser angle information may be used by replacing or converting one or more axis values. When the acquired data does not include laser index or laser angle information, the laser index or laser angle of each point may be inferred based on related information (overall laser angle, laser head position, and related laser position of the image acquisition device).

The aforementioned laser index or laser angle may be used for adjustment of points sampled according to the elevation angle in a cylindrical coordinate system or a spherical coordinate system.

The point cloud data transmission device according to the embodiments (the point cloud transmission device described with reference to FIGS. 1 to 26, for example, the transmission device or point cloud encoder described with reference to FIGS. 1, 12 and 14) may signal information related to the laser index or laser angle together with position information (position information represented by parameters x, y, and z) about each point of the input data, or perform conversion of at least one axis (e.g., the coordinate conversion described with reference to FIGS. 15 to 23). In addition, the point cloud data reception device (e.g., the receiver of FIG. 1, the receiver of FIG. 13, etc.) may match each point to a laser index based the signaling information (e.g., projection_type x, projection_type y, and projection_type z described with reference to FIG. 33). In addition, when there is no signaling information such as a direct laser index and laser angle, the point cloud data reception device performs may infer the matching relationship between the points and the laser indices based on information such as the laser head position and the relative laser position.

Figure 28:
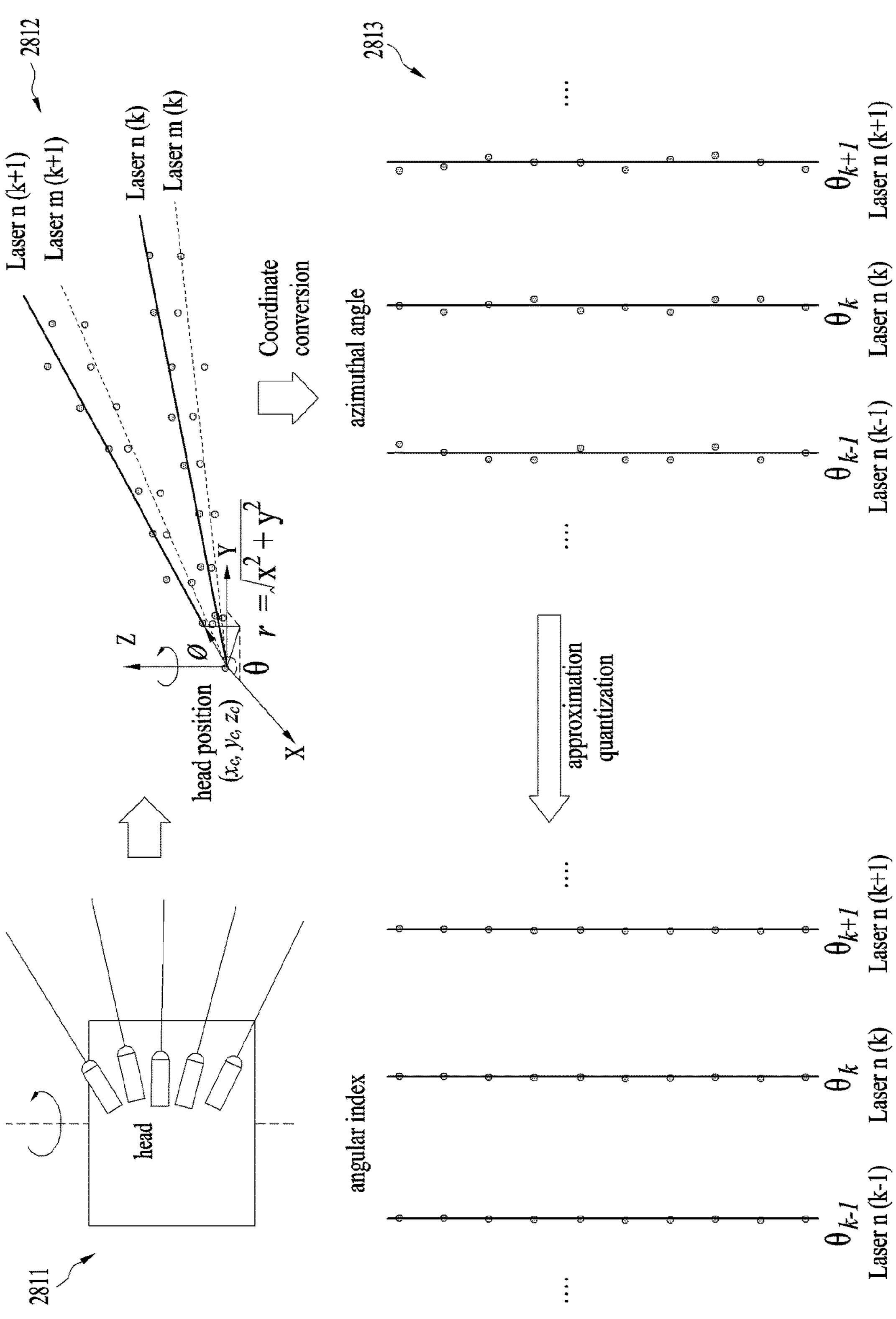
FIG. 28 illustrates an example of correcting azimuthal angles of point cloud data by converting the azimuthal angles into indexes according to embodiments.

FIG. 28 illustrates an example of adjusting point cloud data performed by converting an azimuthal angle into an index according to embodiments. The azimuthal index may be used for sampling adjustment for an azimuthal angle in a cylindrical coordinate system, a spherical coordinate system, or a fan-shaped coordinate system.

Referring to FIG. 28, while a plurality of lasers arranged in a vertical direction rotate in a horizontal direction (2811), point cloud data is acquired. When positions sampled by the lasers are represented as a line, the sampled points should be positioned on the line in theory. However, points may be sampled at positions deviating from the line due to sampling noise, quantization error, laser interference, and the like (2812).

FIG. 28 shows points of a k-th sampling of an n-th laser among a plurality of lasers arranged in the vertical direction and sampling (k−1-th sampling and k+1-th sampling) adjacent thereto (28003). The positions of points sampled by the k-th beam and the k+1-th and k+1-th beams are distributed with errors around the trajectory of the laser beam. The position of a point having an error in the azimuthal angle may be approximated with an index and adjusted so as to be positioned on the line trajectory of the laser.

Figure 29:
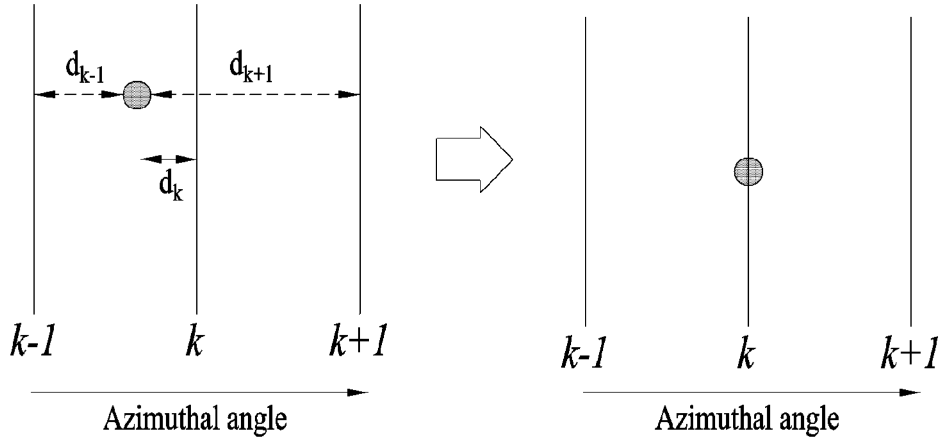
FIG. 29 illustrates an example of a method of correcting an azimuthal angle of a point of point cloud data according to embodiments.

FIG. 29 illustrates an example of a method of correcting an azimuthal angle of a point of point cloud data according to embodiments.

Let the azimuthal angle sampled in the k-th sampling by the n-th laser be $\theta_k$, and the azimuthal angles sampled in the k−1-th sampling and k+1-th sampling adjacent thereto be $\theta_{k-1}$ and $\theta_{k+1}$, respectively. In this case, the azimuthal angle $\theta$ of the point may match the k-th sampling angle of the n-th laser on the condition defined in Equation 22.

$$0.5*\theta_k+0.5*\theta_{k-1}\le\theta<0.5*\theta_k+0.5*\theta_{k+1} \quad \text{[Equation 22]}$$

In addition, the azimuthal angle of a point may be approximated and corrected to the azimuthal angle of the laser at which differences between the azimuthal angle of the point and the azimuthal angles sampled by the laser, $d_k=|\theta-\theta_k|$, $d_{k+1}=|\theta-\theta_{k+1}|$, and $d_{k-1}=|\theta-\theta_{k-1}|$, are minimized.

Referring to FIG. 29, the position of a point close to the k-th laser beam is adjusted to be positioned the trajectory of the k-th laser beam. In this case, the information about the azimuthal angles $\theta_k$, $\theta_{k-1}$, and $\theta_{k+1}$ may be directly delivered as parameters or may be delivered in the form may be calculated by the transmission device or reception device according to the embodiments. In addition, when it is assumed that the spinning speed of LiDAR is constant, the information on the azimuthal angle may be calculated based on the sampling number per turn N (num_phi_per_turn) and the sampling start position of the n-th laser $\Delta\theta_0$ (offset) in Equation 23 below (unit: radian).

$$\theta_k=k/N*2\pi+\Delta\theta_0 \quad \text{[Equation 23]}$$

In Equation 23, the offset $\Delta\theta_0$ may have the same value for all laser indexes or similar values within an error range, or may have different values depending on the laser index. When the horizontal positions of the lasers are different, more accurate grouping may be implemented by considering the offset.

Figure 30:
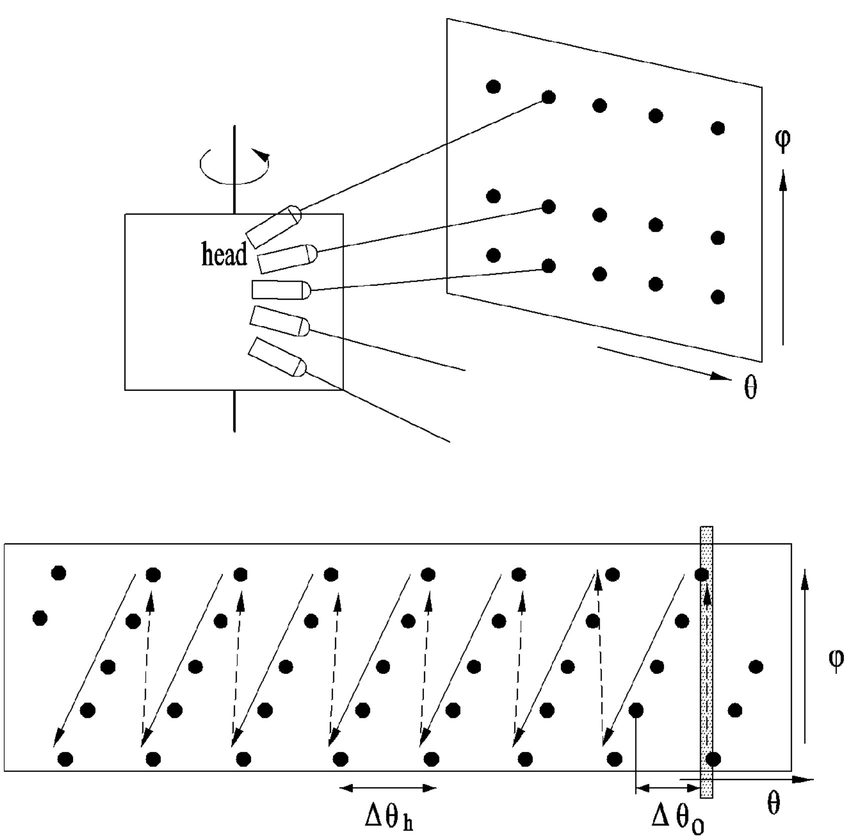
FIG. 30 illustrate that the azimuthal angles of lasers included in a LiDAR according to embodiments are different from each other.

FIG. 30 illustrate that the azimuthal angles of lasers included in a LiDAR according to embodiments are different from each other.

Figure 31:
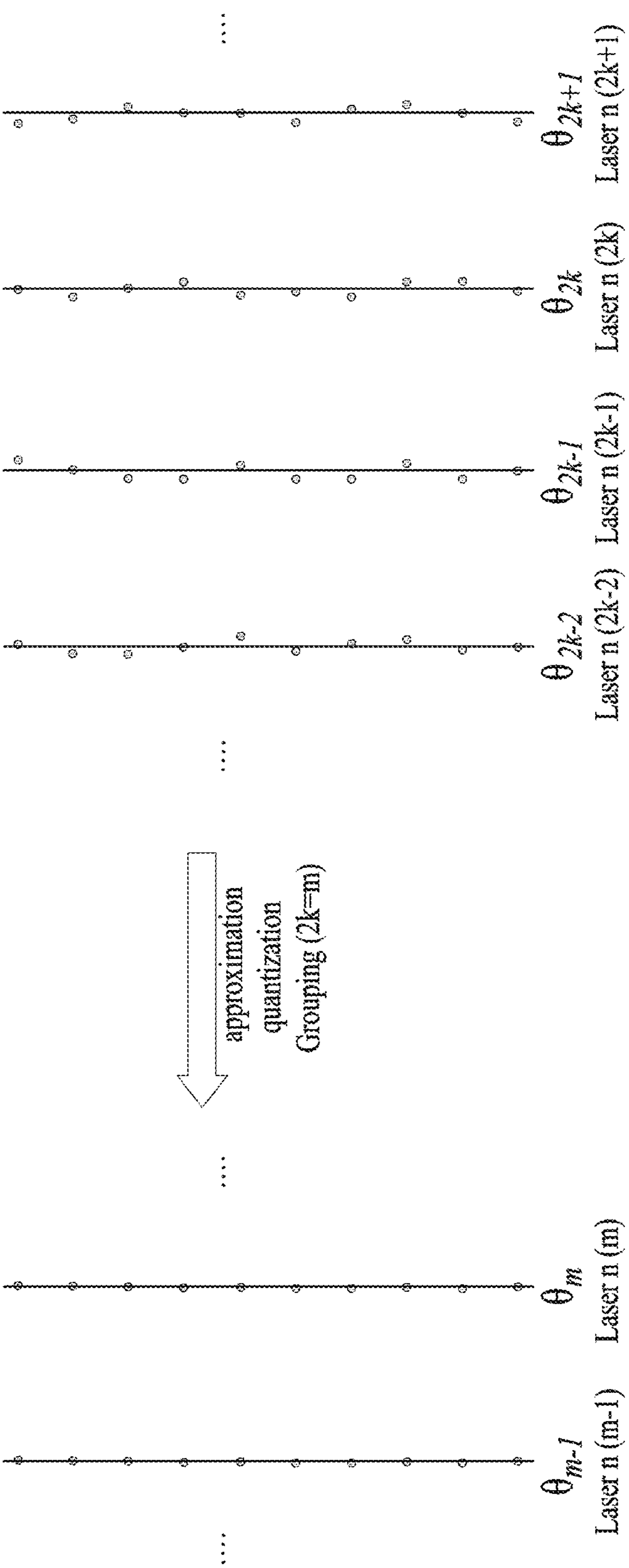
FIG. 31 is a diagram illustrating an example of a method of grouping point cloud data according to embodiments.

FIG. 31 illustrates an example of a method of grouping point cloud data according to embodiments. FIG. 31 illustrates that two horizontally adjacent sampling positions are grouped into one. That is, the 2k−2-th and 2k−1-th sampled points are grouped into m−1, and the 2k-th and 2k+1-th sampled points are grouped into m. When the horizontal samples are dense, the sampling rate may be lowered to further consider the similarity between adjacent points.

Figure 32:
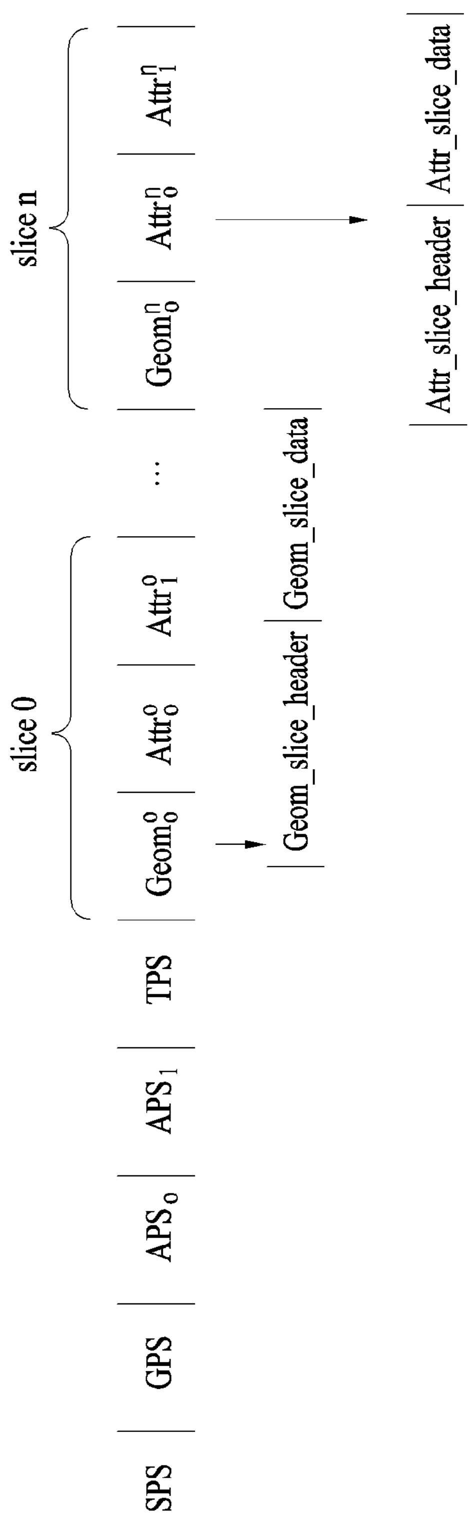
FIG. 32 is a diagram illustrating an example of a bitstream structure of point cloud data for transmission/reception according to embodiments.

FIG. 32 illustrates an example of a bitstream structure of point cloud data for transmission/reception according to embodiments. According to embodiments, a bitstream output from any one of the point cloud transmission devices of FIGS. 1, 2, 4, 12, 15, and 16 may have the form of FIG. 32.

According to embodiments, the bitstream of the point cloud data provides a tile or a slice so that the point cloud data may be divided and processed according to a region. Each region of the bitstream according to the embodiments may have different importance. Accordingly, when the point cloud data is divided into tiles, a different filter (encoding method) and a different filter unit may be applied to each tile. In addition, when the point cloud data is divided into slices, a different filter and a different filter unit may be applied to each slice.

When dividing point cloud data into regions and compressing the point cloud data, the point cloud transmission device and the reception device according to the embodiments may transmit and receive the bitstream with a high-level syntax structure to selectively transmit attribute information in the divided regions.

The point cloud transmission device according to embodiments transmits the point cloud data according to the structure of the bitstream as illustrated in FIG. 32, so that different encoding operations may be applied according to importance and an encoding method with good quality may be used in an important region. In addition, efficient encoding and transmission according to the characteristics of the point cloud data may be supported and attribute values according to the demand of a user may be provided.

The point cloud reception device according to the embodiments receives the point cloud data according to the structure of the bitstream as illustrated in FIG. 32, so that a different filtering (decoding method) may be applied to each region (region divided into tiles or slices) according to the processing capability of the reception device, instead of using a complicated decoding (filtering) method for the entire point cloud data. Accordingly, better picture quality in a region important to the user may be provided and appropriate system latency may be ensured.

When a geometry bitstream, an attribute bitstream, and/or a signaling bitstream (or signaling information) according to the embodiments are composed of one bitstream (or G-PCC bitstream) as illustrated in FIG. 32, the bitstream may include one or more sub-bitstreams. The bitstream according to the embodiments includes an SPS for sequence level signaling, a GPS for signaling of geometry information coding, one or more APSs ($APS_0$ and $APS_1$) for signaling of attribute information coding, a tile inventory (also referred to as a TPS) for tile level signaling, and one or more slices (slice 0 to slice n).

The SPS is encoding information about the entire sequence, such as a profile or a level, and may include comprehensive information (sequence level) about the entire sequence, such as a picture resolution and a video format. The GPS is information about geometry encoding applied to geometry included in the sequence (bitstream). The GPS may include information about an octree (e.g., the octree described with reference to FIG. 6) and information about an octree depth. The APS is information about attribute encoding applied to an attribute contained in the sequence (bitstream). As shown in the figure, the bitstream contains one or more APSs (e.g., APS0, APS1, . . . shown in the figure) according to an identifier for identifying the attribute. The tile inventory (or TPS) may include information about a tile. The information about the tile may include a tile identifier and information about a tile size. The signaling information is applied to a corresponding bitstream as information about a sequence, that is, a bitstream level. In addition, the signaling information has a syntax structure including a syntax element and a descriptor describing the same. A pseudo code may be used to describe the syntax. The point cloud reception device (e.g., the reception device 10004 of FIG. 1, the point cloud decoder of FIGS. 10 and 11, or the reception device of FIG. 13) may sequentially parse and process syntax elements configured in the syntax.

That is, the bitstream of the point cloud data according to the embodiments may include one or more tiles, and each tile may be a slice group including one or more slices (slice 0 to slice n). The tile inventory (i.e., TPS) according to the embodiments may include information about each tile (e.g., coordinate value information and height/size information of a tile bounding box) for one or more tiles. Each slice may include one geometry bitstream Geom0 and/or one or more attribute bitstreams Attr0 and Attr1. For example, slice 0 may include one geometry bitstream $Geom0^0$ and one or more attribute bitstreams $Attr0^0$ and $Attr1^0$.

The geometry bitstream within each slice may include a geometry slice header (geom_slice_header) and geometry slice data (geom_slice_data). According to embodiments, the geometry bitstream within each slice may also be referred to as a geometry data unit, the geometry slice header may also be referred to as a geometry data unit header, and the geometry slice data may also be referred to as geometry data unit data.

Each attribute bitstream in each slice may include an attribute slice header (attr_slice_header) and attribute slice data (attr_slice_data). According to embodiments, the attribute slice header in each slice may also be referred to as an attribute data unit, the attribute slice header may also be referred to as an attribute data unit header, and the attribute slice data may also be referred to as attribute data unit data.

According to embodiments, parameters required for encoding and/or decoding of the point cloud data may be newly defined in parameter sets of the point cloud data (e.g., an SPS, a GPS, an APS, and a TPS (also referred to as a tile inventory) and/or in a header of a corresponding slice. For example, when encoding and/or decoding of geometry information is performed, the parameters may be added to the GPS and, when tile-based encoding and/or decoding is performed, the parameters may be added to a tile and/or a slice header.

The attribute slice header contains information (or signaling information) for processing a corresponding attribute data unit. Accordingly, the attribute slice header is at the leading position in the attribute data unit. The point cloud reception device may process the attribute data unit by parsing the attribute slice header first. The attribute slice header has an association with the APS, which contains information about all attributes. Accordingly, the attribute slice header contains information specifying aps_attr_parameter_set_id included in the APS. As described above, attribute decoding is based on geometry decoding. Accordingly, the attribute header contains information specifying a slice identifier contained in the geometry header in order to determine a geometry data unit associated with the attribute data unit.

A field, which is a term used in syntaxes in the present disclosure, may have the same meaning as a parameter or a syntax element.

According to embodiments, parameters (which may be referred to as metadata, signaling information, or the like) may be generated by the metadata processor (or metadata generator) or the signaling processor of the transmission device, and transmitted to the reception device so as to be used in the decoding/reconstruction process. For example, the parameters generated and transmitted by the transmission device may be acquired by the metadata parser of the reception device.

When the point cloud transmission device performs the projection described with reference to FIGS. 15 to 23, the signaling information in the bitstream may further include projection-related signaling information (projection_ info( )). The signaling information related to the projection may be included in sequence level signaling information (e.g., SPS, APS, TPS, etc.), a slice level (e.g., attribute slice header, geometry slice header, etc.), an SEI message, or the like. The point cloud reception device according to the embodiments may perform decoding including inverse projection based on the signaling information related to the projection.

FIGS. 33 and 34 show an exemplary syntax structure of projection-related signaling information (projection_info( )).

The projection-related signaling information according to the embodiments may be included in signaling information of various levels (e.g., sequence level, slice level, etc.). The projection-related signaling information is transmitted to the point cloud reception device (e.g., the reception device 10004 of FIG. 1, the point cloud decoder of FIGS. 10 and 11, and the reception device of FIG. 13).

When the value of the projection_flag field is 1, it indicates that decoded data should be inversely projected (reprojected) into the XYZ coordinate space through the decoder post-processing.

The point cloud reception device checks whether inverse projection should be performed based on the projection_flag field. In addition, when the value of the projection_flag field is 1, the point cloud reception device may secure projection-related signaling information and perform inverse projection. The projection-related signaling information may be defined as a concept including signaling information (the projection_flag field) indicating whether projection is performed. Embodiments are not limited to this example.

The projection_info_id field is an identifier for identifying projection information.

The coordinate_conversion_type field indicates a coordinate conversion type related to the coordinate conversion described with reference to FIGS. 19 to 20. The coordinate_conversion_type field set to 0 indicates that the coordinate system is a cylindrical coordinate system (e.g., the cylindrical coordinate system 1810 described with reference to FIG. 18). The coordinate_conversion_type field set to 1 indicates that the coordinate system is a spherical coordinate system (e.g., the spherical coordinate system 1820 described with reference to FIG. 18). The coordinate_conversion_type field set to 2 indicates that the coordinate system is a fan-shaped cylindrical coordinate system (e.g., the fan-shaped cylindrical coordinate system 2010 described with reference to FIG. 20). The coordinate_conversion_type field set to 3 indicates the coordinate system is a fan-shaped spherical coordinate system (e.g., the fan-shaped spherical coordinate system 2020 described with reference to FIG. 20).

The projection_type field indicates the type of projection (e.g., the projection described with reference to FIG. 21) used according to the coordinate conversion type. As described with reference to FIGS. 20 and 21, when the value of the projection_type field is 2, the coordinate system before the projection is a fan-shaped cylindrical coordinate system (e.g., the fan-shaped cylindrical coordinate system 2010 in FIG. 20 or the fan-shaped cylindrical coordinate system 2100 in FIG. 21). When the value of the projection_type field is 0, the x, y, and z axes are matched to the parameters r, θ, and ϕ of the fan-shaped cylindrical coordinate system (Equation 5), respectively. When the value of the projection_type field is 0, the x, y, and z axes are matched to $r^2$, $\cos^2\theta/2$, and tan ϕ (Equation 6), respectively. The projection types are not limited to this example and may be defined for each axis.

The laser_position_adjustment_flag field indicates whether laser position adjustment (e.g., the laser position adjustment described with reference to FIG. 22) is applied. The laser_position_adjustment_flag field set to 1 indicates that laser the position adjustment has been applied.

The num_laser field indicates the total number of lasers. The subsequent for loop is an element representing laser position information about each laser. Here, i, which denotes each laser, is greater than or equal to 0, and is less than the total number of lasers indicated by the num_laser field.

The r_laser [i] field indicates the horizontal distance from the central axis of laser i.

The z_laser [i] field indicates the vertical distance from the horizontal center of laser i.

The theta_laser [i] field indicates the elevation angle of laser i.

The laser position information is not limited to the above example. For example, the laser position may be expressed as parameters for the respective axes of the coordinate system representing the projection, such as an x_laser[i] field, a y_laser[i] field, and a z_laser[i] field.

The elevation_index_enable_flag field indicates whether an elevation index is enabled. For example, the elevation_index_enable_flag field equal to 1 indicates that the laser index is used for a coordinate converted point position. The elevation_index_enable_flag field equal to 0 indicates that the elevation angle is used.

The azimuthal_index_enable_flag field indicates whether an azimuthal index is enabled. For example, the azimuthal_index_enable_flag field equal to 1 indicates that the angular index is used for the coordinate converted point position. The azimuthal_index_enable_flag field equal to 0 indicates that the azimuthal angle is used.

According to embodiments, based on the value of the elevation_index_enable_flag field and the value of the azimuthal_index_enable_flag field, whether to use the elevation angle, the laser index, the azimuthal angle, or the angular index is determined for a coordinate converted point position as follows.

If (elevation_index_enable_flag==0, azimuthal_index_enable_flag==0)

(x, y, z)->(radius, azimuthal angle, elevation angle)

else If (elevation_index_enable_flag==0, azimuthal_index_enable_flag==1)

(x, y, z)->(radius, angular index, elevation angle)

else If (elevation_index_enable_flag==1, azimuthal_index_enable_flag==0)

(x, y, z)->(radius, azimuthal angle, laser index)

else if (elevation_index_enable_flag==1, azimuthal_index_enable_flag==1)

(x, y, z)->(radius, angular index, laser index)

For example, when both the elevation_index_enable_flag field and the azimuthal_index_enable_flag field are equal to 1, this indicates that the radius, angular index, and laser index are used instead of the coordinate-converted point position (radius, azimuth angle, elevation angle).

If the value of the azimuthal_index_enable_flag field is 1, the projection-related signaling information may further include a num_laser field and a grouping_rate field.

The num_laser field indicates the total number of lasers.

The projection-related signaling information according to the embodiments includes a loop iterated as many times as the value of the num_laser field. In an embodiment, i is initialized to 0 and incremented by 1 each time the loop is executed. The loop is iterated until i reaches the value of the num_laser field. This loop may include a laser_phi_per_turn [i] field and a laser_angle_offset[i] field.

The laser_phi_per_turn[i] field indicates the number of times of sampling per horizontal turn for the i-th laser. Default values may be used for specific values such as −1, 0, and 1 (e.g., when the default value is 200 when sampling is performed 800 times, 4 samples may be grouped into one), or it may be indicated that the azimuthal index is not used (azimuthal_index_enable_flag=0). The laser_phi_per_turn field has the same meaning as the num_phi_per_turn field. That is, the num_phi_per_turn field also indicates the number of sampling per turn.

The laser_angle_offset[i] field indicates a difference in horizontal sampling position of the i-th laser in order to correct a difference in sampling position between a plurality of lasers. For example, it may indicate the angle of the first sample.

The projection-related signaling information according to the embodiments includes a loop iterated as many times as the value of the laser_phi_per_turn[i] field. In an embodiment, j is initialized to 0 and incremented by 1 each time the loop is executed. The loop is iterated until j reaches the value of the laser_phi_per_turn[i] field. This loop may include a laser_sampling_angle[i][j] field.

The laser_sampling_angle[i][j] field indicates horizontal sampling angle of the i-th laser. It may be used to indicate each sampling angle when the sampling position of the laser is not uniform.

The grouping_rate field may indicate the frequency of grouping of horizontal indexes. The grouping_rate field having a value equal to 1 indicates the same sampling number equal to laser_phi_per_turn. The grouping_rate field having a value greater than 1 indicates that a plurality of laser sampling positions is grouped and considered as one. The grouping_rate field having a value less than 1 may indicate that a virtual laser sampling position is added. It may be used in the sense of a scale in terms of widening the interval between laser sampling positions.

The following elements represent information related to sampling rate adjustment (e.g., the sampling rate adjustment 1643 described with reference to FIG. 16).

The sampling_adjustment_cubic_flag field indicates whether the lengths of three axes are corrected to be equal to each other in the sampling rate adjustment. The sampling_adjustment_cubic_flag field having a value equal to 1 indicates that the three axes should be corrected to have the same length.

The sampling_adjustment_spread_bbox_flag field indicates whether to perform sampling rate adjustment such that the distribution of point cloud data is uniform within the bounding box. When the value of sampling_adjustment_spread_bbox_flag is 1, correction for uniformly spreading the distribution within the bounding box is used in the sampling rate adjustment.

The sampling_adjustment_type field indicates the type of sampling rate adjustment. The sampling_adjustment_type field set to 0 indicates sampling rate adjustment based on mechanical characteristics. The sampling_adjustment_type field set to 1 indicates sampling rate adjustment based on the minimum axial distance between points. The sampling_adjustment_type field set to 2 indicates sampling rate adjustment based on the density on each axis. The sampling_adjustment_type field set to 3 indicates sampling rate adjustment according to the importance of the point. The types of sampling rate adjustment are not limited to this example.

The geo_projection_enable_flag field indicates whether projection is applied in geometry coding.

The attr_projection_enable_flag field indicates whether projection is applied in attribute coding.

The bounding_box_x_offset field, bounding_box_y_offset field, and bounding_box_z_offset field correspond to the X-axis, Y-axis, and Z-axis values representing the starting point of a range (bounding box) that includes the projected point cloud data. For example, when the value of the projection_type field is 0, the values of the bounding_box_x_offset field, bounding_box_y_offset field, and bounding_box_z_offse field are expressed as (0, 0, 0). When the value of the projection_type field is 1, the values of the bounding_box_x_offset field, bounding_box_y_offset field, and bounding_box_z_offse field are expressed as (−r_max1, 0, 0).

The bounding_box_x_length field, bounding_box_y_length field, and bounding_box_z_length field may indicate a range (bounding box) that includes the projected point cloud data. For example, when the value of the projection_type field is 0, the values of the bounding_box_x_length field, bounding_box_y_length field, and bounding_box_z_length field are r_max, 360, and z_max, respectively. When the value of the projection_type field is 1, the values of bounding_box_x_length field, bounding_box_y_length field, and bounding_box_z_length field are r_max1+r_max2, 180, and z_max, respectively.

The orig_bounding_box_x_offset field, orig_bounding_box_y_offset field, and orig_bounding_box_z_offset field correspond to the X-axis, Y-axis, and Z-axis values representing the starting point of a range (bounding box) that includes the point cloud data before projection.

The orig_bounding_box_x_length field, orig_bounding_box_y_length field, orig_bounding_box_z_length field may indicate a range (bounding box) including point cloud data before coordinate conversion.

The rotation_yaw field, rotation_pitch field, and rotation_roll field indicate rotation information used in coordinate conversion. t.

Next, elements representing information related to the coordinate system when the value of the coordinate_conversion_type field is 0 or 2, that is, when the coordinate system before the projection is a cylindrical coordinate system or a fan-shaped cylindrical coordinate system are disclosed below.

The cylinder_center_x field, cylinder_center_y field, and cylinder_center_z field correspond to X-axis, Y-axis, and Z-axis values representing the position of the center of a cylindrical column represented by the cylindrical coordinate system before the projection.

The cylinder_radius_max field, cylinder_degree_max field, and cylinder_z_max field indicate the maximum values of the radius, angle, and height of a cylindrical column represented by the cylindrical coordinate system before the projection.

The ref_vector_x field, ref_vector_y field, and ref_vector_z field indicate the direction of the vector that is a reference in projecting the cylindrical column represented by the cylindrical coordinate system, as a direction from the center to (x, y, z). They may correspond to the x-axis of the projected cuboid space (e.g., the cuboid space 2120 described with reference to FIG. 21).

The normal_vector_x field, normal_vector_y field, and normal_vector_z field indicate the direction of the normal vector of the cylindrical column represented by the cylindrical coordinate system, as a direction from the center to (x, y, z). They may correspond to the z-axis of the projected cuboid space (e.g., the cuboid space 2120 described with reference to FIG. 21).

The clockwise_degree_flag field indicates the direction in which the angle of the cylindrical column represented by the cylindrical coordinate system is obtained. The clockwise_degree_flag field set to 1 indicates that the direction in which the angle of the cylindrical column represented by the cylindrical coordinate system is obtained is clockwise when the cylindrical column is seen in the top view. The clockwise_degree_flag field set to 0 indicates that the direction in which the angle of the cylindrical column represented by the cylindrical coordinate system is obtained is counterclockwise when the cylindrical column is seen in the top view. The direction in which the angle of the cylindrical column represented by the cylindrical coordinate system is obtained may correspond to the direction of the y-axis of the projected cuboid space (e.g., the cuboid space 2120 described with reference to FIG. 21).

The granularity_angular field, granularity_radius field, and granularity_normal field represent parameters indicating the angle, the distance from the circular plane surface of the cylindrical column to the center, and the resolution for the distance from the center in the direction of the normal vector. The parameters may correspond to the aforementioned scale factors $\alpha$, $\beta$, and $\gamma$, respectively.

As shown in the figure, when the value of the coordinate_conversion_type field is 1 or 3, that is, when the coordinate system before the projection is the spherical coordinate system or the fan-shaped spherical coordinate system, the syntax structure of the projection-related signaling information includes the same elements as the elements representing information related to a coordinate system when the value of the coordinate_conversion_type field is 0 or 2, that is, when the coordinate system before the projection is the cylindrical coordinate system or the fan-shaped cylindrical coordinate system. Details of the elements are the same as those described above, and thus a description thereof is omitted.

FIG. 35 shows an example of an SPS in the signaling information according to embodiments.

FIG. 35 shows an exemplary syntax structure of an SPS of a sequence level in which the signaling information related to projection is included.

The profile_compatibility_flags field indicates whether a bitstream conforms to a specific profile for decoding or another profile. The profile specifies constraints imposed on the bitstream to specify capabilities for decoding of the bitstream. Each profile is a subset of algorithmic features and constraints and is supported by all decoders conforming to the profile. profile_compatibility_flags is for decoding and may be defined according to a standard or the like.

The level_idc field indicates the level applied to the bitstream. The level is used within all profiles. In general, the level corresponds to a specific decoder processing load and memory capability.

The sps_bounding_box_present_flag field indicates whether information about a bounding box is present in the SPS. The sps_bounding_box_present_flag field set to 1 indicates information about the bounding box is present. The sps_bounding_box_present_flag field set to 0 indicates that information about the bounding box is not defined.

When the value of the sps_bounding_box_present_flag field is 1, the following information about the bounding box is contained in the SPS.

The sps_bounding_box_offset_x field indicates the quantized x-axis offset of a source bounding box in the Cartesian coordinate system including the x, y, and z axes.

The sps_bounding_box_offset_y field indicates the quantized y-axis offset of the source bounding box in the Cartesian coordinate system including the x, y, and z axes.

The sps_bounding_box_offset_z field indicates the quantized z-axis offset of the source bounding box in the Cartesian coordinate system including the x, y, and z axes.

The sps_bounding_box_scale_factor field indicates a scale factor used to indicate the size of the source bounding box.

The sps_bounding_box_size_width field indicates the width of the source bounding box in the Cartesian coordinate system including the x, y, and z axes.

The sps_bounding_box_size_height field indicates the height of the source bounding box in the Cartesian coordinate system including the x, y, and z axes.

The sps_bounding_box_size_depth field indicates the depth of the source bounding box in the Cartesian coordinate system including the x, y, and z axes.

The syntax of the SPS further includes the following elements.

The sps_source_scale factor field indicates a scale factor of source point cloud data.

The sps_seq_parameter_set_id field is an identifier of the SPS for reference by other syntax elements (e.g., the seq_parameter_set_id field in the GPS).

The sps_num_attribute_sets field indicates the number of attributes encoded in the bitstream. The value of the sps_num_attribute_sets field is in the range of 0 to 63.

The subsequent 'for' loop includes elements indicating information about each of the attributes as many as the number indicated by the sps_num_attribute_sets field. In the figure, i denotes each attribute (or attribute set). The value of i is greater than or equal to 0 and less than the number indicated by the sps_num_attribute_sets field.

The attribute_dimension_minus1[i] field indicates a value that is less than the number of components of the i-th attribute by 1. When the attribute is a color, the attribute corresponds to a three-dimensional signal representing the characteristics of light of a target point. For example, the attribute may be signaled by three components of RGB (Red, Green, Blue). The attribute may be signaled by three components of YUV, which are luma and two chromas. When the attribute is reflectance, the attribute corresponds to a one-dimensional signal representing the ratio of intensities of light reflectance of the target point.

The attribute_instance_id[i] field indicates the instant id of the i-th attribute. The attribute_instance_id field is used to distinguish the same attribute labels and attributes.

The attribute_bitdepth_minus1[i] field has a value that is less than the bit depth of the first component of the i-th attribute signal by 1. The value of this field plus 1 specifies the bit depth of the first component.

The attribute_cicp_colour_primaries[i] field indicates chromaticity coordinates of the color attribute source primaries of the i-th attribute.

The attribute_cicp_transfer_characteristics[i] field indicates a reference opto-electronic transfer characteristic function of the color attribute as a function of the source input linear optical intensity Lc with a nominal real-valued range of 0 to 1, or indicates an inverse function of the reference opto-electronic transfer characteristic function of the color attribute as a function of the output linear optical intensity Lo with a nominal real-valued range of 0 to 1.

The attribute_cicp_matrix_coeffs[i] field indicates matrix coefficients used to derive luma and chroma signals from RBG or YXZ primary colors.

The known_attribute_label_flag[i] field, known_attribute_label[i] field, and attribute_label_fourbytes[i] field are used together to identify the type of data carried in the i-th attribute. The known_attribute_label_flag[i] field indicates whether the attribute is identified by the value of the known_attibute_label[i] field or the attribute_label_fourbytes[i] field, which is another object identifier.

According to embodiments, the syntax of the SPS may include signaling information related to projection.

The sps_projection_flag field is the same as the projection_flag field described with reference to FIGS. 33 and 34. When the value of the sps_projection_flag field is 1, the SPS syntax further includes the projection-related signaling information (projection_info( )) described with reference to FIGS. 33 and 34. The projection-related signaling information is the same as that described with reference to FIGS. 33 and 34, and thus a detailed description thereof is omitted.

The sps_extension_flag field indicates whether the sps_extension_data_flag field is present in the SPS. The sps_extension_flag field set to 0 indicates that the sps_extension_data_flag field is not present in the SPS syntax structure. The value of 1 for the sps_extension_flag field is reserved for future use. The decoder may ignore all sps_extension_data_flag fields following the sps_extension_flag field set to 1.

The sps_extension_data_flag field indicates whether data for future use is present and may have any value.

The SPS syntax according to embodiments is not limited to the above example, and may further include additional fields (or referred to as elements) or exclude some of the elements shown in the figure for efficiency of signaling. Some of the elements may be signaled through signaling information (e.g., APS, attribute header, etc.) other than the SPS or through an attribute data unit.

FIG. 36 shows an embodiment of a syntax structure of the GPS (geometry_parameter_set( )) of signaling information according to the present disclosure. The GPS may include information on a method of encoding geometry information of point cloud data included in one or more slices.

According to embodiments, the GPS may include a gps_geom_parameter_set_id field, a gps_seq_parameter_set_id field, gps_box_present_flag field, a unique_geometry_points_flag field, a geometry_planar_mode_flag field, a geometry_angular_mode_flag field, a neighbour_context_restriction_flag field, a inferred_direct_coding_mode_enabled_flag field, a bitwise_occupancy_coding_flag field, an adjacent_child_contextualization_enabled_flag field, a log 2_neighbour_avail_boundary field, a log 2_intra_pred_max_node_size field, a log 2_trisoup_node_size field, a geom_scaling_enabled_flag field, a gps_implicit_geom_partition_flag field, and a gps_extension_flag field.

The gps_geom_parameter_set_id field provides an identifier for the GPS for reference by other syntax elements.

The gps_seq_parameter_set_id field specifies the value of sps_seq_parameter_set_id for the active SPS.

The gps_box_present_flag field specifies whether additional bounding box information is provided in a geometry slice header that references the current GPS. For example, the gps_box_present_flag field equal to 1 may specify that additional bounding box information is provided in a geometry slice header that references the current GPS. Accordingly, when the gps_box_present_flag field is equal to 1, the GPS may further include a gps_gsh_box_log 2_scale_present_flag field.

The gps_gsh_box_log 2_scale_present_flag field specifies whether the gps_gsh_box_log 2_scale field is signaled in each geometry slice header that references the current GPS. For example, the gps_gsh_box_log 2_scale_present_flag field equal to 1 may specify that the gps_gsh_box_log 2_scale field is signaled in each geometry slice header that references the current GPS. As another example, the gps_gsh_box_log 2_scale_present_flag field equal to 0 may specify that the gps_gsh_box_log 2_scale field is not signaled in each geometry slice header and a common scale for all slices is signaled in the gps_gsh_box_log 2_scale field of the current GPS.

When the gps_gsh_box_log 2_scale_present_flag field is equal to 0, the GPS may further include a gps_gsh_box_log 2_scale field.

The gps_gsh_box_log 2_scale field indicates the common scale factor of the bounding box origin for all slices that refer to the current GPS.

unique_geometry_points_flag indicates whether all output points have unique positions in one slice in all slices currently referring to GPS. For example, unique_geometry_points_flag equal to 1 indicates that in all slices that refer to the current GPS, all output points have unique positions within a slice. unique_geometry_points_flag field equal to 0 indicates that in all slices that refer to the current GPS, the two or more of the output points may have same positions within a slice.

The geometry_planar_mode_flag field indicates whether the planar coding mode is activated. For example, geometry_planar_mode_flag equal to 1 indicates that the planar coding mode is active. geometry_planar_mode_flag equal to 0 indicates that the planar coding mode is not active.

When the value of the geometry_planar_mode_flag field is 1, that is, TRUE, the GPS may further include a geom_planar_mode_th_idcm field, a geom_planar_mode_th[1] field, and a geom_planar_mode_th[2] field.

The geom_planar_mode_th_idcm field may specify the value of the threshold of activation for the direct coding mode.

geom_planar_mode_th[i] specifies, for i in the range of 0 . . . 2, specifies the value of the threshold of activation for planar coding mode along the i-th most probable direction for the planar coding mode to be efficient.

geometry_angular_mode_flag indicates whether the angular coding mode is active. For example, geometry_angular_mode_flag field equal to 1 may indicate that the angular coding mode is active. geometry_angular_mode_flag field equal to 0 may indicate that the angular coding mode is not active.

When the value of the geometry_angular_mode_flag field is 1, that is, TRUE, the GPS may further include an lidar_head_position[0] field, a lidar_head_position[1] field, a lidar_head_position[2] field, a number_lasers field, a planar_buffer_disabled field, an implicit_qtbt_angular_max_node_min_dim_log 2_to_split_z field, and an implicit_qtbt_angular_max_diff_to_split_z field.

The lidar_head_position[0] field, lidar_head_position[1] field, and lidar_head_position[2] field may specify the (X, Y, Z) coordinates of the lidar head in the coordinate system with the internal axes.

number_lasers specifies the number of lasers used for the angular coding mode.

The GPS according to the embodiments includes an iteration statement that is repeated as many times as the value of the number_lasers field. In an embodiment, i is initialized to 0, and is incremented by 1 each time the iteration statement is executed. The iteration statement is repeated until the value of i becomes equal to the value of the number_lasers field. This iteration statement may include a laser_angle[i] field and a laser_correction[i] field.

laser_angle[i] specifies the tangent of the elevation angle of the i-th laser relative to the horizontal plane defined by the 0-th and the 1st internal axes.

laser_correction[i] specifies the correction, along the second internal axis, of the i-th laser position relative to the lidar_head_position[2].

planar_buffer_disabled equal to 1 indicates that tracking the closest nodes using a buffer is not used in process of coding the planar mode flag and the plane position in the planar mode. planar_buffer_disabled equal to 0 indicates that tracking the closest nodes using a buffer is used.

implicit_qtbt_angular_max_node_min_dim_log 2_to_split_z specifies the log 2 value of a node size below which horizontal split of nodes is preferred over vertical split.

implicit_qtbt_angular_max_diff_to_split_z specifies the log 2 value of the maximum vertical over horizontal node size ratio allowed to a node.

neighbour_context_restriction_flag equal to 0 indicates that geometry node occupancy of the current node is coded with the contexts determined from neighbouring nodes which is located inside the parent node of the current node. neighbour_context_restriction_flag equal to 1 indicates that geometry node occupancy of the current node is coded with the contexts determined from neighbouring nodes which is located inside or outside the parent node of the current node.

The inferred_direct_coding_mode_enabled_flag field indicates whether the direct_mode_flag field is present in the geometry node syntax. For example, the inferred_direct_coding_mode_enabled_flag field equal to 1 indicates that the direct_mode_flag field may be present in the geometry node syntax. For example, the inferred_direct_coding_mode_enabled_flag field equal to 0 indicates that the direct_mode_flag field is not present in the geometry node syntax.

The bitwise_occupancy_coding_flag field indicates whether geometry node occupancy is encoded using bitwise contextualization of the syntax element occupancy map. For example, the bitwise_occupancy_coding_flag field equal to 1 indicates that geometry node occupancy is encoded using bitwise contextualisation of the syntax element occupancy_map. For example, the bitwise_occupancy_coding_flag field equal to 0 indicates that geometry node occupancy is encoded using the dictionary encoded syntax element occupancy_byte.

The adjacent_child_contextualization_enabled_flag field indicates whether the adjacent children of neighboring octree nodes are used for bitwise occupancy contextualization. For example, the adjacent_child_contextualization_enabled_flag field equal to 1 indicates that the adjacent children of neighboring octree nodes are used for bitwise occupancy contextualization. For example, adjacent_child_contextualization_enabled_flag equal to 0 indicates that the children of neighbouring octree nodes are not used for the occupancy contextualization.

The log 2_neighbour_avail_boundary field specifies the value of the variable NeighbAvailBoundary that is used in the decoding process. For example, when the neighbour_context_restriction_flag field is equal to 1, NeighbAvailabilityMask may be set equal to 1. For example, when the neighbour_context_restriction_flag field is equal to 0, NeighbAvailabilityMask may be set equal to 1<<log 2_neighbour_avail_boundary.

The log 2_intra_pred_max_node_size field specifies the octree node size eligible for occupancy intra prediction.

The log 2_trisoup_node_size field specifies the variable TrisoupNodeSize as the size of the triangle nodes.

geom_scaling_enabled_flag indicates specifies whether a scaling process for geometry positions is applied during the geometry slice decoding process. For example, geom_scaling_enabled_flag equal to 1 specifies that a scaling process for geometry positions is applied during the geometry slice decoding process. geom_scaling_enabled_flag equal to 0 specifies that geometry positions do not require scaling.

geom_base_qp indicates the base value of the geometry position quantization parameter.

gps_implicit_geom_partition_flag indicates whether the implicit geometry partition is enabled for the sequence or slice. For example, equal to 1 specifies that the implicit geometry partition is enabled for the sequence or slice. gps_implicit_geom_partition_flag equal to 0 specifies that the implicit geometry partition is disabled for the sequence or slice. When gps_implicit_geom_partition_flag is equal to 1, the following two fields, that is, a gps_max_num_implicit_qtbt_before_ot field and a gps_min_size_implicit_qtbt field, are signaled.

gps_max_num_implicit_qtbt_before_ot specifies the maximal number of implicit QT and BT partitions before OT partitions. Then, the variable K is initialized by gps_max_num_implicit_qtbt_before_ot as follows.

K=gps_max_num_implicit_qtbt_before_ot.

gps_min_size_implicit_qtbt specifies the minimal size of implicit QT and BT partitions. Then, the variable M is initialized by gps_min_size_implicit_qtbt as follows.

M=gps_min_size_implicit_qtbt gps_extension_flag indicates whether a gps_extension_data syntax structure is present in the GPS syntax structure. For example, gps_extension_flag equal to 1 indicates that the gps_extension_data syntax structure is present in the GPS syntax. For example, gps_extension_flag equal to 0 indicates that the gps_extension_data syntax structure is not present in the GPS syntax.

When gps_extension_flag is equal to 1, the GPS according to the embodiments may further include a gps_extension_data_flag field.

gps_extension_data_flag may have any value. Its presence and value do not affect decoder conformance to profiles.

According to embodiments, the GPS syntax may include projection-related signaling information.

According to embodiments, the GPS syntax further includes an sps_seq_parameter_set_id field when the value of the sps_projection_flag field (included in the SPS syntax) is 1, and further includes a gps_projection_param_present_flag field when the value of the sps_projection_flag field is 0.

The sps_seq_parameter_set_id field is an identifier of an SPS for reference by other syntax elements.

The gps_projection_param_present_flag field is the same as the projection_flag field described with reference to FIGS. 33 and 34. When the value of the gps_projection_param_present_flag field is 1, the GPS syntax further includes the projection-related signaling information described with reference to FIGS. 33 and 34. The projection-related signaling information is the same as that described with reference to FIGS. 33 and 34, and thus a detailed description thereof is omitted.

FIG. 37 shows an embodiment of a syntax structure of the attribute parameter set (APS) (attribute_parameter_set( )) of signaling information according to the present disclosure. The APS according to the embodiments may contain information on a method of encoding attribute information about point cloud data contained in one or more slices.

The APS according to the embodiments may include an aps_attr_parameter_set_id field, an aps_seq_parameter_set_id field, an attr_coding_type field, an aps_attr_initial_qp field, an aps_attr_chroma_qp_offset field, an aps_slice_qp_delta_present_flag field, and an aps_extension_flag field.

The aps_attr_parameter_set_id field provides an identifier for the APS for reference by other syntax elements.

The aps_seq_parameter_set_id field specifies the value of sps_seq_parameter_set_id for the active SPS.

The attr_coding_type field indicates the coding type for the attribute.

According to embodiments, the attr_coding_type field equal to 0 may indicate predicting weight lifting as the coding type. The attr_coding_type field equal to 1 may indicate RAHT as the coding type. The attr_coding_type field equal to 2 may indicate fix weight lifting.

The aps_attr_initial_qp field specifies the initial value of the variable SliceQp for each slice referring to the APS.

The aps_attr_chroma_qp_offset field specifies the offsets to the initial quantization parameter signaled by the syntax aps_attr_initial_qp.

The aps_slice_qp_delta_present_flag field specifies whether the ash_attr_qp_delta_luma and ash_attr_qp_delta_chroma syntax elements are present in the attribute slice header (ASH). For example, the aps_slice_qp_delta_present_flag field equal to 1 specifies that the ash_attr_qp_delta_luma and ash_attr_qp_delta_chroma syntax elements are present in the ASH. For example, the aps_slice_qp_delta_present_flag field specifies that the ash_attr_qp_delta_luma and ash_attr_qp_delta_chroma syntax elements are not present in the ASH.

When the value of the attr_coding_type field is 0 or 2, that is, the coding type is predicting weight lifting or fix weight lifting, the APS according to the embodiments may further include a lifting_num_pred_nearest_neighbours_minus1 field, a lifting_search_range_minus1 field, and a lifting_neighbour_bias[k] field.

lifting_num_pred_nearest_neighbours plus 1 specifies the maximum number of nearest neighbors to be used for prediction. According to embodiments, the value of NumPredNearestNeighbours is set equal to lifting_num_pred_nearest_neighbours.

lifting_search_range_minus1 plus 1 specifies the search range used to determine nearest neighbours to be used for prediction and to build distance-based levels of detail (LODs). The variable LiftingSearchRange for specifying the search range may be obtained by adding 1 to the value of the lifting_search_range_minus1 field (LiftingSearchRange=lifting_search_range_minus1+1).

The lifting_neighbour_bias[k] field specifies a bias used to weight the k-th components in the calculation of the Euclidean distance between two points as part of the nearest neighbor derivation process.

When the value of the attr_coding_type field is 2, that is, when the coding type indicates fix weight lifting, the APS according to the embodiments may further include a lifting_scalability_enabled_flag field.

The lifting_scalability_enabled_flag field specifies whether the attribute decoding process allows the pruned octree decode result for the input geometry points. For example, the lifting_scalability_enabled_flag field equal to 1 specifies that the attribute decoding process allows the pruned octree decode result for the input geometry points. The lifting_scalability_enabled_flag field equal to 0 specifies that that the attribute decoding process requires the complete octree decode result for the input geometry points.

According to embodiments, when the value of the lifting_scalability_enabled_flag field is FALSE, the APS may further include a lifting_num_detail_levels_minus1 field.

The lifting_num_detail_levels_minus1 field specifies the number of levels of detail for the attribute coding. The variable LevelDetailCount for specifying the number of LODs may be obtained by adding 1 to the value of the lifting_num_detail_levels_minus1 field. (LevelDetailCount=lifting_num_detail_levels_minus1+1).

According to embodiments, when the value of the lifting_num_detail_levels_minus1 field is greater than 1, the APS may further include a lifting_lod_regular_sampling_enabled_flag field.

The lifting_lod_regular_sampling_enabled_flag field specifies whether levels of detail (LODs) are built by a regular sampling strategy. For example, the lifting_lod_regular_sampling_enabled_flag equal to 1 specifies that levels of detail (LOD) are built by using a regular sampling strategy. The lifting_lod_regular_sampling_enabled_flag equal to 0 specifies that a distance-based sampling strategy is used instead.

According to embodiments, when the value of the lifting_scalability_enabled_flag field is FALSE, the APS may further include an iteration statement iterated as many times as the value of the lifting_num_detail_levels_minus1 field. In an embodiment, the index (idx) is initialized to 0 and incremented by 1 every time the iteration statement is executed, and the iteration statement is iterated until the index (idx) is greater than the value of the lifting_num_detail_levels_minus1 field. This iteration statement may include a lifting_sampling_period_minus2 [idx] field when the value of the lifting_lod_decimation_enabled_flag field is TRUE (e.g., 1), and may include a lifting_sampling_distance_squared_scale_minus1 [idx] field when the value of the lifting_lod_regular_sampling_enabled_flag field is FALSE (e.g., 0). Also, when the value of idx is not 0 (idx !=0), a lifting_sampling_distance_squared_offset [idx] field may be further included.

lifting_sampling_period_minus2 [idx] plus 2 specifies the sampling period for the level of detail idx.

lifting_sampling_distance_squared_scale_minu1 [idx] plus 1 specifies the scale factor for the derivation of the square of the sampling distance for the level of detail idx.

The lifting_sampling_distance_squared_offset [idx] field specifies the offset of the derivation of the square of the sampling distance for the level of detail idx.

When the value of the attr_coding_type field is 0, that is, when the coding type is predicting weight lifting, the APS according to the embodiments may further include a lifting_adaptive_prediction_threshold field, a lifting_intra_lod_prediction_num_layers field, a lifting_max_num_direct_predictors field, and an inter_component_prediction_enabled_flag field.

The lifting_adaptive_prediction_threshold field specifies the threshold to enable adaptive prediction. According to embodiments, a variable AdaptivePredictionThreshold for specifying a threshold for switching an adaptive predictor selection mode is set equal to the value of the lifting_adaptive_prediction_threshold field (AdaptivePrediction Threshold=lifting_adaptive_prediction_threshold).

The lifting_intra_lod_prediction_num_layers field specifies the number of LOD layers where decoded points in the same LOD layer could be referred to generate a prediction value of a target point. For example, the lifting_intra_lod_prediction_num_layers field equal to LevelDetailCount indicates that target point could refer to decoded points in the same LOD layer for all LOD layers. For example, the lifting_intra_lod_prediction_num_layers field equal to 0 indicates that target point could not refer to decoded points in the same LoD layer for any LoD layers. The lifting_max_num_direct_predictors field specifies the maximum number of predictors to be used for direct prediction. The value of the lifting_max_num_direct_predictors field shall be in the range of 0 to LevelDetailCount.

The inter_component_prediction_enabled_flag field specifies whether the primary component of a multi component attribute is used to predict the reconstructed value of non-primary components. For example, if the inter_component_prediction_enabled_flag field equal to 1 specifies that the primary component of a multi component attribute is used to predict the reconstructed value of non-primary components. The inter_component_prediction_enabled_flag field equal to 0 specifies that all attribute components are reconstructed independently.

According to the embodiments, when the value of the attr_coding_type field is 1, that is, when the attribute coding type is RAHT, the APS may further include a raht_prediction_enabled_flag field.

The raht_prediction_enabled_flag field specifies whether the transform weight prediction from the neighbor points is enabled in the RAHT decoding process. For example, the raht_prediction_enabled_flag field equal to 1 specifies the transform weight prediction from the neighbor points is enabled in the RAHT decoding process. raht_prediction_enabled_flag equal to 0 specifies that the transform weight prediction is disabled in the RAHT decoding process.

According to embodiments, when the value of the raht_prediction_enabled_flag field is TRUE, the APS may further include a raht_prediction_threshold0 field and a raht_prediction_threshold1 field.

The raht_prediction_threshold0 field specifies a threshold to terminate the transform weight prediction from neighbour points.

The raht_prediction_threshold1 field specifies a threshold to skip the transform weight prediction from neighbour points.

The aps_extension_flag field specifies whether the aps_extension_data_flag syntax structure is present in the APS syntax structure. For example, aps_extension_flag equal to 1 indicates that the aps_extension_data syntax structure is present in the APS syntax structure. For example, aps_extension_flag equal to 0 indicates that the aps_extension_data syntax structure is not present in the APS syntax structure.

When the value of the aps_extension_flag field is 1, the APS according to the embodiments may further include an aps_extension_data_flag field.

The aps_extension_data_flag field may have any value. Its presence and value do not affect decoder conformance to profiles.

The APS according to the embodiments may further include information related to LoD-based attribute compression.

According to embodiments, the APS syntax may include projection-related signaling information.

According to embodiments, the APS syntax further includes an sps_seq_parameter_set_id field when the value of the sps_projection_flag field (included in the SPS syntax) is 1, and further includes a gps_geom_parameter_set_id field when the value of the gps_projection_param_present_flag field (included in the GPS syntax) is 1. If both the value of the sps_projection_flag field and the value of the gps_projection_param_present_flag field are 0, the syntax further includes an aps_projection_param_present_flag field.

The sps_seq_parameter_set_id field is an identifier of the SPS referenced by other syntax elements.

The gps_geom_parameter_set_id field is a GPS identifier referenced by other syntax elements.

The aps_projection_param_present_flag field is the same as the projection_flag field described with reference to FIGS. 33 and 34. When the value of the aps_projection_param_present_flag field is 1, the APS syntax further includes the projection-related signaling information described with reference to FIGS. 33 and 34. The projection-related signaling information is the same as that described with reference to FIGS. 33 and 34, and thus a detailed description thereof is omitted.

FIG. 38 shows an exemplary syntax structure of a tile parameter set (tile_parameter_set( )) (TPS) in the signaling information according to embodiments.

According to embodiments, the TPS may be referred to as a tile inventory. The TPS includes information related to each tile.

The TPS according to embodiments includes a num_tiles field.

The num_tiles field indicates the number of tiles signaled for the bitstream. When not present, num_tiles is inferred to be 0.

The TPS according to embodiments includes a loop statement iterating as many times as the value of the num_tiles field. In this case, i is initialized to 0, and incremented by 1 each time the loop statement is executed. The loop statement iterates until i reaches the value of the num_tiles field. This loop statement may include a tile_bounding_box_offset_x[i] field, a tile_bounding_box_offset_y[i] field, a tile_bounding_box_offset_z[i] field, a tile_bounding_box_size_width[i] field, a tile_bounding_box_size_height[i] field, a tile_bounding_box_size_depth[i] field, and an attribute_pred_residual_separate_encoding_flag[i] field.

The tile_bounding_box_offset_x[i] field indicates the x offset of the i-th tile in the Cartesian coordinates.

The tile_bounding_box_offset_y[i] field indicates the y offset of the i-th tile in the Cartesian coordinates.

The tile_bounding_box_offset_z[i] field indicates the z offset of the i-th tile in the Cartesian coordinates.

The tile_bounding_box_size_width[i] field indicates the width of the i-th tile in the Cartesian coordinates.

The tile_bounding_box_size_height[i] field indicates the height of the i-th tile in the Cartesian coordinates.

The tile_bounding_box_size_depth[i] field indicates the depth of the i-th tile in the Cartesian coordinates.

According to embodiments, the TPS syntax may include projection-related signaling information.

The projection_flag field is the same as the projection_flag field described with reference to FIGS. 33 and 34. When the value of the projection_flag field is 1, the TPS syntax further includes the projection-related signaling information (projection_info( )) described with reference to FIGS. 33 and 34. The projection-related signaling information is the same as that described with reference to FIGS. 33 and 34, and thus a detailed description thereof is omitted.

The syntax of the tile inventory is not limited to the above example, and may further include additional elements or exclude some of the elements shown in the figure for efficiency of signaling. Some of the elements may be signaled through signaling information (e.g., SPS, APS, attribute header, etc.) other than the tile inventory or through an attribute data unit.

FIG. 39 is a diagram illustrating an embodiment of a syntax structure of a geometry slice bitstreamo according to the present disclosure.

A geometry slice bitstream (geometry_slice_bitstream ( )) according to embodiments may include a geometry slice header (geometry_slice_header( )) and geometry slice data (geometry_slice_data( )). According to embodiments, the geometry slice bitstream is also referred to as a geometry data unit, the geometry slice header is also referred to as a geometry data unit header, and the geometry slice data is also referred to as geometry data unit data.

FIG. 40 shows an embodiment of a syntax structure of a geometry slice header (geometry_slice_header( )) according to the present disclosure.

A bitstream transmitted by the transmission device (or a bitstream received by the reception device) according to the embodiments may contain one or more slices. Each slice may include a geometry slice and an attribute slice. The geometry slice includes a geometry slice header (GSH). The attribute slice includes an attribute slice header (ASH).

The geometry slice header (geometry_slice_header( )) according to the embodiments may include a gsh_geometry_parameter_set_id field, a gsh_tile_id field, gsh_slice_id field, a frame_idx field, a gsh_num_points field, and a byte_alignment( ) field.

When the value of the gps_box_present_flag field included in the GPS is TRUE (e.g., 1), and the value of the gps_gsh_box_log 2_scale_present_flag field is TRUE (e.g., 1), the geometry slice header (geometry_slice_header( )) according to the embodiments may further include a gsh_box_log 2_scale field, a gsh_box_origin_x field, a gsh_box_origin_y field, and a gsh_box_origin_z field.

gsh_geometry_parameter_set_id specifies the value of the gps_geom_parameter_set_id of the active GPS.

The gsh_tile_id field specifies the value of the tile id that is referenced by the GSH.

The gsh_slice_id field specifies ID of the slice for reference by other syntax elements.

The frame_idx field indicates log 2_max_frame_idx+1 least significant bits of a conceptual frame number counter. Consecutive slices with differing values of frame_idx form parts of different output point cloud frames. Consecutive slices with identical values of frame_idx without an intervening frame boundary marker data unit form parts of the same output point cloud frame.

The gsh_num_points field indicates the maximum number of coded points in a slice. According to embodiments, it is a requirement of bitstream conformance that gsh_num_points is greater than or equal to the number of decoded points in the slice.

The gsh_box_log 2_scale field specifies the scaling factor of the bounding box origin for the slice.

The gsh_box_origin_x field specifies the x value of the bounding box origin scaled by the value of the gsh_box_log 2_scale field.

The gsh_box_origin_y field specifies the y value of the bounding box origin scaled by the value of the gsh_box_log 2_scale field.

The gsh_box_origin_z field specifies the z value of the bounding box origin scaled by the value of the gsh_box_log 2_scale field.

Here, the variables slice_origin_x, slice_origin_y, and slice_origin_z may be derived as follows.

When gps_gsh_box_log 2_scale_present_flag is equal to 0, originScale is set to gsh_box_log 2_scale.

When gps_gsh_box_log 2_scale_present_flag is equal to 1, originScale is set to gps_gsh_box_log 2_scale.

When gps_box_present_flag is equal to 0, the values of the variables slice_origin_x, slice_origin_y, and slice_origin_z are inferred to be 0.

When gps_box_present_flag is equal to 1, the following equations will be applied to the variables slice_origin_x, slice_origin_y, and slice_origin_z.

slice_origin_x=gsh_box_origin_x<<originScale slice_origin_y=gsh_box_origin_y<<originScale slice_origin_z=gsh_box_origin_z<<originScale When the value of the gps_implicit_geom_partition_flag field is TRUE (i.e., 0), the geometry slice header ((geometry_slice_header( ))) may further include a gsh_log 2_max_nodesize_x field, a gsh_log 2_max_nodesize_y_minus_x field, and a gsh_log 2_max_nodesize_z_minus_y field. When the value of the gps_implicit_geom_partition_flag field is FALSE (i.e., 1), the geometry slice header may further include a gsh_log 2_max_nodesize field.

The gsh_log 2_max_nodesize_x field specifies the bounding box size in the x dimension, i.e., MaxNodesizeXLog 2 that is used in the decoding process as follows.

MaxNodeSizeXLog 2=gsh_log 2_max_nodesize_x

MaxNodeSizeX=1<<MaxNodeSizeXLog 2

The gsh_log 2_max_nodesize_y_minus_x field specifies the bounding box size in the y dimension, i.e., MaxNodesizeYLog 2 that is used in the decoding process as follows.

MaxNodeSizeYLog 2=gsh_log 2_max_nodesize_y_minus_x+MaxNodeSizeXLog 2.

MaxNodeSizeY=1<<MaxNodeSizeYLog 2.

The gsh_log 2_max_nodesize_z_minus_y field specifies the bounding box size in the z dimension, i.e., MaxNodesizezLog 2 that is used in the decoding process as follows.

MaxNodeSizezLog 2=gsh_log 2_max_nodesize_z_minus_y+MaxNodeSizeYLog 2

MaxNodeSizeZ=1<<MaxNodeSizezLog 2

When the value of the gps_implicit_geom_partition_flag field is 1, gsh_log 2_max_nodesize is obtained as follows.

gsh_log 2_max_nodesize=max{MaxNodeSizeXLog 2, MaxNodeSizeYLog 2, MaxNodeSizezLog 2}

The gsh_log 2_max_nodesize field specifies the size of the root geometry octree node when gps_implicit_geom_partition_flag is equal to 0.

Here, the variables MaxNodeSize and MaxGeometryOctreeDepth are derived as follows.

MaxNodeSize=1<<gsh_log 2_max_nodesize

MaxGeometryOctreeDepth=gshlog 2_max_nodesize-log 2_trisoup_node_size

When the value of the geom_scaling_enabled_flag field is TRUE, the geometry slice header (geometry_slice_header( )) according to the embodiments may further include a geom_slice_qp_offset field and a geom_octree_qp_offsets_enabled_flag field.

The geom_slice_qp_offset field specifies an offset to the base geometry quantization parameter geom_base_qp.

The geom_octree_qp_offsets_enabled_flag field specifies whether the geom_octree_qp_ofsets_depth field is present in the geometry slice header. For example, geom_octree_qp_offsets_enabled_flag equal to 1 specifies that the geom_octree_qp_ofsets_depth field is present in the geometry slice header. geom_octree_qp_offsets_enabled_flag equal to 0 specifies that the geom_octree_qp_ofsets_depth field is not present.

The geom_octree_qp_offsets_depth field specifies the depth of the geometry octree.

According to embodiments, the geometry slice header may include projection-related signaling information.

The projection_flag field is the same as the projection_flag field described with reference to FIGS. 33 and 34. When the value of the projection_flag field is 1, the geometry slice header further includes the projection-related signaling information described with reference to FIGS. 33 and 34. The projection-related signaling information is the same as that described with reference to FIGS. 33 and 34, and thus a detailed description thereof is omitted.

FIG. 41 is a diagram illustrating another embodiment of a syntax structure of geometry slice data (geometry_slice_data( )) according to the present disclosure. The geometry slice data (geometry_slice_data( )) according to embodiments may transmit a geometry bitstream belonging to a corresponding slice. FIG. 31 may be applied when geometry prediction is performed based on an octree or a trisoup.

The geometry_slice_data( ) according to the embodiments may include a first iteration statement repeated as many times as by the value of MaxGeometryOctreeDepth. In an embodiment, the depth is initialized to 0 and is incremented by 1 each time the iteration statement is executed, and the first iteration statement is repeated until the depth becomes equal to MaxGeometryOctreeDepth. The first iteration statement may include a second loop statement repeated as many times as the value of NumNodesAtDepth. In an embodiment, nodeidx is initialized to 0 and is incremented by 1 each time the iteration statement is executed. The second iteration statement is repeated until nodeidx becomes equal to NumNodesAtDepth. The second iteration statement may include xN=NodeX[depth][nodeIdx], yN=NodeY[depth][nodeIdx], zN=NodeZ[depth][nodeIdx], and geometry_node(depth, nodeIdx, xN, yN, zN). MaxGeometryOctreeDepth indicates the maximum value of the geometry octree depth, and NumNodesAtDepth[depth] indicates the number of nodes to be decoded at the corresponding depth. The variables NodeX[depth][nodeIdx], NodeY[depth][nodeIdx], and NodeZ[depth][nodeIdx] indicate the x, y, z coordinates of the idx-th node in decoding order at a given depth. The geometry bitstream of the node of the depth is transmitted through geometry_node(depth, nodeIdx, xN, yN, zN).

The geometry slice data (geometry_slice_data( )) according to the embodiments may further include geometry_trisoup_data( ) when the value of the log 2_trisoup_node_size field is greater than 0. That is, when the size of the triangle nodes is greater than 0, a geometry bitstream subjected to trisoup geometry encoding is transmitted through geometry_trisoup_data( ).

FIG. 42 shows an embodiment of a syntax structure of attribute_slice_bitstream( ) according to the present disclosure.

The attribute slice bitstream (attribute_slice_bitstream ( )) according to the embodiments may include an attribute slice header (attribute_slice_header( )) and attribute slice data (attribute_slice_data( )). According to the embodiments, the attribute slice bitstream may be referred to as an attribute data unit, the attribute slice header may be referred to as an attribute data unit header, and the attribute slice data may be referred to as an attribute data unit data.

FIG. 43 shows an example of a syntax structure of an attribute slice header (attribute_slice_header( )) according to the present specification.

The attribute slice header according to the embodiments may include an ash_attr_parameter_set_id field, an ash_attr_sps_attr_idx field, and an ash_attr_geom_slice_id field.

When the value of the aps_slice_qp_delta_present_flag field of the APS is TRUE (e.g., 1), the attribute slice header according to the embodiments may further include an ash_attr_qp_delta_luma field and an ash_attr_qp_delta_chroma field.

The ash_attr_parameter_set_id field specifies the value of the aps_attr_parameter_set_id field of the current active APS.

The ash_attr_sps_attr_idx field specifies an attribute set in the current active SPS. The ash_attr_geom_slice_id field specifies the value of the gsh_slice_id field of the current geometry slice header.

The ash_attr_qp_delta_luma field specifies a luma delta quantization parameter qp derived from the initial slice qp in the active attribute parameter set.

The ash_attr_qp_delta_chroma field specifies the chroma delta qp derived from the initial slice qp in the active attribute parameter set.

According to embodiments, the attribute slice header may include projection-related signaling information.

The projection_flag field is the same as the projection_flag field described with reference to FIGS. 33 and 34. When the value of the projection_flag field is 1, the attribute slice header further includes the projection-related signaling information described with reference to FIGS. 33 and 34. The projection-related signaling information is the same as that described with reference to FIGS. 33 and 34, and thus a detailed description thereof is omitted.

In FIGS. 32 to 47, when the sps_projection_param_present_flag field, the gps_projection_param_present_flag field, or the aps_projection_param_present_flag field is set to 1, it may indicate that projection-related signaling information is carried in the SPS, GPS, or APS. When the sps_projection_param_present_flag field, the gps_projection_param_present_flag field, or the aps_projection_param_present_flag field is set to 0, it may indicate that projection-related signaling information is delivered on a slice-by-slice basis.

When coordinate projection is performed and projection-related signaling information is carried in the SPS or GPS, the sps_seq_parameter_set_id field and the gps_seq_parameter_set_id field may signal an indicator of the corresponding parameter set. For example, when coordinate conversion is used for attribute coding, the projection-related signaling information may be carried in the GPS (for example, parameters (or fields) used in coordinate conversion are used in a coding scheme used for geometry coding in common). In this case, a parameter set indicator for referencing the parameter may be directly delivered. Similarly, when the signaling information is defined in the SPS to indicate that the parameter is applied to the entire sequence or to the position and attribute simultaneously, a sequence parameter set indicator may be directly delivered. With this method, a parameter set including required parameters among a plurality of parameter sets may be referenced. If a parameter defined in the APS is to be used for position reconstruction, the parameter may be allowed to be used by defining an APS indicator in the GPS.

FIG. 44 is a block diagram illustrating the operation of a point cloud data reception device according to embodiments.

FIG. 44 illustrates example operations of a point cloud data reception device (or point cloud reception device) (e.g., the reception device 10004 of FIG. 1, the point cloud decoder of FIGS. 10 and 11, the reception device of FIG. 13) that processes point cloud data on which projection has been performed. As described with reference to FIGS. 1 to 14, the point cloud reception device performs geometry decoding on the input geometry bitstream (4410). The geometry decoding according to the embodiments may include, but is not limited to, octree geometry decoding and trisoup geometry decoding. The point cloud reception device performs at least one of the operations of the arithmetic decoder 13002, the occupancy code-based octree reconstruction processor 13003, the surface model processor (triangle reconstruction, up-sampling, voxelization) 13004, and the inverse quantization processor 13005 described with reference to FIG. 13. The point cloud reception device outputs the reconstructed (or restored) geometry as a result of the geometry decoding.

The point cloud reception device according to the embodiments determines projection is applied based on the signaling information (4420). When the projection is applied, the point cloud reception device projects the decoded geometry (4430), and performs attribute decoding based on the geometry on which projection has been performed (4440). When the projection is not applied, the point cloud reception device performs attribute decoding based on the reconstructed geometry (4440). The attribute decoding 4440 corresponds to, but is not limited to, at least one or a combination of the operations of the arithmetic decoder 13007, the inverse quantization processor 13008, the prediction/lifting/RAHT inverse transform processor 13009, and the color inverse transform processor 13010. In addition, the attribute decoding 4440 may include at least one or a combination of RAHT coding, predictive transform coding, and lifting transform coding. When the projection is performed, the point cloud reception device performs inverse projection (4450). Since the decoded attribute is matched to the projected geometry, the point cloud data of the geometry and the attribute which are matched in the projected coordinate system (or space) should be converted back into the original coordinate system. Therefore, the point cloud reception device secures reconstructed point cloud data by performing the inverse projection. In the case where the projection has not been performed, the inverse projection 4450 is skipped. The projection 4430 may be referred to as coordinate conversion pre-processing for attribute decoding. The inverse projection 4450 may be referred to as coordinate conversion post-process for attribute decoding. FIG. 44 illustrates example operations of the point cloud reception device, and the order of the operations is not limited to this example. The operations represented by the elements in FIG. 44 may be performed by hardware, software, and/or a process that constitute the point cloud reception device, or a combination thereof.

FIG. 45 illustrates an example of operations of the point cloud reception device.

FIG. 45 specifically illustrates the operations of the point cloud data reception device of FIG. 44. The order of the operations for data processing of the point cloud reception device in FIG. 45 is not limited to this example. In addition, the operations represented by the elements in FIG. 45 may be performed by hardware, software, and/or processes that constitute the point cloud reception device, or a combination thereof.

The demultiplexer of the point cloud reception device demultiplexes a received bitstream to output a geometry bitstream and an attribute bitstream.

The geometry bitstream is output to a geometry decoder, and the attribute bitstream is output to an attribute decoder. The geometry decoder may include an entropy decoding unit 4501, a dequantization unit 4502, and a geometry decoding unit 4503. The attribute decoder may include an entropy decoding unit 4510, an dequantization unit 4511, and an attribute decoding unit 4512. The point cloud reception device according to the embodiments may further include a projection post-processing unit 4520.

The entropy decoding unit 4501, the dequantization unit 4502, and the geometry decoding unit 4503 of the point cloud reception device according to the embodiments perform entropy decoding, dequantization, and geometry decoding on the input geometry bitstream to reconstruct (restore) the geometry, and output reconstructed geometry to the attribute decoding unit 4512 of the attribute decoder and the projection post-processing unit 4520. The entropy decoding unit 4501, the dequantization unit 4502, and the geometry decoding unit 4503 according to the embodiments may be referred to as a geometry decoder or a geometry processor, and correspond to at least one or a combination of the arithmetic decoder 13002, the occupancy code-based octree reconstruction processor 13003, the surface model processor (triangle reconstruction, up-sampling, voxelization) 13004, or the inverse quantization processor 13005 described with reference to FIG. 13.

The entropy decoding unit 4510, the dequantization unit 4511, and the attribute decoding unit 4512 of the point cloud reception device according to the embodiments perform entropy decoding, dequantization, and attribute decoding on the input attribute bitstream to reconstruct (decode) attributes, and output the reconstructed attributes to the projection post-processing unit 4520. The entropy decoding unit 4510, the dequantization unit 4511, and the attribute decoding unit 4512 according to the embodiments may be referred to as an attribute decoder or an attribute processor, and correspond to the attribute decoding 4440 described with reference to FIG. 44. In addition, the entropy decoding unit 4510, the dequantization unit 4511, and the attribute decoding unit 4512 according to the embodiments correspond at least one or a combination of the arithmetic decoder 13007, the inverse quantization processor 13008, and the prediction/lifting/RAHT inverse transform processor 13009, and the color inverse transform processor 13010, but are not limited to the above example.

As described with reference to FIGS. 32 to 43, the signaling information according to the embodiments further includes signaling information (e.g., geo_projection_enable_flag, attr_projetion_enable_flag, attr_coord_conv_enable_flag, etc.) indicating whether the projection is applied to each of the geometry and/or the attributes.

According to embodiments, the attr_coord_conv_enable_flag field may be included in the APS, as shown in FIG. 54. The attr_coord_conv_enable_flag field may specify the use of coordinate convertion in the attribute coding process. The attr_coord_conv_enable_flag field set to 1 indicates that point cloud conversion is performed in the attribute coding process. The attr_coord_conv_enable_flag field set to 0 indicates that point cloud conversion is not performed in the attribute coding process.

According to embodiments, when the value of the attr_coord_conv_enable_flag field included in the APS is 1, it indicates that coordinate conversion scale factors (or referred to as scaling parameters) scale_x, scale_y, and scale_z are present. When the value of the attr_coord_conv_enable_flag_field is 0, there is no coordinate conversion scale factor, and scale_x, scale_y, and scale_z are maximum distances for all axes normalized to the maximum distances of the x, y, and z axes. The attr_coord_conv_scale field included in the APS specifies the scale ratio of the coordinate conversion axis in units of 2-8.

Therefore, the post-processing unit 4520 of the point cloud reception device according to the embodiments performs projection post-processing on the reconstructed geometry and reconstructed attributes based on the signaling information described with reference to FIGS. 32 to 43.

The projection post-processing unit 4520 according to the embodiments corresponds to the projection preprocessor 1620 on the transmission side described with reference to FIG. 16. The projection post-processing unit 4520 corresponds to the projection 4420 and the inverse projection 4450 described with reference to FIG. 44. The boxes indicated by a dashed line at the bottom of the figure represent a detailed block diagram of the projection post-processing unit 4520. As shown in the figure, the post-processing unit 4520 of the point cloud reception device may include a projection unit 4521, a projection Idx map generation unit 4522, and an inverse projection unit 4523.

The projection unit 4521 performs the projection on the reconstructed geometry. The projection process of the projection unit 4521 corresponds to the reverse process of the projector 1632 described with reference to FIG. 16. In the case where the point cloud transmission device has performed the projection on the geometry, the geometry reconstructed by the point cloud reception device represents a position in the projection domain. Therefore, the point cloud reception device performs reprojection of re-converting the projected geometry into a 3D space based on the signaling information (e.g., the signaling information related to the projection described with reference to FIGS. 24 to 28, coord_conversion_type, bounding_box_x_offset, etc.). The projection unit 4521 of the point cloud reception device may secure a range of reprojected data, scaling information (e.g., bounding_box_x/y/z_length, granularity_radius/angular/normal, etc.), and the like from the projection-related signaling information described with reference to FIGS. 32 to 43.

The projection unit 4521 of the point cloud reception device according to the embodiments may check whether the laser position adjustment has been performed at the transmitting side based on the projection-related signaling information (e.g., laser_position_adjustment_flag, etc.) described with reference to FIGS. 32 to 43, and secure information related to the laser position adjustment. In addition, the projection unit 4521 of the point cloud reception device may check whether the sampling rate has been performed at the transmitting side based on the projection-related signaling information (e.g., sampling_adjustment_cubic_flag, etc.) described with reference to FIGS. 32 to 43, and secure related information. The projection unit 4521 of the point cloud reception device according to the embodiments may perform reprojection based on the laser position adjustment and the sampling rate adjustment. The projection, laser position adjustment, and sampling rate adjustment according to the embodiments are the same as those described with reference to FIGS. 21 to 23, and thus a detailed description thereof is omitted.

The projection unit 4521 of the point cloud reception device may convert the coordinate system (e.g., the cylindrical coordinate system 1810 and the spherical coordinate system 1820 described with reference to FIG. 18) of the reprojected point cloud data (geometry) into the original coordinate system (e.g., the xyz coordinate system 1800) based on the projection-related signaling information (e.g., projection_type) described with reference to FIGS. 32 to 43. As described above with reference to FIGS. 32 to 43, the projection-related signaling information includes an output range of the data in the original coordinate system (e.g., orig_bounding_box_x_offset), and information related to the converted coordinate system (e.g., cylinder_center_x, etc.). The projection unit 4521 of the point cloud reception device may use the inverse transform equations for Equations 5 to 11. However, as described with reference to FIGS. 15 to 18, an error may occur in the position of a point while the point cloud transmission device performs voxelization (e.g., the projection domain voxelization 1644) and rounding. Thus, even when the projection unit 4521 of the point cloud reception device performs projection based on the signaling information, it may be difficult to reconstruct the geometry without loss. That is, even when the attribute is reconstructed without loss, an unintended error may occur because the geometry and the attribute fail to be accurately matched to each other due to loss of the reconstructed geometry. When the projection is applied only in the attribute coding, appropriate matching may be implemented by connecting the reconstructed geometry to the reconstructed attribute corresponding thereto even when the reconstructed attribute is not reconstructed without loss. Thereby, the reconstructed point cloud data with reduced errors may be secured.

Accordingly, the projection Idx map generation unit 4522 of the point cloud reception device according to the embodiments performs projection index map generation to generate an index map indicating the index of the position information in order to connect the projected geometry to the position given before the projection. The projection Idx map generation unit 4522 of the point cloud reception device sorts the points represented by the reconstructed geometry in a specific order (e.g., Morton code order, x-y-z zigzag order, etc.) for the reconstructed geometry, and assigns indexes according to the order. Also, the projection Idx map generation unit 4522 may generate an index to a decoded position (geometry) map and a decoded position (geometry) to the index map based on the relationship between the position given before the projection and the index. In addition, it performs projection on the geometry to which an index is assigned, and generates a decoded position to the projected position (geometry) map. In addition, the projection Idx map generation unit 4522*e* generates the projection position to the index map based on the relationship between the decoded position and the index (e.g., the index to the generated decoded position (geometry) map and the decoded position (geometry) to the index map).

As described with reference to FIGS. 15 to 17, the point cloud transmission device performs attribute encoding based on the projected geometry. Accordingly, the attribute reconstructed by the attribute decoder is represented as an attribute for the geometry represented in the projection domain described with reference to FIGS. 15 to 23.

That is, once attribute decoding is performed, each point in the projection domain has an attribute. Accordingly, the inverse projection unit 4523 of the point cloud reception device may perform inverse projection and reconstruct the original geometry for the projected geometry based on the projected position to the index map and the index to the position map. Then, it may match the reconstructed original geometry to the reconstructed attribute. The projection index map generation unit 4522 may be included in the inverse projection unit 4523.

The inverse projection according to the embodiments may include inversely projecting the positions of points based on coordinates representing the positions of the points and converting the coordinates representing the positions of the points expressed in a second coordinate system into a first coordinate system. The coordinates representing the positions of the inversely projected points may be expressed in the first coordinate system. The inverse projection unit 4523 may perform the operation of inversely projecting the positions of the points based on the coordinates representing the positions of the points. The inverse projection unit 4523 may perform the operation of converting the coordinates representing the positions of the points expressed in the second coordinate system into the first coordinate system. The first coordinate system according to the embodiments may include a Cartesian coordinate system, and the second coordinate system may include a spherical coordinate system, a cylindrical coordinate system, or a fan-shaped coordinate system. Also, the second coordinate system may include a fan-shaped spherical coordinate system and a fan-shaped cylindrical coordinate system. The operation of inversely projecting the positions of the points according to the embodiments may be based on the coordinates representing the positions of the points expressed in the second coordinate system and a scale value.

FIG. 46 is a diagram illustrating an example of a processing process of a point cloud reception device according to embodiments.

The flowchart 4600 shown in FIG. 46 illustrates an example of the processing procedure of the point cloud reception device described with reference to FIGS. 44 and 45. The operations of the point cloud reception device are not limited to this example. The operations corresponding to the respective elements may be performed in the order shown in FIG. 46 or may not be performed sequentially.

As described with reference to FIGS. 44 and 45, the point cloud reception device receives a point cloud bitstream as an input and performs entropy decoding 4610, dequantization 4611, and geometry decoding 4612 on the geometry bitstream. The entropy decoding 4610, the dequantization 4611, and the geometry decoding 4612 correspond to the geometry processing described with reference to FIG. 45, and a detailed description thereof is omitted. As described with reference to FIG. 45, the point cloud reception device determines whether projection is performed, based on the signaling information described with reference to FIGS. 32 to 43, and performs attribute decoding 4630 when the projection is skipped. When the projection is performed, the point cloud reception device performs projection post processing (e.g., the projection post processing 4520 described with reference to FIG. 45). The projection post-processing according to the embodiments is an example of the projection post-processing 4520 described with reference to FIG. 45, and includes coordinate conversion 4620, coordinate projection 4621, translation adjustment 4622, bounding box adjustment 4623, projection domain voxelization 4624, and inverse projection 4625. The coordinate conversion 4620, the coordinate projection 4621, the translation adjustment 4622, the bounding box adjustment 4623, and the projection domain voxelization 4624 may correspond to the projection unit 4521 described with reference to FIG. 45. As described with reference to FIG. 45, the point cloud reception device may perform the translation adjustment 4622, the bounding box adjustment 4623, and the like based on the information related to laser position adjustment (e.g., the laser position adjustment 1642), sampling rate adjustment (e.g., the sampling rate adjustment 1643), and the like included in the signaling information described with reference to FIGS. 32 to 43. The point cloud reception device performs inverse projection 4625. That is, the inverse projection unit 4625 is a component that changes attribute information restored as an attribute for the projected geometry into a domain for the geometry information reconstructed into in the original position. The inverse projection may be performed in the same manner as the projection of point cloud data. In the inverse projection, the position of a point of the point cloud data in a projected coordinate system may be converted into an original coordinate system using an inverse transformation equation. When the projection is applied to attribute coding, reconstructed geometry information may be linked with corresponding attribute information such that the attribute information may be matched with appropriate values and restored. The inverse projection 4625 according to the embodiments is the same as the inverse projection 4523 described with reference to FIG. 45, and thus a detailed description thereof is omitted.

Figure 47:
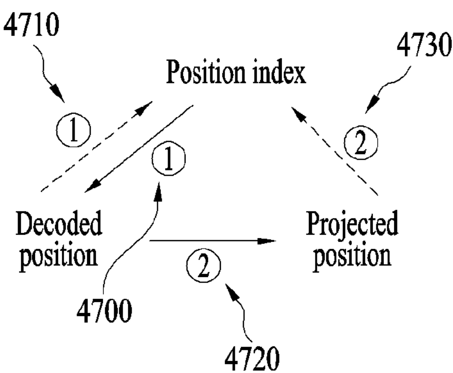
FIG. 47 is a diagram illustrating an example of inverse projection according to embodiments.

FIG. 47 is a diagram illustrating an example of inverse projection according to embodiments.

FIG. 47 illustrates the projection Idx map generation 4522 as an example of the inverse projection described with reference to FIGS. 45 and 46. The inverse projection may be performed in the same manner as the projection of point cloud data. In the inverse projection, point cloud data in a projected coordinate system may be converted into an original coordinate system using an inverse transformation equation. When the projection is applied to attribute coding, reconstructed geometry information may be linked with corresponding attribute information such that the attribute information may be restored by being matched with appropriate values.

A solid line 4700 shown in the figure represents an operation of generating an index to decoded position map based on the relationship between the position given before the projection and the index. A dotted line 4710 shown in the figure represents an operation of generating a decoded position to the index map. A solid line 4720 shown in the figure represents an operation of the point cloud reception device performing projection on the index assigned geometry and generating a decoded position to projected position map for the projected position (geometry) map. In addition, a dotted line 4730 shown in the figure represents an operation of the point cloud reception device generating a projection position to index map based on the relationship between the decoded position and the index (e.g., the index to decoded position (geometry) map and the decoded position (geometry) to index map).

That is, as a method of connecting the projected geometry information with the geometry information given before being projected, the geometry information may be indexed. That is, the reception device according to the embodiments may sort the reconstructed geometry information in a certain manner (e.g., Morton code order, x-y-z zigzag order, etc.) and then assign indexes thereto in order.

After attribute decoding, the projected points have attribute values. Original positions may be found based on the projected positions using the projected position to index map and the index to position map. In this way, the reconstructed geometry information and the reconstructed attribute information may be matched to each other. The inverse projection is the same as that described with reference to FIG. 45, and thus a description thereof is omitted.

FIG. 48 is a diagram illustrating an example of a processing procedure of a point cloud reception device according to embodiments.

The flowchart 4800 shown in the figure illustrates an example of the processing procedure of the point cloud reception device described with reference to FIGS. 44 to 46. The operations of the point cloud reception device are not limited to this example. The operations corresponding to the respective elements may be performed in the order shown in FIG. 48 or may not be performed sequentially.

In another embodiment of the present disclosure, a laser index and an angular index may be used to correct a laser sampling error of LiDAR.

As described above, the coordinate conversion method carried out by the projection unit is used to improve coding performance of attribute coding. In the coordinate conversion method, the position of each point distributed in a cylindrical coordinate system is converted into a rectangular coordinate system or Cartesian coordinate system whose axes are a function of a radius, a horizontal direction angle, and a laser index. Given a point (or parameter) in a three-dimensional orthogonal coordinate system, that is, the position (x, y, z) of the point, the corresponding position ($r_L$, $\theta_L$, $\phi_L$) in the cylindrical coordinate system is derived by Equation 24 below. That is, Equation 24 is an example of cylindrical coordinate conversion considering the position of the laser.

$$r_L = \sqrt{(x - x_c - x_L)^2 + (y - y_c - y_L)^2}, \quad \text{[Equation 24]}$$

$$\theta_L = \tan^{-1}\left(\frac{y - y_c - y_L}{x - x_c - x_L}\right),$$

$$\phi_L = \tan^{-1}\left(\frac{z - z_c - z_L}{\sqrt{(x - x_c - x_L)^2 + (y - y_c - y_L)^2}}\right),$$

In Equation 24, ($x_c$, $y_c$, $z_c$) represents the center position of the LiDAR head, and ($x_L$, $y_L$, $z_L$) represents the relative position of each laser.

According to embodiments, with ($r_L$, $\theta_L$, $\phi_L$), coordinate conversion (i.e., projection) may be performed as shown in Equation 25 below.

$$x' = s_r \cdot r_L,\ y' = s_\theta \cdot \theta_L,\ z' = s_{idx} \cdot idx_L \quad \text{[Equation 25]}$$

According to embodiments, idxL denotes the laser index which samples the point at the elevation angle $\Phi_L$, and the scaling parameters (also referred to as scale factor parameters) $s_r$, $s_\theta$, and $s_{idx}$ are divided by the largest length of point distribution of three axes divided by the length of point distribution along each axis. That is, $S_r$ is applied to the x' axis as a scale factor for parameter $r_L$, $s_\theta$ is applied to the y' axis as a scale factor for $\theta_L$, and $s_{idx}$ is applied to the z' axis as a scale factor for $idx_L$.

According to embodiments, the point cloud transmission device adjusts a sampling rate of projected point cloud data (e.g., projected geometry) by applying scaling parameters $s_r$, $s_\theta$, and $s_{idx}$.

In an embodiment of the present disclosure, an alternative coordinate conversion which uses the angular index idxθ instead of the azimuthal angle $\theta_L$ is carried out to improve performance. In this regard, the position of the coordinate conversion output is given by Equation 26 below. That is, coordinate conversion (i.e., projection) using ($r_L$, $idx_\theta$, $idx_L$) may be performed as in Equation 26 below.

$$x' = s_r \cdot r_L,\ y' = s_{idx\theta} \cdot idx_\theta,\ z' = s_{idx} \cdot idx_L, \quad \text{[Equation 26]}$$

where the angular index $idx_\theta$ is an index ranging from 0 to num_phi_per_turn−1, and $s_{idx\theta}$ represents a scaling parameter (or referred to as a scale factor parameter) corresponding to the angular index. The variable num_phi_per_turn denotes the number of sampling per turn, assuming that the rotational speed of LiDAR is constant. Also, $idx_L$ denotes the laser index of a sampling point at the elevation angle (DL.

That is, in the case of a spherical coordinate system, r, phi, and theta represent a distance from the center in x, y, z space and azimuth/elevation angles, Converting the coordinates expressed in this form into a third coordinate system (x', y', z') (e.g., a cuboid space or a rectangular coordinate system) is called a projection.

Equation 26 is an example of coordinate conversion (i.e., projection) using the angular index and the laser index instead of the azimuth/elevation angles. In the equation, projection may be performed by matching the coordinates as x'=radius, y'=angular index $idx_\theta$, and z'=laser index $idx_L$.

Also, $s_r$, $s_{idx\theta}$, and $s_{idx}$ represent scaling parameters (or referred to as scale factor parameters). Here, s, is applied to the x' axis as a scale factor for the parameter $r_L$, $s_{idx\theta}$ is applied to the y' axis as a scale factor for the angular index $idx_\theta$, and $s_{idx}$ is applied to the z' axis as a scale factor for the laser index $idx_L$.

According to the embodiments, the point cloud transmission device adjusts the sampling rate of point cloud data (e.g. geometry) projected by applying the scaling parameters $s_r$, $s_{idx\theta}$, and $s_{idx}$ to the radius $r_L$, angular index $idx_\theta$, and laser index $idx_L$, respectively, as in Equation 26. The sampling rate adjustment may be performed by the sampling rate adjuster 1643 in FIG. 16 or in the sampling rate adjustment 1733 in FIG. 17.

The angular index $idx_\theta$ may be calculated as in Equation 27 below. That is, the angular index $idx_\theta$ is a value obtained by multiplying a value obtained by dividing azimuthal angle $\theta_L$ by $2\pi$ by num_phi_per_turn and adding an offset to the result of the multiplication.

$$idx_\theta = \theta_L / 2\pi \times \text{num\_phi\_per\_turn} + \text{offset} \quad \text{[Equation 27]}$$

Here, offset is used to tune the laser starting position and may range from 0 to 1. According to embodiments, offset may have the same value or a similar value within an error range for all angular indexes, or may have different values according to angular indexes. According to embodiments, num_phi_per_turn and offset may be signaled through a laser_phi_per_turn field and a laser_angle_offset field in the projection-related information shown in FIGS. 33 and 34, respectively.

That is, the projection unit (e.g., 1540 in FIG. 15, 1632 in FIG. 16, or operations 1730 to 1734 in FIG. 17) of the point cloud data transmission device may perform the projection of converting coordinates (i.e., the first coordinate system) representing positions of points into another coordinate system (i.e., the second coordinate system), and converting the converted coordinates presented in the second coordinate system into the third coordinate system. For example, the projection unit may convert the coordinates of a point presented in a Cartesian coordinate system (or referred to as the first coordinate system) into at least one of a cylindrical coordinate system, a spherical coordinate system, or a fan-shaped coordinate system (or referred to as the second coordinate system). Then, the projection unit may convert the point presented in the second coordinate system into the third coordinate system (or referred to as a Cartesian coordinate system) having x', y', and z' axes. That is, the projection unit projects the point presented in the second coordinate system onto a Cartesian coordinate system (or referred to as the third coordinate system) having x', y', and z' axes. In other words, a point is projected onto the third coordinate system (x', y', z') based on the converted value (e.g., radius, angular index, laser index) presented in the second coordinate system. In this case, the sampling rate for each axis may be adjusted by applying scaling parameters.

In this embodiment, the coordinate system that uses ($r_L$, idxθ, idxL) is referred to as a fourth coordinate system, an improved spherical coordinate system, or an alternative spherical coordinate system.

The point cloud transmission device according to the embodiments may change positions of points based on scaling parameters (or referred to as scale factors or scale values) for each axis according to the distribution of the points. Also, when the value of the scaling parameter for each axis is greater than 1, the positions of the projected points may be more sparsely distributed than the positions of the points before the projection. On the other hand, when the value of the scaling parameter for each axis is less than 1, the positions of the projected points may be more densely distributed than the positions of the points before the projection. For example, the point cloud data transmission device, when the points of the acquired point cloud data are densely distributed along the x-axis and y-axis and sparsely distributed along the z-axis, the distribution of the positions of the points may be projected uniformly based on the values of a and R greater than 1 and the value of γ less than 1.

Information on sampling rate adjustment (including information on scaling parameters) according to embodiments is transmitted to the point cloud reception (e.g., the reception device of FIG. 1, the point cloud decoder of FIGS. 10 and 11, the reception device of FIG. 13, 44, the reception device of FIG. 45, the reception method of FIG. 46, or the reception device of FIG. 48). The point cloud reception device obtains the information on the sampling rate adjustment and adjusts the sampling rate according to the information.

As described with reference to FIGS. 44 to 48, when the value of the attr_coord_conv_enabled_flag field is 1, the point cloud reception device may perform coordinate conversion pre-process 4810 as a pre-process for attribute decoding. The coordinate conversion pre-process 4810 may correspond to the projection 4521 described with reference to FIG. 45. Operations represented by the components of FIG. 48 according to the embodiments may be performed by hardware, software, processes, or a combination thereof constituting the point cloud reception device. The point cloud reception device performs the coordinate conversion pre-process 4810 based on the projection-related signaling information described with reference to FIGS. 32 to 43. The position (geometry) of the point output in the coordinate conversion pre-process 4810 is used in the subsequent attribute decoding 4820. Input (or input data) of the coordinate conversion pre-process 4810 according to the embodiments is obtained from the projection-related signaling information described with reference to FIGS. 32 to 43 or includes variables derived based on the projection-related signaling information described with reference to FIGS. 32 to 43.

Next, the coordinate conversion process of the coordinate conversion pre-process 4810 for converting the Cartesian coordinate system to the spherical coordinate system will be described.

Output of this coordinate conversion process is an array AttrPos[idx][axis] specifying positions after conversion into the spherical coordinate system. Here, idx has a value in the range of 0 to PointCount−1, and axis has a value in the range of 0 to 2.

The arrays r2[idx], tPoint[idx], sPoint[idx], and PointTheta[idx] may be derived as follows. In this regard, idx is set as idx=PointCount−1.

```
for(idx=0; idx<PointCount; idx++){
sPoint[idx] = (PointPos[idx][0] − GeomAngularOrigin[0]) << 8
tPoint[idx] = (PointPos[idx][1] − GeomAngularOrigin[1]) << 8
r2[idx] = sPoint × sPoint + tPoint × tPoint
rInvLaser = invSqrt(r2[idx])
pointTheta[idx] = ((PointPos[idx][2] −
GeomAngularOrigin[2]) × rInvLaser) >>
14
}
```

Here, array PointPos is a variable specifying the point position represented in the Cartesian coordinates, and GeomAngularOrigin is a variable specifying the (x, y, z) coordinates of the origin of lasers.

Coordinate conversion pre-process 4810 according to embodiments may include a laser index determination process for determining a laser index.

A laser index determination process according to embodiments is a process of determining a laser index laserIndex [idx] with a point index idx indicating a point within a range of 0 to PointCount-1 for a point on which coordinate conversion is performed. This process is performed only when the value of the attr_coord_conv_enabled_flag field is 1.

According to embodiments, the laser index array lasertIndex[idx] may be derived as follows. Here, idx has a value in the range of 0 and PointCount−1 (idx=0, . . . , PointCount-1).

```
for(idx=0; idx<PointCount; idx++){
for (i = 1; i < number_lasers_minus1; i++)
if (LaserAngle[i] > pointTheta[idx])
break
if (pointTheta[idx]-LaserAngle[i-1] <= LaserAngle[i] − pointTheta[idx])
i—
laserIndex[idx]= i
}
```

Here, number_lasers_minus1 is a variable specifying the number of lasers, and LaserAngle[i] is a variable specifying the tangent of the elevation angle of the i-th laser.

According to embodiments, the azimuthal angular index array azimuthIndex[idx], that is, the angular index may be derived as follows. Here, idx has a value in the range of 0 and PointCount−1 (idx=0, . . . , PointCount-1). For example, when the value of LaserPhiPerTum[laserIndex[idx]] is less than or equal to 0, phi[idx] becomes the angular index azimuthIndex[idx] of the idx-th point. When the value of LaserPhiPerTum[laserIndex[idx]] is greater than 0, the angular index azimuthIndex[idx] of the idx-th point is obtained from calculation of divApprox (phi*LaserPhiPerTum[laserIndex[idx]]*(1<<8)+ spherical_coord_azimuth_offset*2*(3294199>>8), 2*(3294199>>8)*(1<<8), 8).

Also, as shown below, when the angular index azimuthIndex[idx] is greater than or equal to LaserPhiPerTurn [laserIndex[idx]]), the angular index azimuthIndex[idx] is set to azimuthIndex[idx]−LaserPhiPerTurn[laserIndex [idx]]. When the angular index azimuthIndex[idx] is less than 0, the angular index azimuthIndex[idx] is set to azimuthIndex[idx]+LaserPhiPerTum[laserIndex[idx]].

```
When LaserPhiPerTurn[laserIndex[idx]] > 0
for(idx=0; idx<PointCount; idx++){
phi[idx] = (iAtan2hp(tPoint[idx], sPoint[idx]) + 3294199) >> 8
if(LaserPhiPerTurn[laserIndex[idx]] <= 0)
```

-continued

```
azimuthIndex[idx]= phi[idx]
else {
azimuthIndex[idx] = divApprox(phi *
LaserPhiPerTurn[laserIndex[idx]] * (1 <<
8) + spherical_coord_azimuth_offset * 2 * (3294199 >> 8),
2 * (3294199 >> 8) * (1 << 8), 8)
if (azimuthIndex[idx] >= LaserPhiPerTurn[laserIndex[idx]])
azimuthIndex[idx] −= LaserPhiPerTurn[laserIndex[idx]]
else if (azimuthIndex[idx] < 0)
azimuthIndex[idx] += LaserPhiPerTurn[laserIndex[idx]]
}
}
```

The following process is applied to the points to convert the axes of Cartesian coordinates to cylindrical coordinates. That is, the array convPointPos[idx][axis] specifying the point position in the cylindrical coordinate system may be derived as follows. Here, idx has a value in the range of 0 to PointCount-1, and axis has a value in the range of 0 to 2.

```
for(idx=0; idx<PointCount; idx++){
convPointPos[idx][0] = iSqrt(r2[idx]) >> 8
convPointPos[idx][1] = azimuthIndex[idx]
convPointPos[idx][2] = laserIndex[idx]
}
```

According to embodiments, the array minPointPos[axis] may be derived as follows. Here, axis has a value in the range of 0 to 2.

```
for (axis=0; axis<3; axis++){
minPointPos[axis] = convPointPos[0][axis]
for(idx=1; idx<PointCount; idx++){
if(minPointPos[axis]> convPointPos[idx][axis])
minPointPos[axis] = convPointPos[idx][axis]
}
}
```

Here, MinPointPos denotes the minimum point position among ConvPointPos[idx] with PointIdx in the range of 0 to PointCount-1.

Finally, the array AttrPos[idx][axis] (i.e., the output of the coordinate conversion pre-process 4810) may be derived as follows. Here, idx has a value in the range of 0 to PointCount-1, and axis has a value in the range of 0 to 2.

```
for (axis=0; axis<3; axis++)
for (idx=0; idx<PointCount; idx++)
AttrPos[idx][axis] = ((convPointPos[idx][axis] −
minPointPos[axis])×attr_spherical_coord_conv_scale[k]) >> 8
```

According to embodiments, a radius, angular index, laser index conversion coordinate system may be applied to predictive geometry coding. In one embodiment, the predictive geometry coding to which the radius, angular index, laser index conversion coordinate system is applied is performed by the geometry coding 1510 of FIG. 15, the geometry encoding unit 1610 in the geometry encoder of FIG. 16, or the geometry encoding 1710 of FIG. 17. In another embodiment, the prediction geometry coding to which the radius, angular index, laser index conversion coordinate system is applied is performed by the point cloud transmission device of FIG. 1, the coordinate transformer 40000 of FIG. 4, the point cloud transmission device of FIG. 12, or the XR device of FIG. 14. According to embodiments, the point cloud transmission device (e.g., the geometry encoder) may convert geometry data (i.e., positions of points) presented in a Cartesian coordinate system into a coordinate system using (radius, angular index, laser index). Then, it may generate a predictive tree based on the geometry data of the coordinate system into which the conversion has been performed, and perform prediction based on the predictive tree to compress the geometry data.

The predictive geometry coding (i.e., compression) according to the embodiments is performed by defining a prediction structure for point cloud data. This structure is represented as a predictive tree with a vertex associated with each point of the point cloud data. The predictive tree may include a root vertex (or referred to as a root point) and a leaf vertex (or referred to as a leaf point), and points below the root point may have at least one child, and the depth increases in the direction to the leaf point. Each point may be predicted from parent nodes in the predictive tree. According to embodiments, each point may be predicted by applying one of various prediction modes (e.g., no prediction, delta prediction, linear prediction, parallelogram prediction) based on the point positions of the parent, grandparent, and great-grandparent of the corresponding point.

In one embodiment, the predictive geometry decoding to which the radius, angular index, laser index conversion coordinate system is applied is performed by the geometry decoding 4410 of FIG. 44, the geometry decoding unit 4503 in the geometry decoder of FIG. 45, or 4503 geometry decoding 4610 of FIG. 46. In another embodiment, the predictive geometry decoding to which the radius, angular index, laser index conversion coordinate system is applied is performed by the point cloud reception device of FIG. 1, the coordinate inverse transformer 11004 of FIG. 11, the point cloud reception device of FIG. 13, or the XR device of FIG. 14. According to embodiments, the point cloud reception device (e.g., geometry decoder) may perform predictive tree-based geometry decoding (or reconstruction) on the geometry data of a coordinate system using (radius, angular index, laser index), and then inversely convert the coordinates of the converted geometry data into the Cartesian coordinate system.

In one embodiment, an angular index rather than a radian value is used for Phi. According to embodiments, the angular index has the same meaning as the pi index. In this embodiment, the angular index and the pi index may be used interchangeably.

In performing projection, the position of a point presented in the Cartesian coordinate system (x, y, z) is converted into a three-dimensional coordinate system (or referred to as a fourth coordinate system) having (radius, phi index, laser index). According to embodiments, the fourth coordinate system may be referred to as a spherical coordinate system using (r, angular index, laser index) (or an improved spherical coordinate system).

In this case, in one embodiment, the angular index is calculated using a variable Num_phi_per_turn according to the laser index. The variable num_phi_per_turn (or referred to as laser_phi_per_turn) indicates the number of sampling per turn. For details about calculation of the angular index using Num_phi_per_turn and offset, refer to the descriptions of Equations 26 and 27 above. For example, when num_phi_per_turn=100, the angular index is phi/2π*100 for any angle phi.

According to embodiments, in predictive geometry coding, a circular difference may be applied to obtain a prediction error (or referred to as a residual). That is, if only the difference is simply obtained in obtaining the prediction error, the prediction error may come within the range of −2π to 2π. Accordingly, the circular difference may be applied to make the error fall within the range of 0 to 2π.

For example, when the prediction mode for the predictive geometry coding is 1 (i.e., prediction is performed using a parent node), Phi(n−1) is 0, and phi (n) is 7π/4, the prediction error (or residual information) may be obtained as follows. That is, the prediction error may be obtained by subtracting the previous angular index from the current angular index.

For example, suppose phi_index(n−1)=0 and phi_index (n)=7Num_phi_per_turn/8. Then, the prediction error is obtained as follows.

Prediction error: res(n)=phi_index(n)−phi_index(n−1)=7Num_phi_per_turn/8

That is, the geometry encoder of the point cloud transmission device may transmit smaller residual information (residual value) in consideration of adjacent angles. Thereby, the number of bits may be reduced.

Res_new(n)=−Num_phi_per_turn/8 res_new(n) denotes the prediction error (i.e., residual information) related to the corresponding point.

Figure 49:
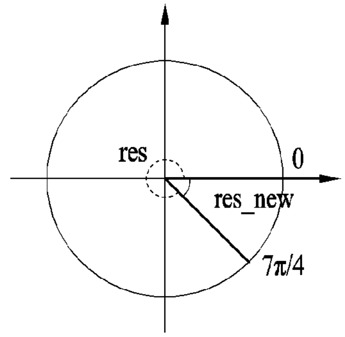
FIG. 49 is a diagram illustrating examples of prediction errors of point cloud data according to embodiments.

Then, the geometry decoder of the point cloud reception device corrects phi_pred(n)+res_new(n) to fall within the range of 0 to 2π as shown in FIG. 49 in order to restore the original angular index. This is intended to increase transmission/reception efficiency by reducing the number of bits.

Here, phi_pred denotes the prediction mode or predicted value of the point, and res_new(n) denotes the prediction error (i.e., residual information) related to the point.

The following is a process of inversely converting the fourth coordinate system (radius, angular index, laser index) (or improved (or replaced) spherical coordinate system) into the Cartesian coordinate system (x, y, z) by the reception device.

```
SphericalToCartesian(const GeometryParameterSet & gps)
: log2ScaleRadius(gps.geom_angular_radius_inv_scale_log2)
, log2ScalePhi(gps.geom_angular_azimuth_scale_log2)
, tanThetaLaser(gps.geom_angular_theta_laser.data( ))
, zLaser(gps.geom_angular_z_laser.data( ))
, laser_phi_per_turn(gps.geom_angular_num_phi_per_turn.data( ))
{ }
Vec3<int32_t> operator( )(Vec3<int32_t> sph)
{
int64_t r = sph[0] << log2ScaleRadius;
int64_t z = divExp2RoundHalfInf(
tanThetaLaser[sph[2]] * r << 2, log2ScaleTheta − log2ScaleZ);
sph[1] = findAngle2(sph[1], laser_phi_per_turn[sph[2]], log2ScalePhi);
return Vec3<int32_t>(Vec3<int64_t>{
divExp2RoundHalfInf(r * icos(sph[1], log2ScalePhi), kLog2ISineScale),
divExp2RoundHalfInf(r * isin(sph[1], log2ScalePhi), kLog2ISineScale),
divExp2RoundHalfInf(z − zLaser[sph[2]], log2ScaleZ)});
}
```

The following is a process of converting the Cartesian coordinate system (x, y, z) into the fourth coordinate system (radius, angular index, laser index) (or referred to as an improved spherical coordinate system) by the reception device.

```
CartesianToSpherical(const GeometryParameterSet& gps)
: sphToCartesian(gps)
, log2ScaleRadius(gps.geom_angular_radius_inv_scale_log2)
, scalePhi(1 << gps.geom_angular_azimuth_scale_log2)
, numLasers(gps.geom_angular_theta_laser.size( ))
, tanThetaLaser(gps.geom_angular_theta_laser.data( ))
```

-continued

```
, zLaser(gps.geom_angular_z_laser.data( ))
, laser_phi_per_turn(gps.geom_angular_num_phi_per_turn.data( ))
{ }
Vec3<int32_t> operator( )(Vec3<int32_t> xyz)
{
int64_t r0 = int64_t(std::round(hypot(xyz[0], xyz[1])));
int32_t thetaIdx = 0;
int32_t minError = std::numeric_limits<int32_t>::max( );
for (int idx = 0; idx < numLasers; ++idx) {
int64_t z = divExp2RoundHalfInf(
tanThetaLaser[idx] * r0 << 2, log2ScaleTheta − log2ScaleZ);
int64_t z1 = divExp2RoundHalfInf(z − zLaser[idx], log2ScaleZ);
int32_t err = abs(z1 − xyz[2]);
if (err < minError) {
thetaIdx = idx;
minError = err;
}
}
Vec3<int32_t> sphPos{ int32_t(divExp2RoundHalfUp(r0,
log2ScaleRadius)),
int32_t(findTurn2(xyz, laser_phi_per_turn[thetaIdx])), thetaIdx };
// local optimization
auto minErr = (sphToCartesian(sphPos) − xyz).getNorm1( );
int32_t dr0 = 0;
for (int32_t dr = −2; dr <= 2; ++dr) {
auto sphPosCand = sphPos + Vec3<int32_t>{dr, 0, 0};
auto err = (sphToCartesian(sphPosCand) − xyz).getNorm1( );
if (err < minErr) {
minErr = err;
dr0 = dr;
}
}
sphPos[0] += dr0;
return sphPos;
}
```

The following is a method of finding an angular index from the angular angle. In an embodiment, this method is carried out by each of the geometry encoder of the point cloud transmission device and the geometry decoder of the point cloud transmission/reception, respectively. As described above, the angular index may be found from the angular angle based on laser_phi_per_turn. If turn_idx is out of laser_phi_per_turn or has a value less than 0, the angular index correction process is performed as shown below.

```
inline int
CartesianToSpherical::findTurn2(Vec3<int>
point, const int laser_phi_per_turn)
{
int turn_idx = (int)std::round(((atan2(point[1],
point[0]) + M_PI) * laser_phi_per_turn) /
(2.0 * M_PI));
if (turn_idx >=              turn_idx −= laser_phi_per_turn;
laser_phi_per_turn)
else if (turn_idx < 0)       turn_idx += laser_phi_per_turn;
return turn_idx;
}
```

The following is a method of finding an azimuthal angle from the angular index. In an embodiment, this method is carried out by each of the geometry encoder of the point cloud transmission device and the geometry decoder of the point cloud transmission/reception. In this case, the corrected angular index value is used as it is. If the azimuthal angle found with the value is used as it is, it is out of the range. Accordingly, the azimuthal angle may be corrected again as shown below, such that the angle is within the range (0–laser_phi_per_turn).

```
inline int
SphericalToCartesian::findAngle2(int turn__idx,
const int laser__phi__per__turn, const int
log2ScalePhi)
{
double scalePhi = (double)(1 << log2ScalePhi);
double angle = std::round((turn__idx * 2.0 –
laser__phi__per__turn) * scalePhi /
(2.0 * laser__phi__per__turn));
```

-continued

```
if (angle >= scalePhi / 2)            angle –= scalePhi;
else if (angle < –scalePhi / 2)          angle += scalePhi;
return (int)angle;
}
```

The followings may be added or changed in generating a predictive tree. That is, they may be considered in order to use the improved spherical coordinate system (i.e., the fourth coordinate system) of the present embodiment for predictive tree-based geometry coding and decoding. In one embodiment, when the angular mode is enabled, the angular index is transmitted as a value of the prediction error in the example below, instead of obtaining the phi value, in contrast with the previous case.

```
int
PredGeomEncoder::encodeTree(
const Vec3<int32__t>* srcPts,
Vec3<int32__t>* reconPts,
const GNode* nodes,
int numNodes,
int rootIdx,
int* codedOrder)
{
QuantizerGeom quantizer(sliceQp);
int nodesUntilQpOffset = 0;
int processedNodes = 0;
__stack.push__back(rootIdx);
while (!__stack.empty( )) {
const auto nodeIdx = __stack.back( );
__stack.pop__back( );
const auto& node = nodes[nodeIdx];
const auto point = srcPts[nodeIdx];
struct {
float bits;
GPredicter::Mode mode;
Vec3<int32__t> residual;
Vec3<int32__t> prediction;
} best;
if (__geom__scaling__enabled__flag && !nodesUntilQpOffset--) {
int qp = qpSelector(node);
quantizer = QuantizerGeom(qp);
encodeQpOffset(qp – __sliceQp);
nodesUntilQpOffset = __qpOffsetInterval;
}
// mode decision to pick best
prediction from available set
int qphi;
for (int iMode = 0; iMode < 4; iMode++) {
GPredicter::Mode mode = GPredicter::Mode(iMode);
GPredicter predicter = makePredicter(
nodeIdx, mode, [=](int idx) { return nodes[idx].parent; });
if (!predicter.isValid(mode))
continue;
auto pred = predicter.predict(&srcPts[0], mode);
/*                if (__geom__angular__mode__enabled__flag) {
if (iMode == GPredicter::Mode::Delta) {
int32__t phi0 = srcPts[predicter.index[0]][1];
int32__t phi1 = point[1];
int32__t deltaPhi = phi1 – phi0;
qphi = deltaPhi >= 0
? (deltaPhi + (__geom__angular__azimuth__speed >> 1))
/__geom__angular__azimuth__speed
                  : -(-deltaPhi + (__geom__angular__azimuth__speed >> 1))
/__geom__angular__azimuth__speed;
pred[1] += qphi * __geom__angular__azimuth__speed;
}
}*/
// The residual in the spherical domain is losslessly coded
auto residual = point – pred;
//////////////////////////////
if (__geom__angular__mode__enabled__flag) {
if (abs(residual[1]) > abs(residual[1] + __num__phi__per__turn[point[2]]))
residual[1] += __num__phi__per__turn[point[2]];
else if (abs(residual[1]) > abs(residual[1] – __num__phi__per__turn[point[2]]))
residual[1] –= __num__phi__per__turn[point[2]];
```

-continued

```
}
                                for (int i = 0; i < 3; i++) {
if (max[i] < residual[i])            max[i] = residual [i];
else if (min[i] > residual[i])     min[i] = residual [i];
}
///////////////////////////
if (!_geom_angular_mode_enabled_flag)
for (int k = 0; k < 3; k++)
residual[k] = int32_t(quantizer.quantize(residual[k]));
// Check if the prediction residual can be represented with the
// current configuration. If it can't, don't use this mode.
bool isOverflow = false;
for (int k = 0; k < 3; k++) {
if (residual[k])
if ((abs(residual[k]) - 1) >> _maxAbsResidualMinus1Log2[k])
                                isOverflow = true;
}
if (isOverflow)
continue;
auto bits = estimateBits(mode, residual);
if (iMode == 0 || bits < best.bits) {
best.prediction = pred;
best.residual = residual;
best.mode = mode;
best.bits = bits;
}
}
                                assert(node.childrenCount <= GNode::MaxChildrenCount);
if (!_geom_unique_points_flag)
encodeNumDuplicatePoints(node.numDups);
encodeNumChildren(node.childrenCount);
encodePredMode(best.mode);
/*   if (
geom_angular_mode_enabled_flag && best.mode ==
GPredicter::Mode::Delta)
encodePhiMultiplier(qphi);*/
encodeResidual(best.residual);
// convert spherical prediction to cartesian and re-calculate residual
if (_geom_angular_mode_enabled_flag) {
best.prediction = origin + _sphToCartesian(point);
best.residual = reconPts[nodeIdx] - best.prediction;
for (int k = 0; k < 3; k++)
                                best.residual[k] =
                                int32_t(quantizer.quantize(best.residual[k]));
encodeResidual2(best.residual);
}
// write the reconstructed position back to the point cloud
for (int k = 0; k < 3; k++)
best.residual[k] = int32_t(quantizer.scale(best.residual[k]));
reconPts[nodeIdx] = best.prediction + best.residual;
for (int k = 0; k < 3; k++)
reconPts[nodeIdx][k] = std::max(0,
reconPts[nodeIdx][k]);
// NB: the coded order of duplicate points assumes that the duplicates
// are consecutive -- in order that the correct attributes are coded.
codedOrder[processedNodes++] = nodeIdx;
for (int i = 1; i <= node.numDups; i++)
codedOrder[processedNodes++] = nodeIdx + i;
for (int i = 0; i < node.childrenCount; i++) {
_stack.push_back(node.children[i]);
}
}
return processedNodes;
}
```

Here, local optimization is an operation of reconverting the converted coordinate sphPos into a Cartesian coordinate and then correcting the radius to minimize the error with respect to the original coordinates.

In the previous case, qphi for quantizing the value of phi is delivered when residual information is obtained. However, in this embodiment, since the index is used, it is not required to use qphi, and the processing operation is reduced from two steps to one step.

As the operation is reduced from two steps to one step, the execution time may be shortened.

FIGS. 50 to 53 show a summary of the experimental results of lossy compression C3 and lossless compression CW of coordinate conversion applied to geometry and/or attribute coding (e.g., predictive lifting coding) according to embodiments. That is, in the lossy compression, a large gain is obtained, and the execution time is shortened. In the figure, Cat3-frame represents a LiDAR sequence. In addition, by using the proposed method in compressing a LiDAR sequence, compression efficiency in lossy compression may be increased. In the case of the LiDAR sequence, it may be seen that a gain is obtained not only in lossy compression but also in lossless compression.

The transmission device according to the embodiments may rearrange data based on distribution characteristics of point cloud data. Accordingly, inefficiently arranged data (e.g., a data type having a lower density at a farther distance from the center) may be uniformly distributed through projection, and then the data may be compressed and transmitted with higher efficiency.

The method/device for transmitting and receiving point cloud data according to the embodiments may perform attribute coding on the point cloud data based on a projection technique. In this regard, a projection coordinate system configuration and projection method based on characteristics of an acquisition device, and/or parameter setting in consideration of sampling characteristics may be carried out.

Accordingly, the transmission and reception methods/devices according to the embodiments may increase the compression performance of the data by re-sorting the data based on the characteristics of the data distribution/acquisition device based on a combination of the embodiments and/or related signaling information. Also, the reception method/device according to the embodiments may efficiently reconstruct the point cloud data.

The projection method according to the embodiments may be applied as a pre/post-processing process independently of attribute coding. When the method is applied to geometry coding, a prediction-based geometry coding method may be applied based on the pre-processing process of the predictive geometry coding method or the converted positions.

The method/device for transmitting and receiving point cloud data according to the embodiments may improve prediction-based geometry compression efficiency by applying the improved coordinate system to predictive geometry coding and decoding.

Each part, module, or unit described above may be a software, processor, or hardware part that executes successive procedures stored in a memory (or storage unit). Each of the steps described in the above embodiments may be performed by a processor, software, or hardware parts. Each module/block/unit described in the above embodiments may operate as a processor, software, or hardware. In addition, the methods presented by the embodiments may be executed as code. This code may be written on a processor readable storage medium and thus read by a processor provided by an apparatus.

In the specification, when a part "comprises" or "includes" an element, it means that the part further comprises or includes another element unless otherwise mentioned. Also, the term " . . . module (or unit)" disclosed in the specification means a unit for processing at least one function or operation, and may be implemented by hardware, software or combination of hardware and software.

Although embodiments have been explained with reference to each of the accompanying drawings for simplicity, it is possible to design new embodiments by merging the embodiments illustrated in the accompanying drawings. If a recording medium readable by a computer, in which programs for executing the embodiments mentioned in the foregoing description are recorded, is designed by those skilled in the art, it may fall within the scope of the appended claims and their equivalents.

The apparatuses and methods may not be limited by the configurations and methods of the embodiments described above. The embodiments described above may be configured by being selectively combined with one another entirely or in part to enable various modifications.

Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the apparatuses of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the apparatus according to the embodiments may include one or more processors capable of executing one or more programs. The one or more programs may perform any one or more of the operations/methods according to the embodiments or include instructions for performing the same. Executable instructions for performing the method/operations of the apparatus according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion. In this document, the term "/" and "," should be interpreted as indicating "and/or." For instance, the expression "A/B" may mean "A and/or B." Further, "A, B" may mean "A and/or B." Further, "A/B/C" may mean "at least one of A, B, and/or C." "A, B, C" may also mean "at least one of A, B, and/or C."

Further, in the document, the term "or" should be interpreted as "and/or." For instance, the expression "A or B" may mean 1) only A, 2) only B, and/or 3) both A and B. In other words, the term "or" in this document should be interpreted as "additionally or alternatively."

Various elements of the embodiments may be implemented by hardware, software, firmware, or a combination thereof. Various elements in the embodiments may be executed by a single chip such as a single hardware circuit. According to embodiments, the element may be selectively executed by separate chips, respectively. According to embodiments, at least one of the elements of the embodiments may be executed in one or more processors including instructions for performing operations according to the embodiments.

The operations according to the embodiments described in this document may be performed by a transmission/reception device including one or more memories and/or one or more processors according to the embodiments. The one or more memories may store programs for processing/controlling the operations according to the embodiments, and the one or more processors may control the various operations described in this document. The one or more processors may be referred to as a controller or the like. The operations according to the embodiments may be performed by firmware, software, and/or a combination thereof. The firmware, software, and/or combination thereof may be stored in the processors or the memories.

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signal unless context clearly dictates otherwise.

The terminology used to describe the embodiments is used for the purpose of describing particular embodiments only and is not intended to be limiting of the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

MODE FOR INVENTION

As described above, related contents have been described in the best mode for carrying out the embodiments.

INDUSTRIAL APPLICABILITY

As described above, the embodiments may be fully or partially applied to the point cloud data transmission/reception device and system. It will be apparent to those skilled in the art that variously changes or modifications may be made to the embodiments within the scope of the embodiments. Thus, it is intended that the embodiments cover the modifications and variations of this disclosure provided they come within the scope of the appended claims and their equivalents.

The invention claimed is:

1. A method of encoding point cloud data, the method comprising:
- encoding geometry data of the point cloud data;
- encoding attribute data of the point cloud data based on reconstructed geometry data including first coordinates or second coordinates; and
- transmitting the encoded geometry data, the encoded attribute data, and signaling data,
- wherein the signaling data includes a sequence parameter set and an attribute parameter set,
- wherein the sequence parameter set includes number information for number N of attributes and bit depth information that is repeated as many as the number N of attributes,
- wherein the attribute parameter set includes attribute coordinate conversion enable flag information that is capable of identifying whether the encoding of the attribute data is based on the first coordinates or the second coordinates,
- wherein the attribute parameter set further includes scale factor information based on the attribute coordinate conversion enable flag information having a true value, and
- wherein the first coordinates are Cartesian-based coordinates and the second coordinates are angular-based coordinates.

2. The method of claim 1, wherein the signaling data further contains information for identifying number of times of sampling per horizontal turn of lasers.

3. A device for encoding point cloud data, the device comprising:
- a processor to encode geometry data of the point cloud data and to encode attribute data of the point cloud data based on reconstructed geometry data including first coordinates or second coordinates; and
- a transmitter to transmit the encoded geometry data, the encoded attribute data, and signaling data,
- wherein the signaling data includes a sequence parameter set and an attribute parameter set,
- wherein the sequence parameter set includes number information for number N of attributes and bit depth information that is repeated as many as the number N of attributes,
- wherein the attribute parameter set includes attribute coordinate conversion enable flag information that is capable of identifying whether the encoding of the attribute data is based on the first coordinates or the second coordinates,
- wherein the attribute parameter set further includes scale factor information based on the attribute coordinate conversion enable flag information having a true value, and
- wherein the first coordinates are Cartesian-based coordinates and the second coordinates are angular-based coordinates.

4. The device of claim 3, wherein the signaling data contains information for identifying number of times of sampling per horizontal turn of lasers.

5. A method of decoding point cloud data, the method comprising:

receiving geometry data, attribute data, and signaling data;

decoding the geometry data based on the signaling data; and decoding the attribute data based on reconstructed geometry data including first coordinates or second coordinates based on the signaling data, wherein the signaling data includes a sequence parameter set and an attribute parameter set, wherein the sequence parameter set includes number information for a number N of attributes and bit depth information that is repeated as many as the number N of attributes, wherein the attribute parameter set includes attribute coordinate conversion enable flag information that is capable of identifying whether encoding of the attribute data is based on the first coordinates or the second coordinates, wherein the attribute parameter set further includes scale factor information based on the attribute coordinate conversion enable flag information having a true value, and wherein the first coordinates are Cartesian-based coordinates and the second coordinates are angular-based coordinates.

6. The method of claim 5, wherein the signaling data contains information for identifying number of times of sampling per horizontal turn of lasers.

7. A device for decoding point cloud data, the device comprising:

a receiver to receive geometry data, attribute data, and signaling data; and a processor to decode the geometry data based on the signaling data and to decode the attribute data based on reconstructed geometry data including first coordinates or second coordinates based on the signaling data, wherein the signaling data includes a sequence parameter set and an attribute parameter set, wherein the sequence parameter set includes number information for a number N of attributes and bit depth information that is repeated as many as the number N of attributes, wherein the attribute parameter set includes attribute coordinate conversion enable flag information that is capable of identifying whether encoding of the attribute data is based on the first coordinates or the second coordinates, wherein the attribute parameter set further includes scale factor information based on the attribute coordinate conversion enable flag information having a true value, and wherein the first coordinates are Cartesian-based coordinates and the second coordinates are angular-based coordinates.

8. The device of claim 7, wherein the signaling data further contains information for identifying number of times of sampling per horizontal turn of lasers.

* * * * *